United States Patent
Shirakawa et al.

(10) Patent No.: US 8,700,067 B2
(45) Date of Patent: Apr. 15, 2014

(54) NOTIFICATION DEVICE, NOTIFICATION SYSTEM, METHOD FOR CONTROLLING NOTIFICATION DEVICE, AND COMPUTER READABLE RECORDING MEDIUM HAVING A CONTROL PROGRAM RECORDED THEREUPON

(75) Inventors: Junichi Shirakawa, Osaka (JP); Syuji Daioku, Osaka (JP); Nobuo Kusumoto, Osaka (JP); Akira Tojima, Osaka (JP); Akihiro Azuma, Osaka (JP); Kunihiro Minoshima, Kawasaki (JP); Takehiko Shioda, Kawasaki (JP); Akihiro Tozaki, Kawasaki (JP); Kazunori Hashimoto, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 40 days.

(21) Appl. No.: 13/257,898

(22) PCT Filed: Mar. 19, 2010

(86) PCT No.: PCT/JP2010/001996
§ 371 (c)(1),
(2), (4) Date: Nov. 9, 2011

(87) PCT Pub. No.: WO2010/109836
PCT Pub. Date: Sep. 30, 2010

(65) Prior Publication Data
US 2012/0088523 A1  Apr. 12, 2012

(30) Foreign Application Priority Data
Mar. 24, 2009  (JP) ................................ 2009-072281

(51) Int. Cl.
*H04W 24/00* (2009.01)
(52) U.S. Cl.
USPC ................. 455/456.3; 455/414.1; 455/414.2; 455/414.3; 701/424; 701/426; 701/438; 705/14.4; 705/14.49; 705/14.57; 705/14.58

(58) Field of Classification Search
USPC ..................... 455/456.1–456.6, 414.1–414.3; 701/425, 426, 438; 705/14.4, 14.49, 705/14.57–14.58, 14.62–14.64
See application file for complete search history.

(56) References Cited

U.S. PATENT DOCUMENTS

| | | | |
|---|---|---|---|
| 6,680,675 B1 | 1/2004 | Suzuki | |
| 7,684,790 B2 * | 3/2010 | Cartmell | 455/414.1 |
| 2008/0248815 A1 * | 10/2008 | Busch | 455/456.5 |

FOREIGN PATENT DOCUMENTS

| | | | |
|---|---|---|---|
| JP | 2000-112347 A | 4/2000 | |
| JP | 2001-241964 A | 9/2001 | |

(Continued)

OTHER PUBLICATIONS

International Search Report, dated Apr. 20, 2010, issued in PCT/JP2010/001996.

*Primary Examiner* — Wayne Cai
(74) *Attorney, Agent, or Firm* — Birch, Stewart, Kolasch & Birch, LLP

(57) ABSTRACT

A mobile phone (1) of the present invention includes a mobile phone storage section (8) configured to store both of (i) data including positional information and (ii) data including no positional information, a positional information extraction section (110) for identifying the data including the positional information from among the data stored in the mobile phone storage section (8) and extracting the positional information to be used as a standard for setting a predetermined area, a mobile phone determination section (111) for setting the predetermined area on a basis of the positional information extracted by the positional information extraction section (110), and a mobile phone notification section (112) notifying the user of the mobile phone when the current position of the mobile phone enters within the predetermined area set by the mobile phone determination section (111). Hence, the user can easily register the positional information.

18 Claims, 37 Drawing Sheets

(56) References Cited

FOREIGN PATENT DOCUMENTS

| | | |
|---|---|---|
| JP | 2002-44271 A | 2/2002 |
| JP | 2002-159044 A | 5/2002 |
| JP | 2002-350170 A | 12/2002 |
| JP | 2003-44768 A | 2/2003 |
| JP | 2003-157401 A | 5/2003 |
| JP | 2004-62688 A | 2/2004 |
| JP | 2004-094406 A | 3/2004 |
| JP | 2004-279299 A | 7/2004 |
| JP | 2007-60368 A | 3/2007 |
| JP | 2007-265365 A | 10/2007 |
| JP | 2008-229092 A | 10/2008 |
| JP | 2008-244590 A | 10/2008 |

\* cited by examiner

FIG. 5
(a)
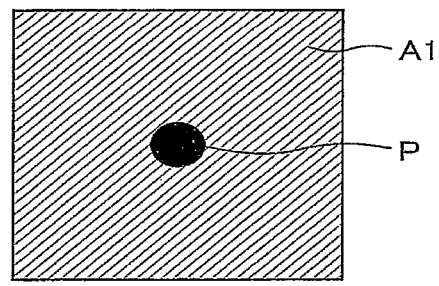
(b)
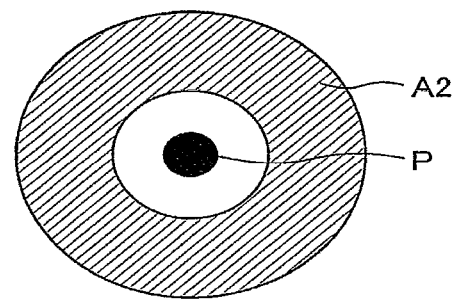
(c)
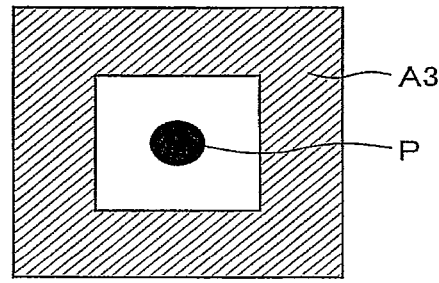

FIG. 12

| No. | Name | Positional Information | Notification Area (Foot) | Notification Area (Car) | Genre | Condition |
|---|---|---|---|---|---|---|
| 1 | ○○ Restaurant | Longitude:X1 Latitude:Y1 | Standard: (X1,Y1) Area Distance:1km | Standard: (X1,Y1) Area Distance:3km | Restaurant | 1/1～1/30,10:00～21:00, Tue To Sun,* |
| 2 | △△ Wear | Longitude:X2 Latitude:Y2 | Standard: (X2,Y2) Area Distance:1km | Standard: (X2,Y2) Area Distance:3km | Dress Shop | *,11:00～13:00,*, Sunny |
| 3 | ×× Dining Room | Longitude:X3 Latitude:Y3 | Standard: (X3,Y3) Area Distance:1km | Standard: (X3,Y3) Area Distance:3km | Restaurant | *,10:00～21:00, Thu To Tue,* |
| 4 | □□ Noodles | Longitude:X4 Latitude:Y4 | Standard: (X4,Y4) Area Distance:1km | Standard: (X4,Y4) Area Distance:3km | Restaurant | *,*,*,* |

FIG. 13

| No. | Name | Positional Information | Notification Area (Foot) | Notification Area (Car) | Genre | Corresponding Stored Coupon No. |
|---|---|---|---|---|---|---|
| a1 | ?? Restaurant | Longitude: Xa1<br>Latitude: Ya1 | Standard: (Xa1,Ya1)<br>Area Distance: 0.5km | Standard: (Xa1,Ya1)<br>Area Distance: 1km | Restaurant | 1,3,4 |
| a2 | ☆☆ Sushi | Longitude: Xa2<br>Latitude: Ya2 | Standard: (Xa2,Ya2)<br>Area Distance: 0.5km | Standard: (Xa2,Ya2)<br>Area Distance: 1km | Restaurant | 1,3,4 |
| a3 | ** Sports | Longitude: Xa3<br>Latitude: Ya3 | Standard: (Xa3,Ya3)<br>Area Distance: 0.5km | Standard: (Xa3,Ya3)<br>Area Distance: 1km | Dress Shop | 2 |
| a4 | ◎◎ Store | Longitude: Xa4<br>Latitude: Ya4 | Standard: (Xa4,Ya4)<br>Area Distance: 0.5km | Standard: (Xa4,Ya4)<br>Area Distance: 1km | Dress Shop | 2 |

| No. | Name | Positional Information | Same-Genre Flag | Condition NG Flag | Genre | Condition |
|---|---|---|---|---|---|---|
| 1 | ○○ Restaurant | Longitude:X1 Latitude:Y1 | ○ | | Restaurant | 1/1~1/30,10:00~21:00, Tue To Sun,* |
| 2 | △△ Wear | Longitude:X2 Latitude:Y2 | | | Dress Shop | *,11:00~13:00,*, Sunny |
| 3 | ×× Dining Room | Longitude:X3 Latitude:Y3 | ○ | ○ | Restaurant | *,10:00~21:00, Thu To Tue,* |
| 4 | □□ Noodles | Longitude:X4 Latitude:Y4 | ○ | | Restaurant | *,*,*,* |

103

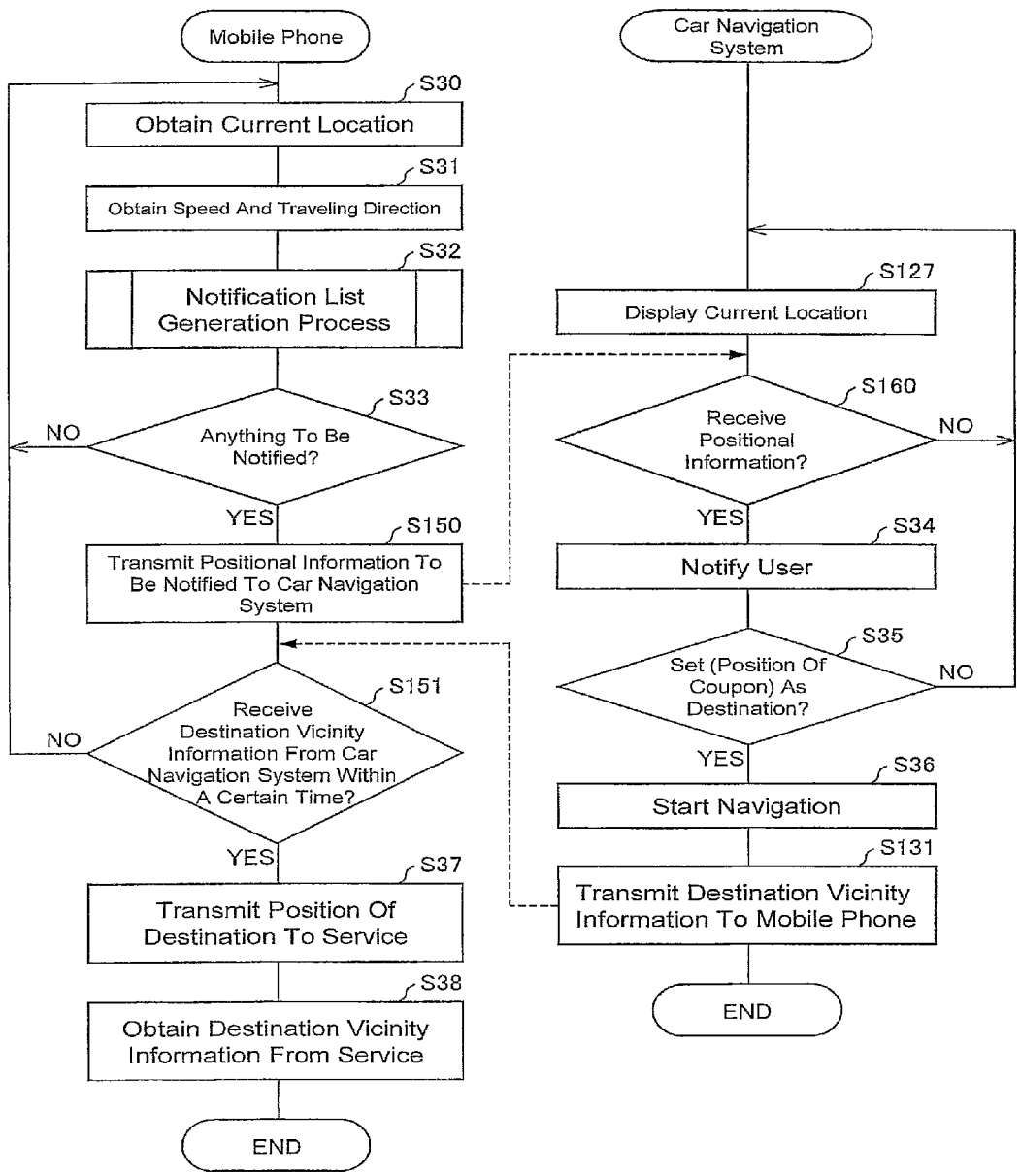

NOTIFICATION DEVICE, NOTIFICATION SYSTEM, METHOD FOR CONTROLLING NOTIFICATION DEVICE, AND COMPUTER READABLE RECORDING MEDIUM HAVING A CONTROL PROGRAM RECORDED THEREUPON

TECHNICAL FIELD

The present invention relates to a notification device and the like which, when the notification device enters an area set on a basis of a spot registered in advance, notifies a user that the notification device has entered such an area.

BACKGROUND ART

In recent years, information of various shops and sightseeing spots are available not just from conventional information media such as television and magazines, but also from information media such as the Internet and like media. However, even if a shop or the like of interest that one would like to go whenever there is an opportunity were found in such information media, it is relatively rare that a person would actually visit that place at a later date.

However, if the person who thought of going to that place whenever there was the opportunity knew that that place is close to where that person currently is, it can be assumed that that person would more likely go to that place.

There conventionally has been a notification device which, when a user approaches a spot registered in advance, notifies the user of that situation. For instance, Patent Literature 1 described below discloses a portable information terminal which notifies a user when a current location of the portable information terminal and a spot registered in advance by the user approaches close within a predetermined distance. Patent Literatures 2 through 5 disclose techniques similar to this.

With use of such a technique, the user can register in advance a spot that the user wishes to go to, to allow knowing that they are close to that spot whenever the user is close to that spot. This makes it easier to drop in at the spot.

Particularly, it is easily possible these years to obtain positional information with a portable terminal, for example by the commercial availability of mobile phones which install a GPS (Global Positioning System) function. Moreover, positional information of stores is becoming more and more available in data format on the Internet and the like.

By registering a plurality of positional information of spots that the user wishes to go to into the portable terminal, the user can drop in at those spots that are close to where the advantageous for the user in that they can readily go to a spot they wanted to go to, and is also advantageous for the store and the like in that many people can drop in at their store or the like.

CITATION LIST

Patent Literature

Patent Literature 1
Japanese Patent Application Publication, Tokukai, No. 2000-112347 A (Publication Date: Apr. 21, 2000)
Patent Literature 2
Japanese Patent Application Publication, Tokukai, No. 2001-241964 A (Publication Date: Sep. 7, 2001)
Patent Literature 3
Japanese Patent Application Publication, Tokukai, No. 2002-044271 A (Publication Date: Feb. 8, 2002)
Patent Literature 4
Japanese Patent Application Publication, Tokukai, No. 2002-159044 A (Publication Date: May 31, 2002)
Patent Literature 5
Japanese Patent Application Publication, Tokukai, No. 2002-350170 A (Dec. 4, 2002)

SUMMARY OF INVENTION

Technical Problem

However, one problem with the conventional technique is that it is troublesome to register the spot. For instance, Patent Literature 1 registers a name of a place as a spot by selecting the name of the place on a map displayed on the display section. With this method, when the user sees such information media and thinks of wanting to go to that spot, trouble is caused to display the map on which the store or the like is displayed. Moreover, a typical map does not display names of small-sized stores. Hence, it is difficult to register such a small-sized store by the foregoing method. Furthermore, the conventional technique requires separately registering just the stores which require notification thereof.

The present invention is accomplished in view of these problems, and its object is to provide a notification device which allows for easily registering a spot to be notified to a user, without requiring the user to selectively register each of spots that the user wishes to go to.

Solution to Problem

In order to solve the problems, a notification device of the present invention is a notification device carrying out notification to a user of the notification device at a time when a current position of the notification device enters within a predetermined area, the notification device including: a data storage section configured to store both of (i) data including positional information and (ii) data including no positional information; identification means for identifying the data including positional information from among the data stored in the data storage section; positional information extraction means for extracting positional information to be used as a standard for setting the predetermined area, the positional information being extracted from among the data identified by the identification means as including the positional information; area setting means for setting the predetermined area on a basis of the positional information extracted by the positional information extraction means; and notification means for carrying out notification to the user of the notification device at a time when a current position of the notification device enters within the predetermined area set by the area setting means.

Moreover, in order to solve the problem, a method of controlling a notification device of the present invention is a method of controlling a notification device, the notification device carrying out notification to a user of the notification device at a time when a current position of the notification device enters within a predetermined area, the method including the steps of: (a) identifying data including positional information from among data stored in a data storage section, the data storage section storing both of (i) the data including positional information and (ii) data including no positional information; (b) extracting positional information to be used as a standard for setting the predetermined area, from among the data identified in the step (a) as including positional information; (c) setting the predetermined area on a basis of the positional information extracted in the step (b); and (d) carrying out notification to the user of the notification device at a time when a current position of the notification device enters within the predetermined area set in the step (c).

According to the configuration or method, data including positional information is identified from among data stored in the data storage section, and the positional information is extracted from the identified data. Thereafter, a predetermined area is set with use of the extracted positional information, and a user is notified based on the predetermined area.

Namely, according to the configuration, the user can receive a notification based on positional information just by carrying out an extremely simple operation of storing data which includes the positional information in a data storage section, without having to distinguish the data which includes the positional information from data which includes no positional information, that is, without being conscious of whether or not the positional information is included in the data. Hence, according to the configuration or method, it is possible to easily register a spot for notification without requiring the user to selectively register each of the spots the user wishes to go to.

Furthermore, in order to attain the object, a notification system of the present invention is a notification system in which a notification device carries out notification to a user of the notification device at a time when a current position of the notification device enters within a predetermined area, the predetermined area being set on a basis of positional information transmitted by a positional information transmission device, the positional information transmission device including: a data storage section configured to store both of (i) data including positional information and (ii) data including no positional information; identification means for identifying the data including positional information from among the data stored in the data storage section; positional information extraction means for extracting positional information to be used as a standard for setting the predetermined area, the positional information being extracted from among the data identified by the identification means as including the positional information; and positional information transmitting means for transmitting the positional information extracted by the positional information extraction means, to the notification device.

According to the configuration, the notification device receives positional information extracted by a positional information extraction device from data stored in the data storage section and identified as including the positional information, and carries out notification to the user with use of the positional information.

Namely, according to the configuration, the user can receive a notification from the notification device based on the positional information just by carrying out an extremely simple operation of storing data including the positional information in a data storage section of a positional information extraction device, without having to distinguish the data including the positional information from data including no positional information. Hence, according to the configuration, it is possible to easily register a spot for notification.

Advantageous Effects of Invention

As described above, the notification device of the present invention includes: a data storage section configured to store both of (i) data including positional information and (ii) data including no positional information; identification means for identifying the data including positional information from among the data stored in the data storage section; positional information extraction means for extracting positional information to be used as a standard for setting the predetermined area, the positional information being extracted from among the data identified by the identification means as including the positional information; area setting means for setting the predetermined area on a basis of the positional information extracted by the positional information extraction means; and notification means for carrying out notification to the user of the notification device at a time when a current position of the notification device enters within the predetermined area set by the area setting means.

Moreover, the method of the present invention of controlling a notification device is a method including the steps of: (a) identifying data including positional information from among data stored in a data storage section, the data storage section storing both of (i) the data including positional information and (ii) data including no positional information; (b) extracting positional information to be used as a standard for setting the predetermined area, from among the data identified in the step (a) as including positional information; (c) setting the predetermined area on a basis of the positional information extracted in the step (b); and (d) carrying out notification to the user of the notification device at a time when a current position of the notification device enters within the predetermined area set in the step (c).

The notification system of the present invention is a notification system in which a notification device carries out notification to a user of the notification device at a time when a current position of the notification device enters within a predetermined area, the predetermined area being set on a basis of positional information transmitted by a positional information transmission device, the positional information transmission device including: a data storage section configured to store both of (i) data including positional information and (ii) data including no positional information; identification means for identifying the data including positional information from among the data stored in the data storage section, positional information extraction means for extracting positional information to be used as a standard for setting the predetermined area, the positional information being extracted from among the data identified by the identification means as including the positional information; and positional information transmitting means for transmitting the positional information extracted by the positional information extraction means, to the notification device.

According to the configuration, the user can receive a notification from the notification device based on the positional information just by carrying out an extremely simple operation of storing data which includes the positional information in a data storage section, without having to distinguish the data which includes the positional information from data which includes no positional information, that is, without being conscious of whether or not the positional information is included in the data, and without having to carry out any operation of selecting a spot to be notified. Hence, this brings about an effect that a spot for notification is easily registered.

For a fuller understanding of the nature and advantages of the invention, reference should be made to the ensuing detailed description taken in conjunction with the accompanying drawings.

BRIEF DESCRIPTION OF DRAWINGS

FIG. 5 is a view illustrating an example of a notification area of the coupon.

FIG. 12 is a view illustrating an example of positional information management data.

FIG. 13 is a view illustrating an example of same-genre management data.

FIG. 14 is a view illustrating an example of a notification list.

FIG. 39 is a flowchart illustrating an example of processes for notification of a store at which a coupon can be used and guiding a route to that store, which processes are carried out by having the mobile phone transmit the coupon to the car navigation system.

DESCRIPTION OF EMBODIMENTS

Embodiment 1

Figure 1:
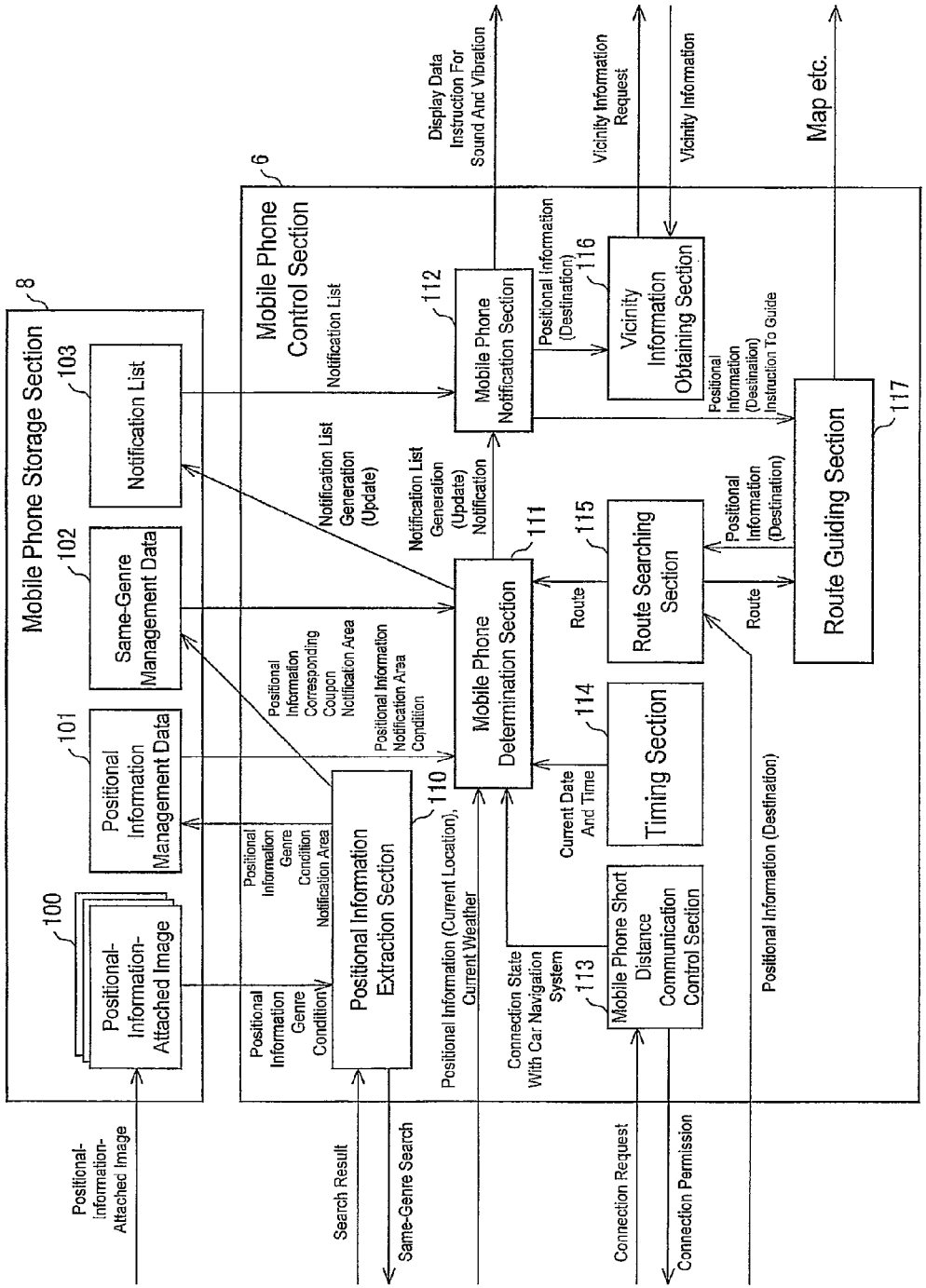
FIG. 1 is a block diagram illustrating an essential configuration of a mobile phone according to one embodiment of the present invention.
Figure 2:
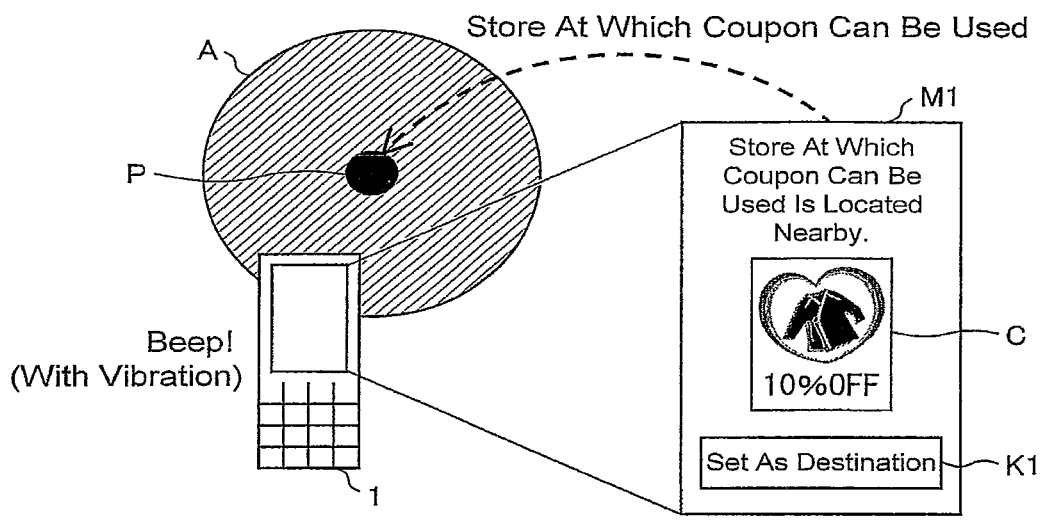
FIG. 2 is a view illustrating an overview of operations carried out by the mobile phone.

One embodiment of the present invention is described below with reference to FIGS. 1 through 25. First described in the present embodiment is an overview of the present invention, with reference to FIG. 2. FIG. 2 is a view illustrating an overview of operations of a mobile phone, of the present invention. As illustrated in the FIG. 2, a mobile phone (notification device, positional information transmission device) 1 of the present invention, upon entering a notification area A set based on a position P of a store at which a coupon can be used, notifies the user of the mobile phone 1 that the store at which the coupon can be used is located nearby.

More specifically, the mobile phone 1 outputs a sound and vibrates, upon entering the notification area A. The mobile phone 1 displays (i) a message M1 notifying that the store at which a coupon can be used is nearby, (ii) an image C of the usable coupon, and (iii) a key K1 for setting the store as a destination of a route to guide.

This allows for the user to recognize that a store at which a coupon stored in the mobile phone 1 can be used is close to a current location of the user. Namely, the mobile phone 1 can increase an opportunity for the user to use the coupon.

This is advantageous for the user in that it is possible to avoid a case of using a store where a coupon cannot be used, although the user is close to a store of a coupon that the user obtained since the user wishes to go to that store however the user is not aware of the current closeness of that store. It is also advantageous for the store in that ability to attract customers by the coupon is enhanced in effect.

Moreover, the example of FIG. 2 assumes that it is possible to have the mobile phone 1 guide a route to the store by selecting the key K1. This allows for the user to access the store at which the coupon can be used extremely easily.

Figure 3:
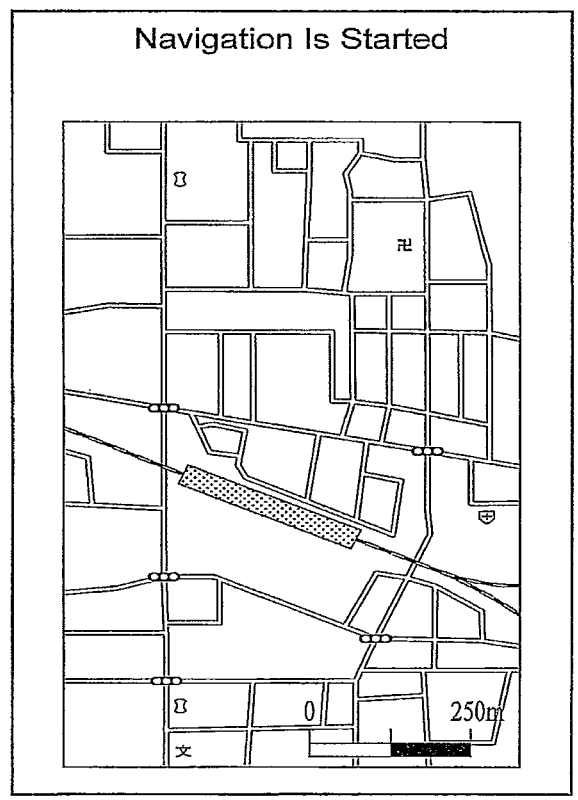
FIG. 3 is a view illustrating an example of a display screen for guiding a route, displayed on the mobile phone.

Upon selection of the key K1, the mobile phone 1 for example displays an image as like an image shown in FIG. 3, and guides the route. FIG. 3 is a view illustrating an example of a display screen for guiding the route. Upon selection of the key K1, a message is displayed as illustrated in FIG. 3 which informs that navigation (route guide) is started, and a map is displayed. Thereafter, a route from a current location to the destination is displayed on this map. This allows for the user to easily access the destination, that is, the store at which the coupon can be used.

The coupon in the present embodiment denotes an image incorporating positional information indicative of a position of a store, facility, or the like. Namely, the user can confirm the details of the coupon (e.g. privilege such as a discount or the like that can be enjoyed by presenting the coupon) by displaying the image of the coupon. By using the positional information incorporated into the coupon, the user can cause the mobile phone 1 to guide the route to the store or facility at which the coupon can be used.

The user of the mobile phone 1, by obtaining such a coupon and storing it in the mobile phone 1, can be aware of the store or the like at which the coupon can be used when the user drops in around the store or the like. Moreover, whenever the user wishes to go to a store or the like indicated on the coupon, the user can easily find its way to the store by having the mobile phone 1 guide the route.

Figure 4:
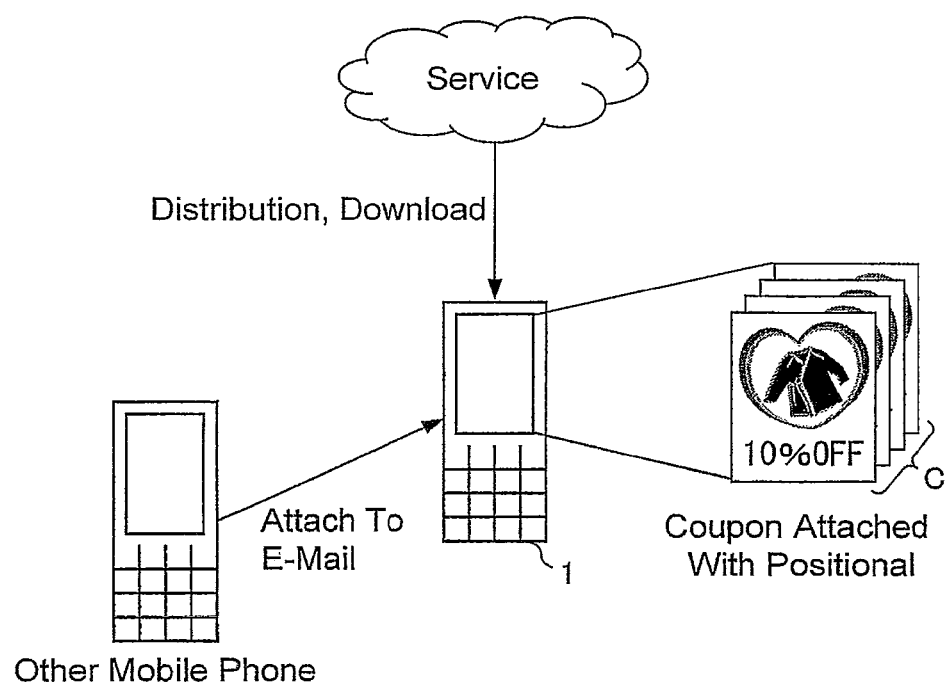
FIG. 4 is a view illustrating an example of how a coupon is obtained by the mobile phone.

For instance, a mode as illustrated in FIG. 4 is one example of how to obtain the coupon. FIG. 4 is a view illustrating one example of how to obtain the coupon. As illustrated in FIG. 4, the mobile phone 1 can obtain the coupon by receiving an e-mail from another mobile phone with the coupon attached to the e-mail. By having the coupon be an image into which the positional information is incorporated, it is possible to send and receive the coupon in a completely same way as sending a regular image (an image in which no positional information is incorporated), as described in the present embodiment. Of course, it is possible to send and receive the coupon with use of communication means such as infrared ray or the like.

Moreover, as illustrated in FIG. 4, the mobile phone 1 can obtain the coupon via distribution by a service or by downloading the coupon. More specifically, the user can download a preferred coupon from a website or the like of the store or the like, and store the coupon in the mobile phone 1. Moreover, it is also possible to distribute a coupon to the mobile phone 1 by having a service attach the coupon to an e-mail, and thereafter have the distributed coupon be automatically stored by the mobile phone 1 or be manually stored by the user of the mobile phone 1. Alternatively, it is also possible to obtain a coupon recorded on a recording medium such as a removable media or the like by copying the coupon onto the mobile phone 1.

Note that the mobile phone 1 notifies the user based on the positional information. Hence, the data including the positional information will not be limited to the coupon as described above; the mobile phone 1 can notify the user based on any data which includes the positional information.

For example, a current location of the mobile phone 1 may be registered as the positional information, or a spot selected on a map can be registered as the positional information. It is preferable that this positional information be stored in the mobile phone 1 so as to be incorporated into an image, so that the positional information can be handled as like the coupon described above. Namely, it is preferable that the mobile phone 1 have a function for incorporating positional information into an image.

Moreover, a typical mobile phone has an address book function for storing telephone numbers. By storing the positional information together with the telephone numbers in this address book, it is possible to receive a notification when the user approaches a house or the like of the person recorded in the address book.

Point of Invention

The mobile phone 1 stores various data other than the coupon. However, notification is carried out to the user for just the coupon. Therefore, it is necessary to manage the coupon and the other data separately. This task of managing the data is a complicated task for the user.

On this account, the mobile phone 1 has a function for identifying the coupon from among the data stored in the mobile phone 1. This allows for automatically identifying the coupon, regardless of how much data other than the coupon is stored in the mobile phone 1.

Therefore, the user of the mobile phone 1 just requires storing their preferred coupon on the mobile phone 1, and has no need to carry out any data management. Moreover, a received coupon may be automatically stored as image data on the mobile phone 1. In this case, the user does not even require operating to store the coupon. This allows for easily using coupons which correspond to where the mobile phone 1 is, without being conscious of the coupon.

How the coupon is identified is not particularly limited. In the present embodiment, the coupon is assumed to be an image into which the positional information is incorporated. On this account, determination of whether or not the image is a coupon may be determined by identifying the image data based on for example an extension of the data and determining whether or not positional information (or information indicating that the positional information is included in the data) is incorporated into header information or the like of the data identified as an image.

Notification Area

The notification area A of the example in FIG. 2 is a round area whose center is the position P of the store at which the coupon can be used. As described above, when the mobile phone 1 enters within this circle, namely when a distance between the mobile phone 1 and the position P becomes shorter than the radius of the circle, the coupon of the store at the position P is displayed on the mobile phone 1.

The radius of the circle can be set as appropriate. This radius can be constant, however in the case of the mobile phone 1, a traveling speed of the user is obtained, whereas in a case where the traveling speed of the user is slow (e.g. if the user is traveling on foot), the radius of the circle is made narrow, and in a case where the traveling speed of the user is fast (e.g. if the user is traveling by car), the radius of the circle is made broad. This is because even if the distance were a distance difficult to drop in on foot, it would be easy to drop in by car.

The mobile phone 1 can be connected with a car navigation device (hereinafter, referred to as car navigation system) for communication, via short distance communication means. The mobile phone 1 determines that the user is traveling by car while the mobile phone 1 is connected to the car navigation system via the short distance communication means, and determines that the user is traveling on foot when the mobile phone 1 is not connected with the car navigation system.

Moreover, the shape of the notification area is not limited to a round shape, and may be of any shape. The following describes this with reference to FIG. 5. FIG. 5 is a view illustrating an example of the notification area. The notification area A1 in (a) of FIG. 5 is of a square shape whose center is the position P. Needless to say, an area of any polygonal shape may serve as the notification area, not limited to the square shape.

Furthermore, as illustrated in (b) and (c) of FIG. 5, a portion of the area of the round or square notification area may be excluded from the notification area. Although a notification area A2 illustrated in (b) of FIG. 5 is a round notification area as similar as FIG. 2, a round area in the vicinity of the position P is excluded from the notification area. Moreover, although a notification area A3 illustrated in (c) of FIG. 5 is a square notification area as like in (a) of FIG. 5, a square area in the vicinity of the position P is excluded from the notification area.

Figure 6:
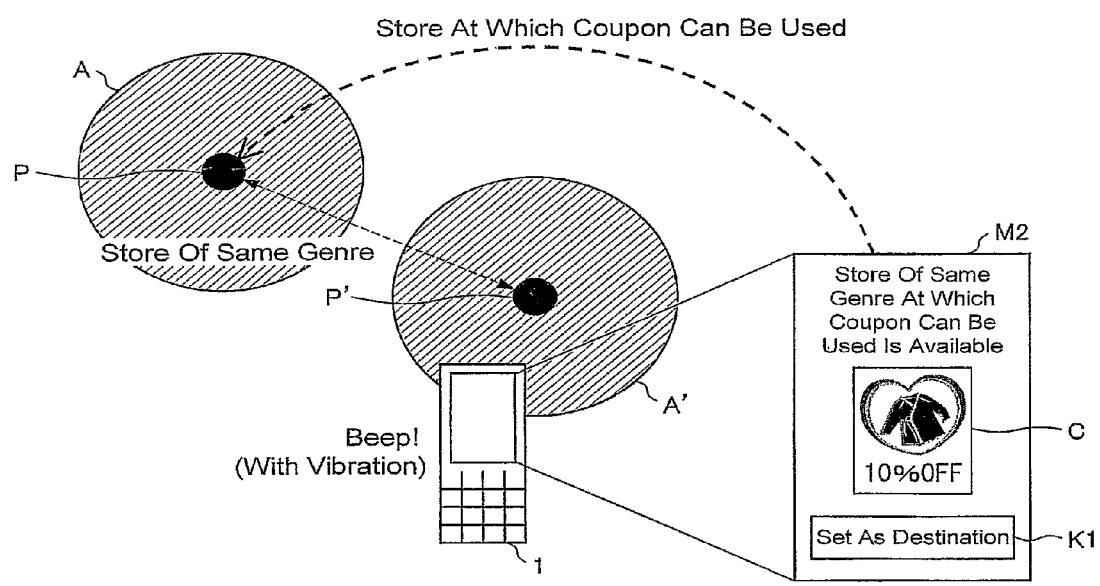
FIG. 6 is a view illustrating an example of setting a notification area at a place away from a location of a store at which a coupon can be used.

Moreover, the notification area does not necessarily have to be one continuous area, and may be set at a place away from the position P of the store at which the coupon can be used. This is described below with reference to FIG. 6. FIG. 6 is a view illustrating an example of setting a notification area at a place separated away from the position P of a store at which a coupon can be used.

In the illustrated example, a notification area A is set whose center is the position P of the store at which the coupon can be used, and further a notification area A' is set whose center is a position P' of a store which is of a same genre as the store at the position P. The "genre" indicates a type of the store. For instance, a restaurant, a dress shop, a beauty salon, and like type may be used as a genre indicative of a type of store.

In this case, when the mobile phone 1 enters the notification area A', the mobile phone 1 displays (i) a message M2 indicating that a store at which a coupon can be used, of a same genre as the store at the position P', is available, (ii) an image C of the usable coupon, and (iii) a key K1 for setting the destination of the route for guiding to that store at which the coupon can be used. Moreover, a sound is outputted and the mobile phone 1 is vibrated to notify this information to the user.

This allows for the user to be aware of a store at which a coupon can be used, of a same genre as a store close to the current location. As a result, it is possible to effectively use the coupon that the user has. For instance, at a time when the user of the mobile phone 1 approaches a dress shop to buy clothing at which a coupon cannot be used, the mobile phone 1 presents the coupon of the dress shop at which the coupon can be used. This allows for the user to change where the user buys the clothing, to the dress shop at which the coupon can be used.

Notification of Store on Route

Figure 7:
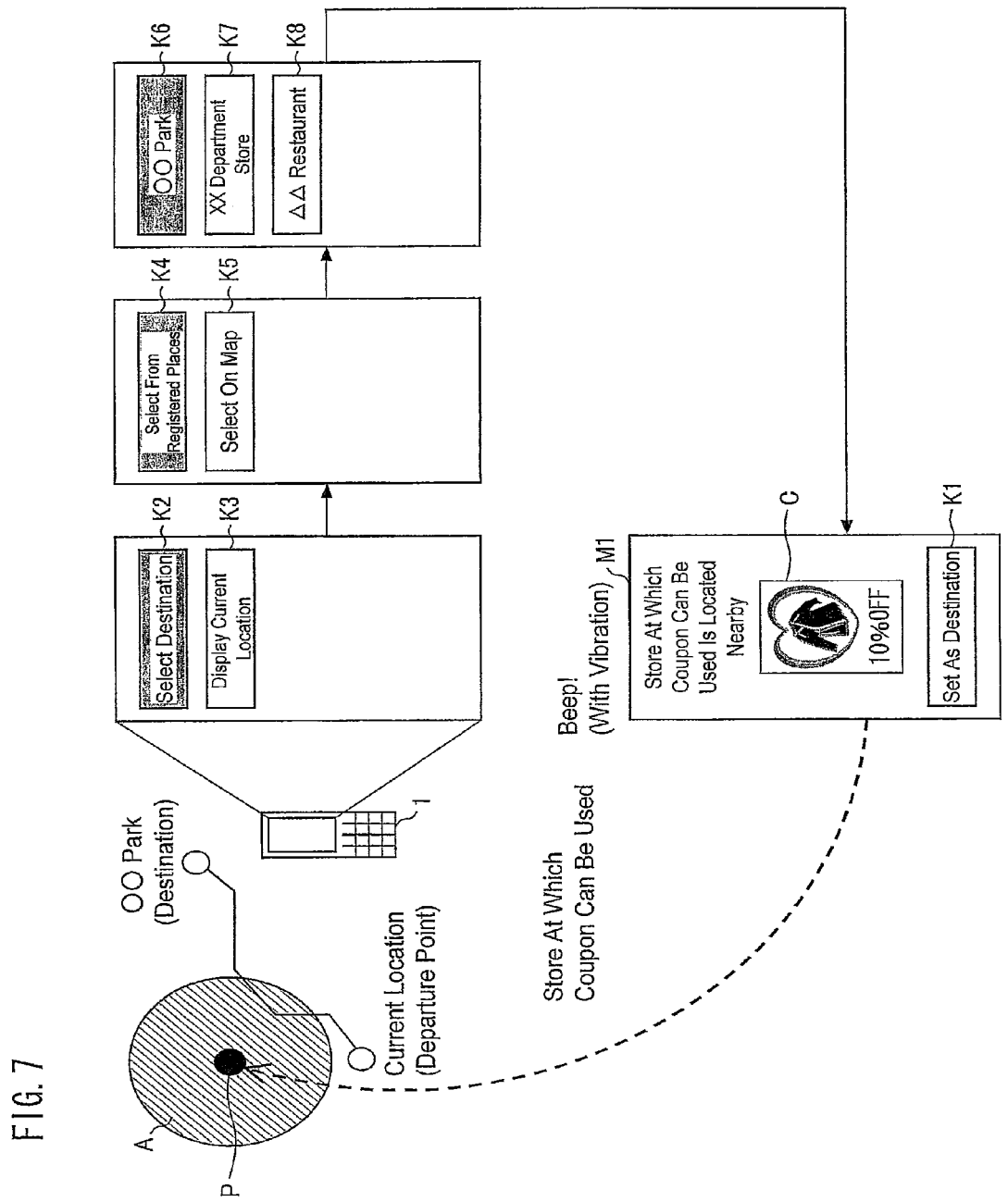
FIG. 7 is a view illustrating an example in which a coupon is presented in a case where a route to a destination is included in a notification area.

The mobile phone 1 presents a coupon also in a case where a route to the destination searched by the route guiding function is included in the notification area. This is described with reference to FIG. 7. FIG. 7 is a view illustrating an example of presenting a coupon in a case where the route to the destination is included in the notification area.

Upon executing a route guiding function of the mobile phone 1, a key K2 for selecting a destination and a key K3 for displaying a current location are displayed, as illustrated in FIG. 7. When the key K2 is selected, a key K4 for selecting a registered location registered in advance as a candidate of the destination and a key K5 for selecting the destination from a map are displayed.

When the key K4 is selected, keys K6 to K8 are displayed, for selecting the registered location. By selecting any one of the keys K6 to K8, the registered location corresponding to the selected key is set as the destination. If the key K5 is selected, a map is displayed and the user designates a location on the map to set as the destination.

Once the destination is determined as such, the mobile phone 1 searches for a route from the current location (or a departure point designated by the user) to the destination (in this example, "○○ park"). In this case, as illustrated in FIG. 7, although the current location is not included in the notification area A, a part of the searched route is included in the notification area A. Namely, in a case where the user travels to the destination along this route, the user will pass near the store of the position P on its way.

In the case where at least a part of the searched route is included in the notification area A, the mobile phone 1 displays the coupon of the store corresponding to the notification area A. In order to notify this to the user, the mobile phone 1 outputs a sound and vibrates. This allows for the user to be aware of the store at which the coupon can be used, and to drop in at that store.

Notification Limit by Condition

Some coupons are set with an expiry date, a valid time zone, day of the week, and the like. Of course, the coupon cannot be used at the store during off-hours of the store. That is to say, merely presenting the coupon of the store when the user approaches near the store would cause cases where the coupon cannot be used even if the user drops in at the store.

Accordingly, the mobile phone 1 determines, at a time when the mobile phone 1 enters the notification area of the store of the coupon, whether or not the coupon can be used from now at the store, and if it is determined that the coupon cannot be used, the mobile phone 1 may be set to not notify the user. This avoids the user from being annoyed by receiving a notification of a coupon that cannot be used, and avoids a situation in which the user cannot use the coupon even though the user dropped in at the store that the mobile phone 1 notified the user of.

Moreover, the mobile phone 1 determines, at the time when the mobile phone 1 enters the notification area of the store of the coupon, whether or not the coupon can be used at the store from now. If it is determined that the coupon cannot be used, the mobile phone 1 may notify the user that although the user is close to a store that the user has a coupon of, that coupon cannot be used at present. This allows for the user to be aware of a location of the store that the user has a coupon of, thereby allowing the user to visit that store on a different day.

Figure 8:
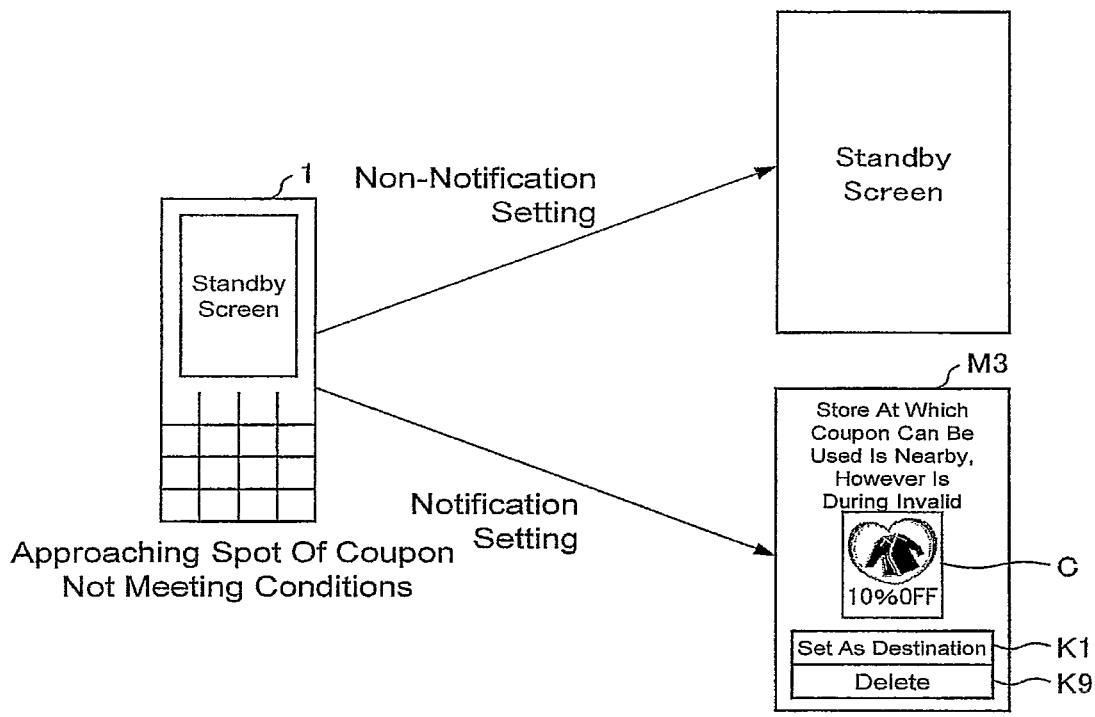
FIG. 8 is a view illustrating examples of a screen displayed on a mobile phone at a time when a spot indicated by the coupon not meeting the conditions is close by, in a case where a coupon that does not meet the conditions (coupon which cannot be used from now) is set to be not notified and a case where that coupon is set to be notified.

One example for instance is an operation example illustrated in FIG. 8. FIG. 8 is a view illustrating examples of a screen displayed on a mobile phone at a time when a spot indicated by the coupon that does not meet the conditions (coupon which cannot be used from now) is close by, in a case where a coupon that does not meet conditions is set to be not notified and a case where that coupon is set to be notified.

As illustrated in FIG. 8, in the case where the mobile phone 1 is set to not notify the user, the display on the mobile phone 1 does not change from the standby screen even when the mobile phone 1 approaches the spot indicated by the coupon that does not meet its conditions (enters the notification area of the coupon).

On the other hand, if it is set to notify the user, (i) a message M3 informing that although the user has approached close to a store that the user has a coupon of, that coupon cannot be used, (ii) a coupon image C, (iii) a key K1 for setting the store of the coupon as a destination, and (iv) a key K9 for deleting the coupon are displayed on the display at a time when the mobile phone 1 approaches the spot indicated by the coupon which does not meet its conditions (enters the notification area of the coupon).

The cases where the coupon cannot be used includes coupons where the coupon cannot be used at all in the future as like an expired valid period, and also includes a case where a current date, time zone, day of week or the like is off a usable date, time zone, day of week or the like of the coupon but can be used at a different date, time and the like. It is preferable to display the key K9 for deleting the coupon in the former case. This makes it possible to delete just the coupon that cannot be used in the future.

Figure 9:
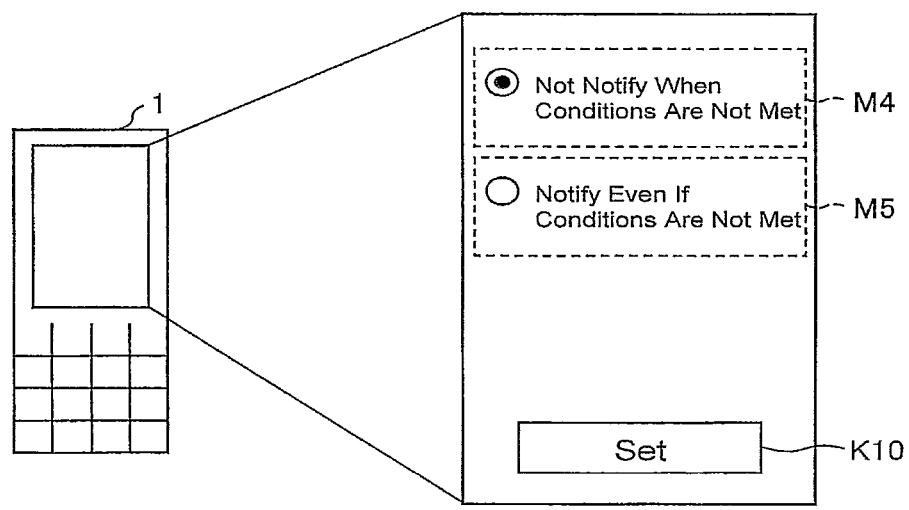
FIG. 9 is a view illustrating an example of a setting screen for switching notification or no notification of coupons that do not meet the conditions.

With the mobile phone 1, it is possible to switch the notifying or not notifying of the coupon that does not meet its conditions by entry operations by the user. At the time of switching, a screen as like the screen illustrated in FIG. 9 is displayed for example. FIG. 9 is a view illustrating an example of a setting screen for switching between the notifying and not notifying of the coupon that does not meet its conditions.

As illustrated in FIG. 9, the screen displays (i) a message M4 to set the coupon that does not meet its conditions to be not notified, (ii) a message M5 to set the coupon that does not meet its conditions to be notified, and (iii) a setting key K10 for setting the switching of the notifying and not notifying. Moreover, a check box is displayed on a left side of each of the message M4 and M5. In the illustrated example, the check box next to M4 is checked. If the setting key K10 is selected at this state, the coupon that does not meet its conditions is set as being not notified.

Displaying List of Coupons

Figure 10:
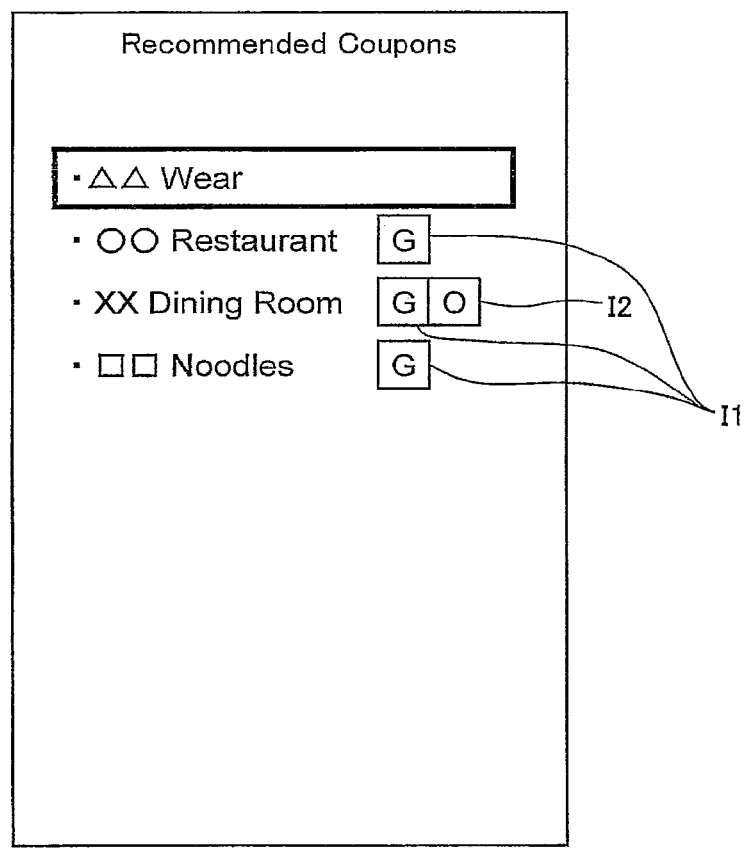
FIG. 10 is a view illustrating an example of a display screen at a time when a list of store names is displayed thereon.

In a case where the current location of the mobile phone 1 or a route searched by the route guiding function is included in notification areas of a plurality of stores (store at which a coupon can be used or store of a same genre as the store at which the coupon can be used), the mobile phone 1 displays a list of names of those stores, as illustrated in FIG. 10 for example. FIG. 10 is a view illustrating an example of a display screen which displays a list of store names.

In the illustrated example, names of four stores are displayed as a list. Namely, these four stores are located near the current location of the mobile phone 1 or near the route to the set destination, and are stores at which a coupon can be used or a store of a same genre as the stores at which the coupon can be used.

Moreover, some displayed store names has icons I1 or I2 attached thereto. The icon I1 indicates that a store of a same genre as that store is located near the current location of the mobile phone 1 or near the route to the set destination. The icon I2 indicates that although a coupon of that store is stored, that coupon cannot be used at present.

Each of the store names displayed in the list can be selected by user operation, and upon selecting a store name, images such as those illustrated in FIGS. 2, 6, and 8 (image C of coupon and image including the message and the like) are displayed.

Hardware Configuration

Figure 11:
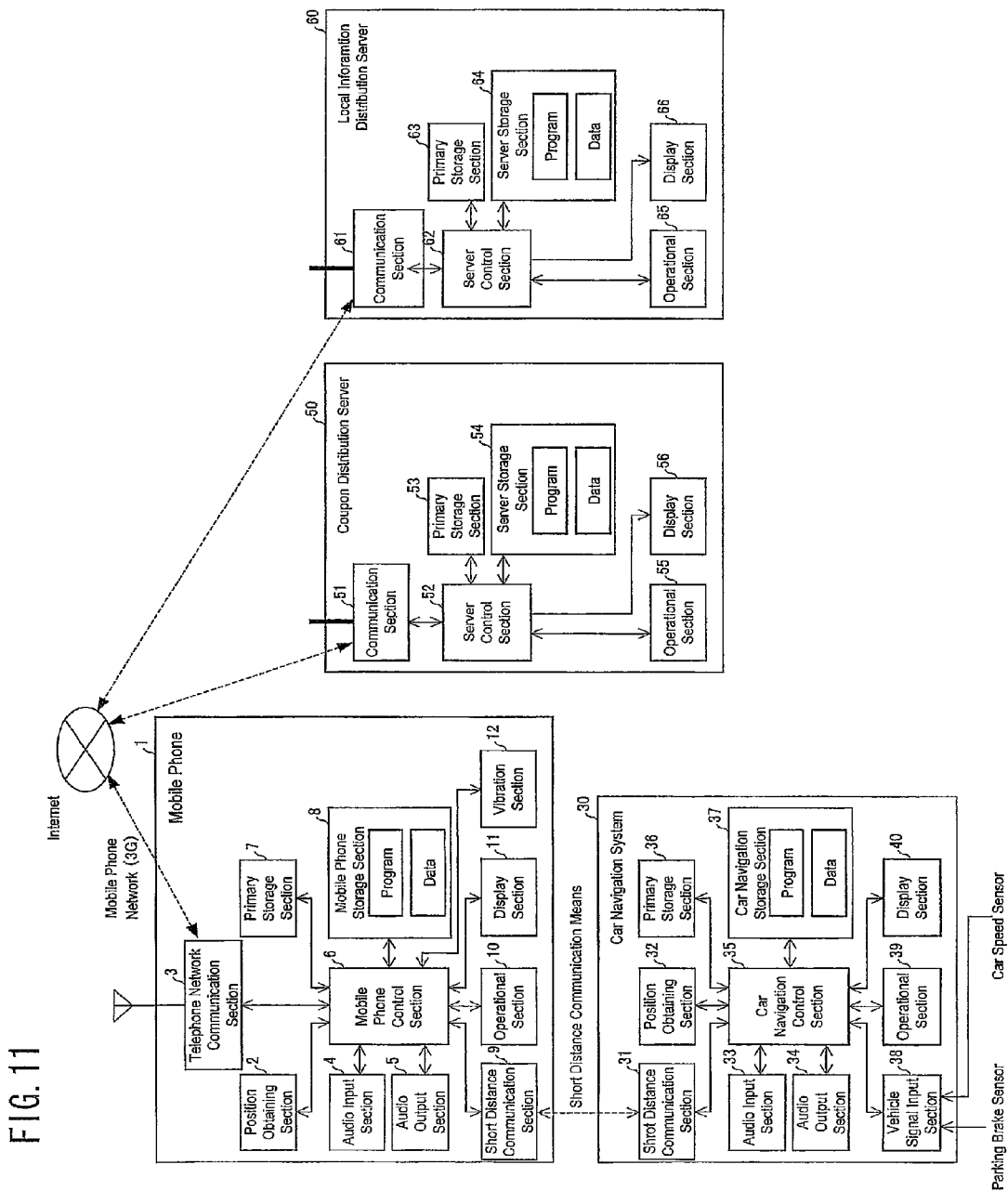
FIG. 11 is a view illustrating an example of hardware configurations of a mobile phone, a car navigation system, a coupon distribution server, and a local information distribution server.

The following description explains a hardware configuration of the mobile phone 1, with reference to FIG. 11. FIG. 11 is a view illustrating an example of the hardware configuration of the mobile phone 1, a car navigation system 30, a coupon distribution server 50, and a local information distribution server 60. The car navigation system 30 is a device connectable with the mobile phone 1 via short distance communication means. The coupon distribution server 50 is a server that distributes coupons to the mobile phone 1, and the local information distribution server 60 is a server that transmits to the mobile phone 1 vicinity information (tourist information, map, information of stores, facilities, and the like) of a point designated by the mobile phone 1.

Configuration of Mobile Phone 1

The mobile phone 1 is a communication terminal including a phone call function, an e-mail transmission function and a GPS function, and is configured communicable with the car navigation system 30 and the coupon distribution server 50. As illustrated in FIG. 11, the mobile phone 1 includes a position obtaining section 2, a telephone network communication section 3, an audio input section 4, an audio output section 5, a mobile phone control section 6, a primary storage section 7, a mobile phone storage section (data storage section) 8, a short distance communication section (communication means) 9, an operational section 10, a display section 11, and a vibration section 12.

The position obtaining section 2 obtains a current position of the mobile phone 1. Namely, the GPS function of the mobile phone 1 is accomplished by the position obtaining section 2. The position obtaining section 2 does not necessarily need to utilize the GPS, and may be any section as long as the current position of the mobile phone 1 can be detected. For example, the position obtaining section 2 may detect the current position of the mobile phone 1 by determining which base station the mobile phone 1 is communicable with.

The telephone network communication section 3 is provided for calling other mobile phones or fixed-line phones, for sending and receiving e-mails, for connecting to the Internet to carry out communication, and the like, via a mobile phone network or like network. As illustrated in FIG. 11, the mobile phone 1 communicates with the coupon distribution server 50 and the local information distribution server 60 via the telephone network communication section 3. More specifically, the telephone network communication section 3 connects with the Internet through the mobile phone network (3G), and communicates with the coupon distribution server 50 and the local information distribution server 60 via the Internet. Each of the phone call function, the Internet connection function, and the communication function with the coupon distribution server 50 or the local information distribution server 60 may be accomplished by separate communication sections.

The audio input section 4 is provided for inputting an audio signal to the mobile phone 1 during for example a phone call or the like, and the audio output section 5 is provided for outputting sound in accordance with an audio signal or the like received by the telephone network communication section 3 during the phone call or the like. Moreover, the audio output section 5 outputs sound and the like serving as a ringtone indicating an incoming phone call or an arrival of an e-mail and the like. The audio input section 4 and the audio output section 5 may be any configuration as long as sound can be inputted and outputted, respectively, and those used in conventional mobile phones and like apparatuses are applicable therein.

The mobile phone control section 6 centrally controls the operation of the mobile phone 1, and may be configured by a CPU or the like. The mobile phone control section 6 operates by having the primary storage section 7 serve as a workspace, which primary storage section 7 is configured by a RAM or the like. Details of the processes carried out by the mobile phone control section 6 are described later.

The mobile phone storage section 8 stores programs and data, as illustrated in FIG. 11. The mobile phone 1 carries out a predetermined operation by having the mobile phone control section 6 read out a program stored in the mobile phone storage section 8 to the primary storage section 7 and thereafter execute that program. Moreover, data of e-mail received by the telephone network communication section 3 and data of telephone numbers or e-mail addresses stored by a user of the mobile phone 1 also are stored in the mobile phone storage section 8. The mobile phone storage section 8 may be configured detachable from the body of the mobile phone 1. Details of the data stored in the mobile phone storage section 8 are described later.

The short distance communication section 9 is provided for allowing the mobile phone 1 to communicate with other devices, and is used for communicating with the car navigation system (notification device, external device) 30 for example. The mobile phone 1 determines that the mobile phone 1 is traveling by car while the mobile phone 1 is connected with the car navigation system 30 for communication via the short distance communication section 9, and determines that the mobile phone 1 is traveling on foot if the mobile phone 1 is not connected therewith.

Accordingly, in the mobile phone 1, the short distance communication section 9 is to carry out Bluetooth (registered trademark) communication. Bluetooth communication allows for sufficiently carrying out communication between a mobile phone 1 and the car navigation system 30, which mobile phone 1 is held by a user seated in a seat of a typical passenger car. Moreover, its communicable range is not too broad; it is not likely that the communicable range reaches a mobile phone 1 that is present outside the car. Although Bluetooth communication is capable of communicating with equipment within an area having a radius of approximately 100 m at the most, in the embodiment, the Bluetooth communication is set so as to be communicable with equipment within an area having a radius of approximately 10 m.

The communication system of the short distance communication section 9 is not limited to the Bluetooth communication. For instance, ZigBee (registered trademark), UWB (Ultra Wide Band) or the like may be employed, or IEEE802.11 wireless such as Wi-Fi (registered trademark) or the like may be employed. Moreover, the mobile phone 1 and the car navigation system 30 may be connected in any way as long as they are configured communicable with each other, and may be connected by wired connection.

The operational section 10 is provided for enabling the user of the mobile phone 1 to enter operations to the mobile phone 1, and is not particularly limited as long as the user can enter their desired operation. The operational section 10 in the embodiment is assumed to be configured as operational keys provided on a surface of a body of the mobile phone 1.

More specifically, the operational section 10 includes a plurality of operational keys including various menu keys for displaying, on the display section 11, menu screens related to e-mails, menu screens related to Internet connection, and like menu screens, keys for entering start or end of a phone call, up-down left-right direction keys for selecting items displayed on the display section 11, an enter key for determining a selected item, character enter keys for entering numbers and letters, a switching key for switching the characters to be entered, and like keys. The operational section 10 may be configured on the display section 11, as a touch panel system which detects a touch on the screen as an entry operation.

The display section 11 displays an image in accordance with an instruction provided from the mobile phone control section 6. The display section 11 is not particularly limited, and can be any display as long as it displays an image in accordance with an instruction from the mobile phone control section 6. The display section 11 may be configured by a LCD (Liquid Crystal Display) display panel, an EL (Electro Luminescence) display panel, or like display panel.

The vibration section 12 vibrates in accordance with an instruction from the mobile phone control section 6. The vibration by the vibration section 12 causes the entire mobile phone 1 to vibrate (vibration). By the vibration of the vibration section 12, notification to the user such as that the user has entered the notification area or that a call is received is carried out.

Configuration of Car Navigation System 30

The car navigation system 30 is a device which displays a map and guides a route to a destination. As illustrated in FIG. 11, the car navigation system 30 includes a short distance communication section 31, a position obtaining section 32, an audio input section 33, an audio output section 34, a car navigation system control section 35, a primary storage section 36, a car navigation system storage section 37, a vehicle signal input section 38, an operational section 39, and a display section 40.

The short distance communication section 31 is provided for communicating with the short distance communication section 9 of the mobile phone 1. Hence, the short distance communication section 31 is configured so as to be communicable in an identical communication system as that of the short distance communication section 9 of the mobile phone 1. In the present embodiment, it is assumed that the short distance communication section 9 of the mobile phone 1 is carried out by Bluetooth communication, so therefore the short distance communication section 31 of the car navigation system 30 is also configured to be capable of Bluetooth communication.

The position obtaining section 32 obtains a current position of the car navigation system 30 (i.e. current location of the car in which the car navigation system 30 is installed) with use of the GPS. The car navigation system 30, based on this current location, displays a map of the vicinity of the current location on the display section 40, and displays the current position of the car on the map in a superposed manner.

The audio input section 33 is provided for inputting sound to the car navigation system 30, and is configured of a microphone for example. With the car navigation system 30, operations can be entered through the operational section 39, and also operations can be entered by sound through the audio input section 33.

The audio output section 34 outputs sound in accordance with instructions from the car navigation system control section 35, and is configured of a speaker for example. Voices or the like for guiding a route are outputted from the audio output section 34, for example.

The car navigation system control section 35 centrally controls operations of the car navigation system 30, and is configured of a CPU or the like. The car navigation system control section 35 operates by having a primary storage section 36 made up of a RAM or the like serve as a workspace.

The car navigation system storage section 37 stores programs and data as illustrated in FIG. 11. The car navigation system 30 carries out a predetermined operation by the car navigation system control section 35 reading out a program stored in the car navigation system storage section 37 to the primary storage section 36 and thereafter executing that program. Moreover, the car navigation system storage section 37 also stores data such as (a) map data and (b) audio data for outputting sound. The car navigation system storage section 37 may be configured detachable from the body of the car navigation system 30.

The vehicle signal input section 38 receives input of (i) a detection result of a parking brake sensor which detects whether or not the parking brake is applied and (ii) a detection result of a car speed sensor which detects a car speed, and sends these detection results to the car navigation system control section 35.

The operational section 39 allows for the user to enter operations to the car navigation system 30, and the display section 40 displays, in accordance with instructions provided from the car navigation system control section 35, an input screen for setting a destination, a map, a route to the destination and the like. The car navigation system 30 is provided so that entry is carried out by a so-called touch panel system, in which the operational section 39 detects a touch to the display section 40 as operation of an entry. The operational section 39 may be any configuration as long as it can accept an entry operation by the user, and for example the operational section 39 may be configured of a plurality of input buttons.

Configuration of Coupon Distribution Server 50 and Local Information Distribution Server 60

The coupon distribution server 50 is a server which distributes coupons to the mobile phone 1, and includes a communication section 51, a server control section 52, a primary storage section 53, a server storage section 54, an operational section 55, and a display section 56, as illustrated in FIG. 11. The local information distribution server 60 is a server which distributes local information to the mobile phone 1, and includes a communication section 61, a server control section 62, a primary storage section 63, a server storage section 64, an operational section 65, and a display section 66, as illustrated in FIG. 11.

The communication sections 51 and 61 are provided for communicating with the telephone network communication section 3 of the mobile phone 1. Hence the communication section 51 and 61 are configured to be communicable in a same communication system as that of the telephone network communication section 3 of the mobile phone 1. In the present embodiment, the telephone network communication section 3 of the mobile phone 1 is assumed to communicate via the Internet. Hence, the communication sections 51 and 61 are also configured to be communicable via the Internet.

The server control section 52 centrally controls the operation of the coupon distribution server 50, and the server control section 62 centrally controls the operation of the local information distribution server 60. These control sections are configured by a CPU or the like. The server control section 52 operates by having the primary storage section 53 serve as a workspace, which primary storage section 53 is configured by a RAM or the like. The server control section 62 operates by having the primary storage section 63 serve as a workspace, which primary storage section 63 is configured by a RAM or the like.

More specifically, the server control section 52 of the coupon distribution server 50, upon receiving a coupon distribution request from the mobile phone 1, transmits the requested coupon to the mobile phone 1. Moreover, the server control section 52 automatically distributes coupons to terminals registered as distribution destinations of coupons. That is to say, in a case where the mobile phone 1 is registered in the coupon distribution server 50 as a coupon distribution designation, the server control section 52 distributes the coupon to the mobile phone 1 whenever there is a coupon to be distributed.

Moreover, the server control section 62 of the local information distribution server 60, upon receiving the positional information and a vicinity information request from the mobile phone 1, distributes to the mobile phone 1 information considered as useful when the user goes to a spot specified by the received positional information, such as information of stores, facilities, or tourist sites located around that spot, or a map around the spot. These information may be stored in advance in the server storage section 64, or may be obtained by having the server control section 62 retrieve the information via the Internet.

The server storage sections 54 and 64 store programs and data as illustrated in FIG. 11. The coupon distribution server 50 carries out a predetermined operation by having the server control section 52 read out a program stored in the server storage section 54 to the primary storage section 53 and thereafter execute that program. Similarly, the local information distribution server 60 carries out a predetermined operation by having the server control section 62 read out a program stored in the server storage section 64 to the primary storage section 63 and thereafter execute that program.

The operational section 55 is provided for entering operations to the coupon distribution server 50, and the display section 56 displays an image in accordance with instructions from the server control section 52. This allows for entering operations to the coupon distribution server 50 while confirming the image displayed on the display section 56. The same applies with the operational section 65 and the display section 66 of the local information distribution server 60.

As described above, the present embodiment describes an example configuring each of blocks of the mobile phone 1, the car navigation system 30, the coupon distribution server 50, and the local information distribution server 60, particularly the mobile phone control section 6, the car navigation system control section 35, and the server control sections 52 and 62, by software.

Namely, the mobile phone 1, the car navigation system 30, the coupon distribution server 50, and the local information distribution server 60 each includes a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data.

The object of the present invention can also be achieved by mounting to the mobile phone 1, car navigation system 30, coupon distribution server 50, and local information distribution server 60 a computer-readable storage medium containing control program code (executable program, intermediate code program, or source program) for the mobile phone 1, car navigation system 30, coupon distribution server 50, and local information distribution server 60, which is software realizing the aforementioned functions, in order for the computer (or CPU, MPU) to retrieve and execute the program code in the storage medium.

The storage medium may be, for example, a tape, such as a magnetic tape or a cassette tape; a magnetic disk, such as a floppy (Registered Trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The mobile phone 1, car navigation system 30, coupon distribution server 50, and local information distribution server 60 may be arranged to be connectable to a communications network so that the program code may be delivered over the network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth, 802.11 wireless, HDR, mobile telephone network, satellite line, or terrestrial digital network.

The functions of the mobile phone 1, car navigation system 30, coupon distribution server 50, and local information distribution server 60 may be achieved by a carrier wave or data signal transmission in which the program code is embodied electronically. The mobile phone control section 6, car navigation system control section 35, and the server control sections 52 and 62 are realized by way of hardware.

More Specific Configuration of Mobile Phone 1

A more specific configuration of the mobile phone 1 is described with reference to FIG. 1. FIG. 1 is a block diagram illustrating an essential configuration of the mobile phone 1. As illustrated in FIG. 1, the mobile phone storage section 8 stores a positional-information-attached image 100, positional information management data 101, same-genre management data 102, and a notification list 103.

The positional-information-attached image 100 is an image into which the positional information is incorporated, and corresponds to the aforementioned coupon. Although the positional-information-attached image 100 is stored in the mobile phone storage section 8 without being particularly distinguished from other data, the positional-information-attached image 100 is automatically identified from among the data stored inside the storage section 8 and is used for notification to the user.

The positional information management data 101 is data which manages positional information and the like used for notifying the user that the user is approaching the store or the like indicated by the positional-information-attached image 100. Other than positional information, condition, and genre extracted from the positional-information-attached image 100, the positional information management data 101 manages a notification area and the like based on the positional information. Details thereof are described later.

The same-genre management data 102 is data which manages positional information or like information used for notifying the user that the user is near a store or the like that is of a same genre as the store or the like indicated by the positional-information-attached image 100. Other than the positional information of a store of the same genre, the genre, and the information indicative of the corresponding positional-information-attached image 100, the same-genre management data 102 manages a notification area and the like that is set based on the positional information. Details thereof are described later.

The notification list 103 is data which lists the positional information determined as to be notified to the user from among the positional information which is managed by the positional information management data 101 or the same-genre management data 102. The mobile phone 1 notifies the user based on this notification list 103.

Moreover, as illustrated in FIG. 1, the mobile phone control section 6 includes a positional information extraction section (identification means, positional information extraction means, related positional information obtaining means) 110, a mobile phone determination section (area setting means, route determination means, condition determination means, relation determination means, boarding determination means, traveling speed obtaining means, approach determination means) 111, a mobile phone notification section (notification means) 112, a mobile phone short distance communication control section (positional information transmitting means) 113, a timing section 114, a route searching section (route setting means) 115, a vicinity information obtaining section 116, and a route guiding section (guiding means) 117.

The positional information extraction section 110 identifies data which includes the positional information, from among the data stored in the mobile phone storage section 8, and extracts the positional information and like information from the identified data. Thereafter, the positional information extraction section 110 generates the positional information management data 101 and the same-genre management data 102 with use of the extracted positional information and like information.

The mobile phone determination section 111 confirms whether or not the current position of the mobile phone 1 is within the notification area that is included in the positional information management data 101 or same-genre management data 102, and adds the positional information and like information that is within the notification area to the notification list 103.

The mobile phone notification section 112 notifies the user in accordance with the positional information and like information included in the notification list 103.

The mobile phone short distance communication control section 113 controls communication via a short distance communication section 9 (see FIG. 11). In the present embodiment, the mobile phone 1 is assumed to communicate with the car navigation system 30 via the short distance communication section 9. Hence, the mobile phone short distance communication control section 113 establishes a communication connection between the mobile phone 1 and the car navigation system 30 by returning a connection permission upon receiving a connection request from the car navigation system 30. The connection request may be sent from the mobile phone 1.

The timing section 114 has a function to serve as a clock and a calendar, and transmits a current date and time and day of the week to the mobile phone determination section 111.

The route searching section 115 searches a route between spots indicated by the inputted positional information, and outputs information indicative of a route which is a search result thereof. More specifically, the route searching section 115, upon receiving input of positional information indicating a position of a destination spot, outputs information indicating a route from the current location obtained by the position obtaining section 2 (see FIG. 11), to the destination spot. Moreover, upon receiving input of positional information of each of a departure spot and a destination spot, the route searching section 115 outputs information indicative of a route from the departure spot to the destination spot. In accordance with this information indicative of the route, route guiding and the like is carried out. Note that one or a plurality of spots passed through in the route may be included between the departure spot and the destination spots.

The vicinity information obtaining section 116 obtains vicinity information of the spot indicated by the inputted positional information. The vicinity information may be stored in the mobile phone storage section 8, or may be obtained from the local information distribution server 60 by sending a vicinity information request via the telephone network communication section 3 for example.

The route guiding section 117 guides the user along the route searched by the route searching section 115. More specifically, the route guiding section 117 sends the positional information of the departure spot and the destination spot to the route searching section 115, and receives its route from the departure spot to the destination spot. Thereafter, a map around the current location is read out from the mobile phone storage section 8 and is displayed on the display section 11, to display the route in a superposed manner on the displayed map. Further, an audio guide is carried out by the audio output section 5 so that the user can follow the displayed route. When the user enters the notification area of the coupon, the route guiding execution section 117 carries out a process for guiding the user to the store of the coupon.

Details of Positional Information Management Data 101

The following describes details of the positional information management data 101, with reference to FIG. 12. FIG. 12 is a view illustrating an example of the positional information management data 101. As illustrated in FIG. 12, the positional information management data 101 includes the following seven items: "No.", "Name", "Positional Information", "Notification Area (foot)", "Notification Area (car)", "Genre" and "Condition".

"No." is an administration number for managing the positional information. The positional information extracted from one coupon (positional-information-attached image 100) is accompanied with one administration number. In the following description, a set of data of the "Name", "Positional Information", "Notification Area (foot)", "Notification Area (car)", "Genre", and "Condition" corresponding to one administration number in the positional information management data 101 is called a positional information set. That is to say, the positional information management data 101 is an assembly of the positional information sets.

The "Name" is a name to identify a corresponding coupon, and for example, a name of a facility of the coupon or a file name of an image of the coupon may be used as the "Name".

The "Positional Information" is information indicative of the position of the store of the coupon, and is obtained by extracting information which is incorporated as header information or the like of the image of the coupon. The "Positional Information" is not particularly limited as long as the mobile phone 1 can recognize the spot indicated by the information, and may be data indicative of a longitude and latitude, as illustrated in FIG. 12.

The "Notification Area (foot)" and "Notification Area (car)" each indicates an area in which the presence of the coupon is notified to the user. The "Notification Area (foot)" indicates a notification area applied when traveling on foot, and the "Notification Area (car)" indicates the notification area applied when traveling by car. These notification areas are set based on the "Positional Information".

The "Genre" indicates a genre of that coupon, and is obtained by extracting data incorporated into the image of the coupon, together with the positional information.

The "Condition" indicates conditions for using the coupon, and is obtained by extracting data incorporated into the image of the coupon together with the positional information. The "Condition" may be any condition as long as it indicates conditions for using the coupon. For instance, as illustrated in FIG. 12, a period, a time zone, a day of the week, weather, and the like may serve as the "Condition". The weather is used as a "Condition" for facilities or events that are effected by the weather, such as outdoor sports facilities and watching outdoor sports.

Details of Same-Genre Management Data 102

Next described are details of the same-genre management data 102, with reference to FIG. 13. FIG. 13 is a view illustrating an example of the same-genre management data 102. As illustrated in FIG. 13, the same-genre management data 102 includes the following seven items: "No.", "Name", "Positional Information", "Notification Area (foot)", "Notification Area (car)", "Genre", and "Corresponding Stored Coupon No.".

The "No." is an administration number for managing the same-genre management data, and one administration number is assigned to one same-genre store. The same-genre store is a store of a genre same as that of the store of a coupon included in the positional information management data 101. Stores of other coupons in the positional information management data 101, stores retrieved from map information (e.g. map information for route guiding) stored in the mobile phone storage section 8, or stores detected by searching on the Internet or the like, serve as the same-genre stores.

The "Name" is a name for identifying a corresponding same-genre store, and for example a name of the corresponding store may be used as the "Name". The "Positional Information" is information indicative of the position of the same-genre store, and is obtained from data stored in the mobile phone storage section 8 such as the positional information management data 101, or is obtained via the Internet.

The "Notification Area (foot)" and the "Notification Area (car)" indicate areas for notifying the user of the presence of a coupon corresponding to the same-genre store when the user approaches the same-genre store; the "Notification Area (foot)" indicates the notification area applied when traveling on foot, and "Notification area (car)" indicates the notification area applied when traveling by car.

The "Genre" indicates the genre of the same-genre store. Furthermore, the "Corresponding Stored Coupon No." indicates the coupon corresponding to the same-genre store, namely, indicates the "No." in the positional information management data 101 of the coupon to be notified to the user when the user enters the notification area of the same-genre store.

Details of Notification List 103

Next described are details of the notification list 103, with reference to FIG. 14. FIG. 14 is a view illustrating an example of the notification list 103. As illustrated in FIG. 14, the notification list 103 includes the following seven items: "No.", "Name", "Positional Information", "Same-Genre Flag", "Condition NG Flag", "Genre", and "Condition".

"No." is an administration number for managing the coupon determined as to be notified to the user, and one coupon is assigned with one administration number.

The "Name" indicates a store name of the coupon, and the "Name" in the positional information management data 101 is used as the "Name" in the notification list 103.

Similarly, with the "Positional information", the "Positional Information" in the positional information management data 101 is used as the "Positional Information" of the notification list 103.

The "Same-Genre Flag" indicates that the same-genre management data 102 manages a store of the same genre therein. In the illustrated example, a circle is provided in the "Same-Genre Flag" column in cases where there is a store of the same genre and the mobile phone 1 has entered the notification area of the same-genre store. The coupon which has a corresponding store of the same genre is not only notified when the mobile phone 1 enters the notification area of the coupon, but also is notified when the mobile phone 1 enters a notification area of the same-genre store.

The "Condition NG Flag" is a flag indicating that the user is notified even if the conditions do not meet. In the illustrated example, a circle is provided in the "Condition NG Flag" column of the coupons which are notified even if the conditions do not meet.

The "Genre" indicates the genre of the store identified by the positional information, and the "Condition" indicates the condition for using the coupon at that store. The "Genre" and "Condition" of the positional information management data 101 are used as the "Genre" and "Condition" of the notification list 103, respectively.

Generation Process of Positional Information Management Data 101

Figure 15:
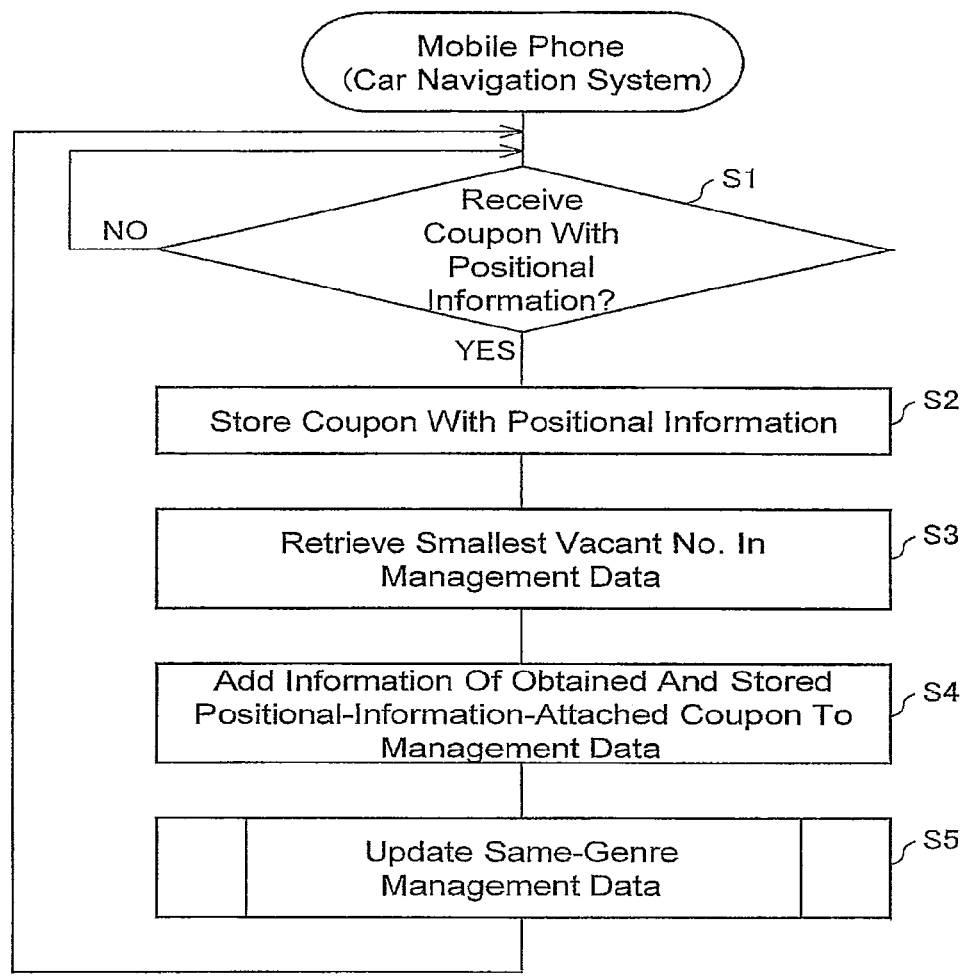
FIG. 15 is a flowchart illustrating an example of processes for generating positional information management data.

The following description deals with procedures for generating the positional information management data 101, with reference to FIG. 15. FIG. 15 is a flowchart illustrating an example of processes carried out to generate the positional information management data 101. The following description describes an example of the mobile phone 1 generating the position information management data 101, however the position information management data 100 may be generated by the car navigation system 30.

In a case where the car navigation system 30 generates the positional information management data 101 and the mobile phone 1 notifies of the coupon, the car navigation system 30 transmits the generated positional information management data 101 to the mobile phone 1. Moreover, in a case where the car navigation system 30 generates the positional information management data 101 and further notifies the user of the coupon, no communication is required with the mobile phone 1.

The mobile phone 1 receives coupons including positional information, by various modes as illustrated in FIG. 4 (YES in S1), and stores the received coupon into the mobile phone storage section 8 (S2). Images other than coupons which do not include positional information are also received (obtained) in the same modes as the coupons, and are stored in the mobile phone storage section 8 similarly with the coupons. Namely, the mobile phone 1 obtains the coupons and also images other than the coupons in a same manner, and stores them all in the mobile phone storage section 8.

In the present embodiment, when data is stored in the mobile phone storage section 8, the positional information extraction section 110 confirms whether or not the positional information is included in the header information of the stored data. In a case where the positional information is included in the header information, the positional information extraction section 110 determines that the data is a coupon including the positional information.

The generation process of the positional information management data 101 may be carried out at a timing in which data is stored in the mobile phone storage section 8, may be carried out at a timing in which a specific application is started up on the mobile phone 1, or may be carried out at predetermined time intervals set in advance. In a case where the process is carried out at the predetermined time intervals set in advance, the positional information extraction section 110 identifies data including the positional information per predetermined time, from among data stored in the mobile phone storage section 8.

Next, the positional information extraction section 110, upon determining that the data stored in the mobile phone storage section 8 is a coupon, retrieves a smallest No. from among vacant No.s ("No." in which no positional information or the like is stored) of the positional information management data 101 (S3).

Thereafter, the positional information extraction section 110 adds various information extracted from the coupon to the vacant No. retrieved in S3 (S4). More specifically, the positional information extraction section 110 extracts the "Positional Information", "Genre", and "Condition" incorporated as the header information of the coupon and adds these information to the positional information management data 101, and thereafter adds the file name of the coupon as its "Name" to the positional information management data 101. Moreover, the "Notification Area (foot)" and "Notification Area (car)" are generated based on the "Positional Information", and are added to the positional information management data 101.

Furthermore, the positional information extraction section 110 performs an update process of the same-genre management data, to update the same-genre management data 102 (S5). In S5, if the same-genre management data 102 is yet to be generated, the positional information extraction section 110 not updates but generates the same-genre management data 102.

Generation Process of Same-Genre Management Data 102

Figure 16:
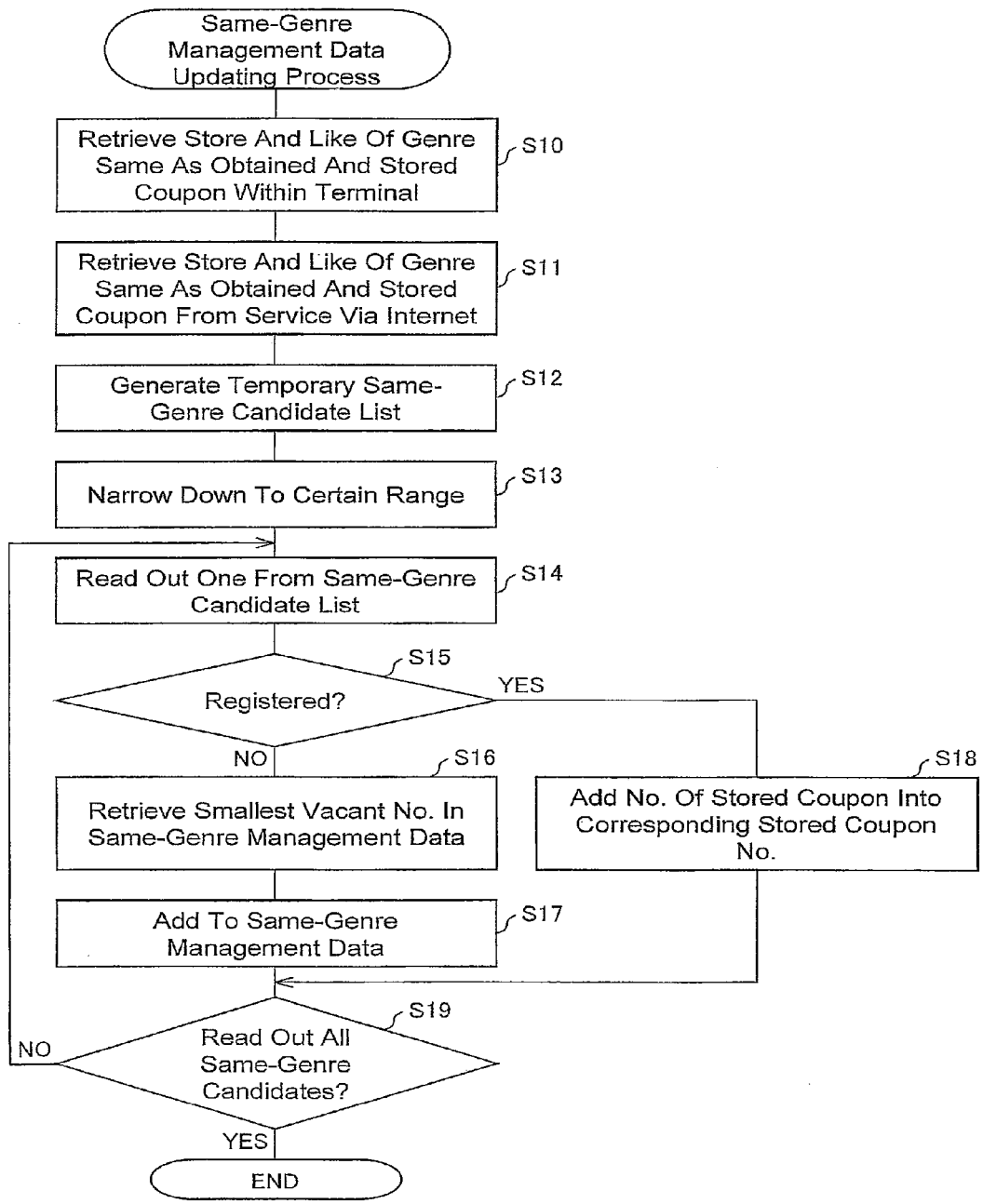
FIG. 16 is a flowchart illustrating an example of processes for generating same-genre management data.

The following description explains procedures for generating (updating) the same-genre management data 102, with reference to FIG. 16. FIG. 16 is a flowchart illustrating an example of generating the same-genre management data 102. As described above, the process of generating the same-genre management data 102 is a process carried out in S5 of the flowchart illustrated in FIG. 15.

First, the positional information extraction section 110 retrieves, within the mobile phone 1, information of stores and the like of the same genre as the coupon obtained and stored in S1 and S2 of FIG. 15 (including the positional information of the stores and the like) (S10). An example of the information of the store and the like which is stored in the mobile phone 1 is the positional information management data 101. Other than this, for instance information of stores and the like provided in maps used for guiding a route by the route guiding section 117 may also be used. In the present embodiment, information of the stores and the like of a same genre as that of coupons stored in the mobile phone storage section 8 are called same-genre candidates. Furthermore, the positional information extraction section 110 retrieves the same-genre candidates from map information stored in the mobile phone storage section 8 and from a service via the Internet (S11).

The positional information extraction section 110 generates a temporary same-genre candidate list which includes the same-genre candidates retrieved in the processes S10 and S11 (S12). The list generated in this step includes the same-genre candidates retrieved by searching on the Internet. Hence, the list includes the same-genre candidates which are positioned far away from the current position, which causes a fear that the list becomes meaninglessly large.

Accordingly, the positional information extraction section 110 narrows down the same-genre candidates that are included in the temporary same-genre candidate list (S13). The narrowing down is carried out by, for example, extracting the same-genre candidates that are within a certain distance from the current position of the mobile phone 1, which current position is obtained by the position obtaining section 2.

Next, the positional information extraction section 110 reads out one same-genre candidate from the generated temporary same genre-candidate list (S14). Thereafter, the positional information extraction section 110 confirms whether or not the same-genre candidate read out is already registered in the same-genre management data 102 (S15).

If the same-genre candidate read out is unregistered in the same-genre management data 102 (NO in S15), the positional information extraction section 110 retrieves a smallest vacant No. of the same-genre management data 102 (S16). Thereafter, the positional information extraction section 110 adds the information read out to the retrieved vacant No. (S17), and proceeds to the process of S19. The information added here are the "Name", "Positional Information", "Genre", and "Corresponding Stored Coupon No.". Moreover, the positional information extraction section 110 generates and adds the "Notification Area (foot)" and "Notification Area (car)" based on the "Positional Information" (see FIG. 13).

On the other hand, if the same-genre candidate read out in S15 is registered in the same-genre management data 102 (YES in S15), the positional information extraction section 110 reads out the "No." of the coupon from the positional information management data 101 obtained and stored in S1 and S2 of FIG. 15 and adds this to the "Corresponding Stored Coupon No." of the same-genre store already registered in the same-genre management data 102 (S18). This causes the presence of the coupon to be notified to the user when the user enters the notification area of this same-genre store. Once the process of S18 is completed, the process proceeds to S19.

In S19, the positional information extraction section 110 confirms whether or not all the same-genre candidates included in the same genre-candidate list generated in S12 are read out. In a case where there still is a same-genre candidate that has not yet been read out (NO in S19), the positional information extraction section 110 returns to the process of S14 and reads out the next same-genre candidate from the same-genre candidate list. On the other hand, if all the same-genre candidates are read out (YES in S19), the positional information extraction section 110 terminates the generation process of the same-genre management data 102.

Deletion Process of Coupon

Figure 17:
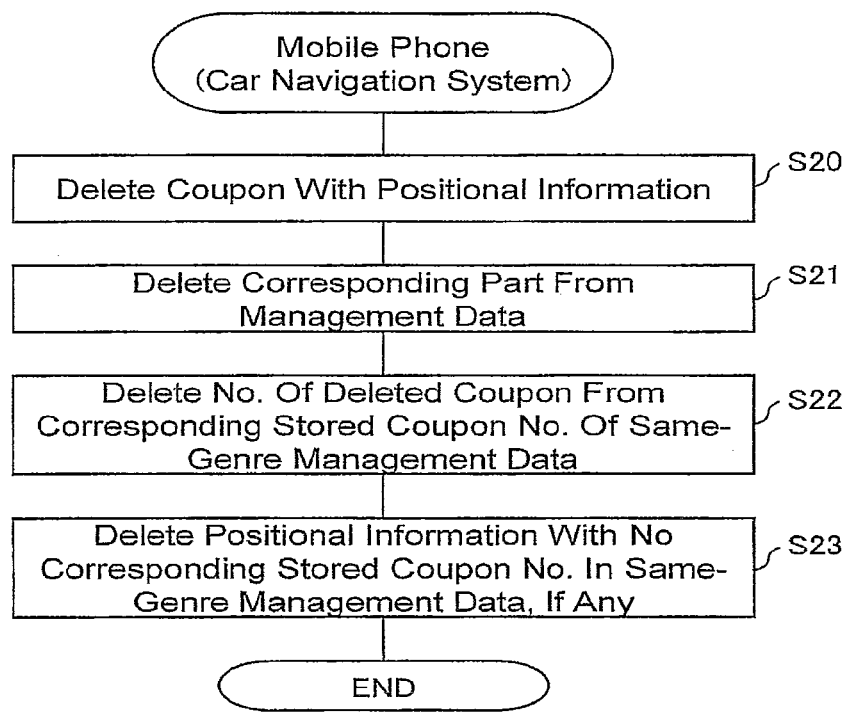
FIG. 17 is a flowchart illustrating an example of update processes for positional information management data and same-genre management data, at a time when a coupon is deleted.

When a coupon is added to the mobile phone storage section 8, the positional information management data 101 and the same-genre management data 102 are generated or updated by the processes as illustrated in FIGS. 15 and 16. When a coupon is deleted from the mobile phone storage section 8, the positional information management data 101 and the same-genre management data 102 are updated. The following description explains the updating processes of the positional information management data 101 and the same-genre management data 102 carried out when a coupon is deleted, with reference to FIG. 17. FIG. 17 is a flowchart illustrating an example of an updating process of the positional information management data 101 and the same-genre management data 102, upon deleting a coupon.

When a user of the mobile phone 1 deletes a coupon stored in the mobile phone storage section 8 via entry operation to the operation section 10 (S20), the positional information extraction section 110 deletes the positional information set (all of "No.", "Name", and "Positional Information") corresponding to the coupon from the positional information management data 101 (S21).

Subsequently, the positional information extraction section 110 deletes the "No." of the deleted coupon from the "Corresponding Stored Coupon No." of the same-genre management data 102 (S22). As a result, the deleted coupon will not be notified to the user even if the mobile phone 1 approaches a notification area of its same-genre store.

There are cases where no "Corresponding Stored Coupon No." remains in the "Corresponding Stored Coupon No." of its same-genre store, upon deleting the "No." of the deleted coupon from the "Corresponding Stored Coupon No.". Namely, there may be same-genre stores that have no coupons to notify the user even if the mobile phone 1 enters its notification area.

Accordingly, in a case where there is a same-genre store which no longer has the "Corresponding Stored Coupon No." as a result of the deletion, the positional information extraction section 110 deletes this information from the same-genre management data 102 (S23). This terminates the updating process of the positional information management data 101 and same-genre management data 102 at a time of deleting the coupon.

Figure 18:
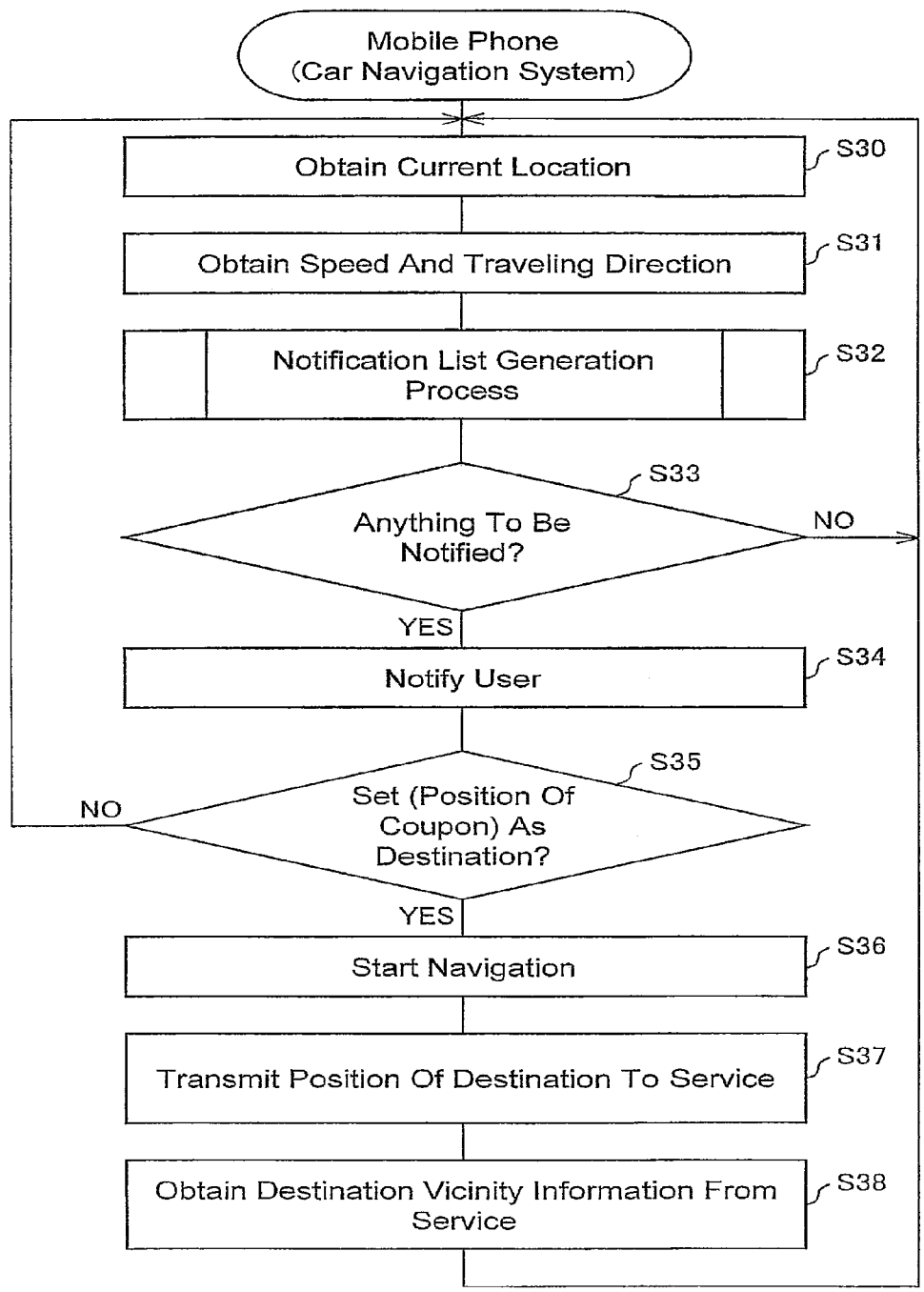
FIG. 18 is a flowchart illustrating an example of processes for notification of a store at which a coupon can be used and guiding of a route to the store.

Notification of Store at which Coupon can be Used and Route Guiding Process to the Store The following description explains procedures of the mobile phone 1 (i) notifying the user of a store at which a coupon stored in the mobile phone storage section 8 can be used and (ii) guiding a route to the store, with reference to FIG. 18. FIG. 18 is a flowchart illustrating an example of the notification of the store at which a coupon can be used and a route guiding process to the store.

First, the mobile phone determination section 111 obtains the current location of the mobile phone 1 from the position obtaining section 2 (S30). Moreover, the mobile phone determination section 111 obtains a traveling speed and a progressing direction of the mobile phone 1 based on the change with time of the current location of the mobile phone 1 obtained from the position obtaining section 2 (S31).

Next, the mobile phone determination section 111 carries out the notification list generation process to generate (or update) the notification list 103 (see FIG. 14) (S32). If there is nothing to be notified to the user in the information included in the generated notification list 103 (NO in S33), the process returns to S30. On the other hand, if there is something to be notified to the user (YES in S33), the mobile phone determination section 111 transmits to the mobile phone notification section 112 that there is something to be notified.

The mobile phone notification section 112 receiving this transmission from the mobile phone determination section 111 notifies the user that there is information to be notified (S34). More specifically, the mobile phone notification section 112 causes the audio output section 5 to output a predetermined notification sound together with causing the vibration section 12 to vibrate, and reads out an image and the like of the coupon from the mobile phone storage section 8 to display on the display section 11 (see FIG. 2).

The mobile phone notification section 112 confirms whether or not the position of the coupon (position of the store at which the coupon can be used) is set as the destination (S35). The present embodiment assumes to set the position of the coupon as the destination by displaying, together with the image C of the coupon, the input key K1 for setting the destination of the guided route as the store of the coupon, as illustrated in FIG. 2. Hence, the mobile phone notification section 112 determines that the position of the store of image C is set as the destination, when an entry operation of selecting the key K1 is detected. On the other hand, when the screen is switched over to a different screen without the key K1 being selected, the mobile phone notification section 112 determines that no settings of the destination is carried out.

The present embodiment describes an example of allowing the user to select whether or not to set the position of the coupon as the destination. The position of the coupon may alternatively be set as a spot to pass through. In this case, a destination point is entered after setting the position of the coupon as the spot to pass through. Furthermore, in this case, after the route is guided to the position of the coupon, the route to the destination point is guided from the position of the coupon.

In a case where the mobile phone notification section 112 determines that the position of the coupon is not set as the destination (NO in S35), the process returns to S30. In contrast, if the mobile phone notification section 112 determines that the position of the coupon is set as the destination (YES in S35), the positional information indicative of the position set as the destination is read out from the notification list 103 and is transmitted to the route guiding section 117, and the mobile phone notification section 112 instructs to guide the route to that position.

The route guiding section 117 receiving the instruction transmits the positional information received from the mobile phone notification section 112 to the route searching section 115, and receives from the route searching section 115 information indicative of the route from the current position of the mobile phone 1 to the position indicated by the positional information. Thereafter, the route guiding section 117 causes the display section 11 to display an image in which an image indicating the route and the current position of the mobile phone 1 is superposed on a map image stored in the mobile phone storage section 8, and starts navigation (route guiding) to the destination (store of the coupon) (S36).

Moreover, the mobile phone notification section 112 transmits the vicinity information obtaining section 116 to the positional information indicative of the destination. The vicinity information obtaining section 116 receiving the positional information transmits the positional information to a service via the telephone network communication section 3 (S37). The service receives the positional information and sends back information related to the positional information. The local information distribution server 60 illustrated in FIG. 11 is an example of the service. As such, the vicinity information obtaining section 116 obtains the vicinity information of the destination, from the service (S38). Thereafter, the process returns to S30.

Notification List Generation Process

Figure 19:
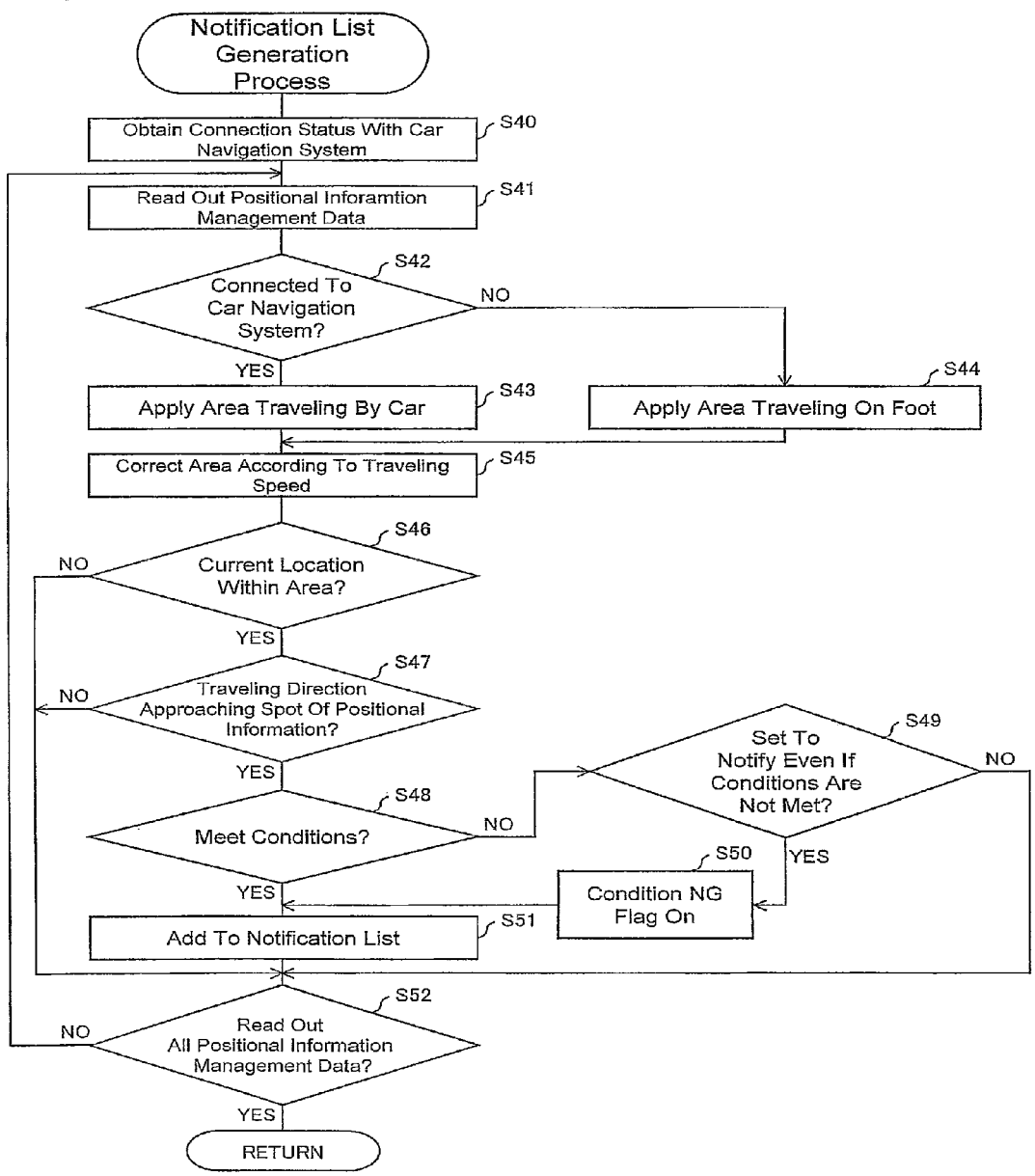
FIG. 19 is a flowchart illustrating an example of a notification list generation process.

Next described is a procedure of the notification list generation process carried out in S32 of FIG. 18, with reference to FIG. 19. FIG. 19 is a flowchart illustrating an example of a notification list generation process.

First, the mobile phone determination section 111 obtains information indicative of a connection status (whether or not communication connection is established) with the car navigation system 30 from the mobile phone short distance communication control section 113 (S40), and reads out one set of the positional information set from the positional information management data 101 of the mobile phone storage section 8 (S41). The positional information set may be read out for example sequentially from a small number of "No.".

Next, the mobile phone determination section 111 determines whether or not the car navigation system 30 is connected for communication with the mobile phone 1, based on the information obtained in S41 (S42). In a case where it is determined that the communication connection is established (YES in S42), the process proceeds to S43. In S43, it is determined that the notification area for traveling by car ("Notification Area (car)" in FIG. 12), which is included in the positional information set read out in S41, is applied. On the other hand, if it is determined that no communication connection is established (NO in S42), the process proceeds to S44. In S44, it is determined that the notification area for traveling on foot ("Notification Area (foot)" in FIG. 12), which is included in the positional information set read out in S41, is applied.

The mobile phone determination section 111 corrects the determined notification area to an area in accordance with the traveling speed of the mobile phone 1 (S45). This fixes the notification area for determining the positional information to be added to the notification list 103 by the mobile phone determination section 111.

The correction of the notification area is not an essential process. However, by carrying out correction as described below, it is possible to notify the positional information at an appropriate notification area in accordance with the traveling speed of the mobile phone 1, that is, the traveling speed of the user.

Namely, in a case where the traveling speed of the mobile phone 1 obtained in S31 of FIG. 18 is either faster or slower by a certain power (e.g. 1.5 power, 0.5 power etc.) than a predetermined value (e.g. 40 km/h in a case of traveling by car, 5 km/h in a case of traveling on foot), the notification area is determined by having a value obtained by multiplying that power to an area distance of the "Notification Area (car)" or "Notification Area (foot)" of the positional information management data 101 to serve as the area distance.

As a result, in a case where the traveling speed is fast, coupons of stores in a broader area are presented, and in a case where the traveling speed is slow, coupons of stores in a narrower area are presented. Hence, it is possible to notify just the coupons of the stores that the user can easily drop in at.

In a case where the mobile phone 1 is connected to the car navigation system 30, the traveling speed of the mobile phone 1 becomes equal to the traveling speed of the car on which the car navigation system 30 is installed. Hence, the mobile phone determination section 111 may receive the traveling speed from the car navigation system 30 in S31 of FIG. 19, and have the received traveling speed serve as the traveling speed of the mobile phone 1.

By determining the notification area as described above, the mobile phone determination section 111 determines whether or not the current position of the mobile phone 1 is within the notification area (S46). Whether or not the current position is within the notification area can be determined as described below, for example.

Assume that the current position of the mobile phone 1 is (X1,Y1) in a case where the notification area is of a square as like in (a) of FIG. 5 and a notification distance is L (km), i.e. the notification area is of a square having sides of a length of 2 L (km). In this case, it is determined that the current position of the mobile phone 1 is within the notification area when both of the following numerical formulae (1) and (2) are satisfied:

$$X-L \le X1 \le X+L \tag{1}$$

$$Y-L \le Y1 \le Y+L \tag{2}$$

If it is determined that the current position is not within the notification area as a result of the determination as described above (NO in S46), the mobile phone determination section 111 proceeds to the process of S52. In this case, the positional information is not added to the notification list 103.

On the other hand, if it is determined that the current position is within the notification area (YES in S46), the mobile phone determination section 111 determines whether or not a traveling direction of the mobile phone 1 is approaching the spot of the positional information (store of the coupon or its same-genre store) (S47).

The determination of the traveling direction is not an essential process. However, by determining the traveling direction and determining whether the traveling direction is approaching the point of the positional information as described below, it is possible to notify just the positional information of stores that the user can easily drop in at, which stores are positioned in the traveling direction of the mobile phone 1, that is, in the direction that the user is approaching.

Namely, a distance from the current position of the mobile phone 1 to the spot (store of the coupon or its same-genre store) of the positional information which serves as a determination target is calculated, and the distance between the two is calculated again after elapse of a certain period (e.g. 1 minute). If this calculated distance becomes shorter, it is determined that the mobile phone 1 is approaching the spot. It is not possible to carry out the determination while the user is not traveling; if the calculated distances are the same, the mobile phone determination section 111 standbys until the current position of the mobile phone 1 changes.

In a case where it is determined that the traveling direction is not approaching the spot of the positional information as a result of the determination as described above (NO in S47), the mobile phone determination section 111 proceeds to the process of S52. In this case, the positional information is not added to the notification list 103.

On the other hand, if it is determined that the traveling direction is approaching the spot of the positional information (YES in S47), the mobile phone determination section 111 confirms whether or not a current date and time obtained from the timing section 114 and a current weather obtained from the Internet via the telephone network communication section 3 meets the "Condition" stored in the positional information management data 101 (S48).

For instance, a time zone of "11:00 to 13:00" and a weather of "sunny" correspond to the coupon of "No. 2" as its "Condition", in the positional information management data 101 of FIG. 12. Therefore, it is determined that the "Condition" is met in a case where the current date and time is within the time zone of "11:00 to 13:00", and the current weather is "sunny".

The mobile phone determination section 111 confirms whether or not the conditions are met as such. In the case where it is determined that the conditions are met (YES in S48), the process proceeds to S51. On the other hand, if it is determined that the conditions are not met (NO in S48), the mobile phone determination section 111 confirms whether or not it is set to notify even when the conditions are not met (S49). The setting of whether or not notification is carried out for the coupons that do not meet the conditions is set in advance (see FIG. 9).

In a case where it is confirmed that the setting is made so that no notification is carried out for the coupons that do not meet the conditions (NO in S49), the mobile phone determination section 111 proceeds to the process of S52. In this case, the positional information is not added to the notification list 103.

In contrast, if it is confirmed that the setting is set so that the notification is carried out even if the conditions are not met (YES in S49), the mobile phone determination section 111 determines to turn the Condition NG Flag of the positional information ON (S50), and proceeds to the process of S51. The Condition NG Flag is a flag indicative of presenting the user the coupon of the positional information even if the conditions are not met. The coupon of the positional information to which the Condition NG Flag is attached is displayed together with a message as like the message M3 in FIG. 8, which message notifies that this coupon cannot be used.

In S51, the mobile phone determination section 111 adds, to the notification list, the information included in the positional information set (name, positional information, genre, conditions), and information indicative of whether or not an NG flag is attached (see FIG. 14). Thereafter, the process proceeds to S52, and the mobile phone determination section 111 confirms whether or not all the positional information management data 101 are read out. Namely, the mobile phone determination section 111 confirms whether or not the current position of the mobile phone 1 is within the notification area of the positional information set, for each of the positional information sets included in the positional information management data 101.

In a case where the positional information management data 101 includes a positional information set yet to be read out (NO in S52), the process proceeds to S41, and a subsequent positional information set is read out. On the other hand, if all of the positional information sets are read out (YES in S52), the notification list generation process terminates.

Figure 20:
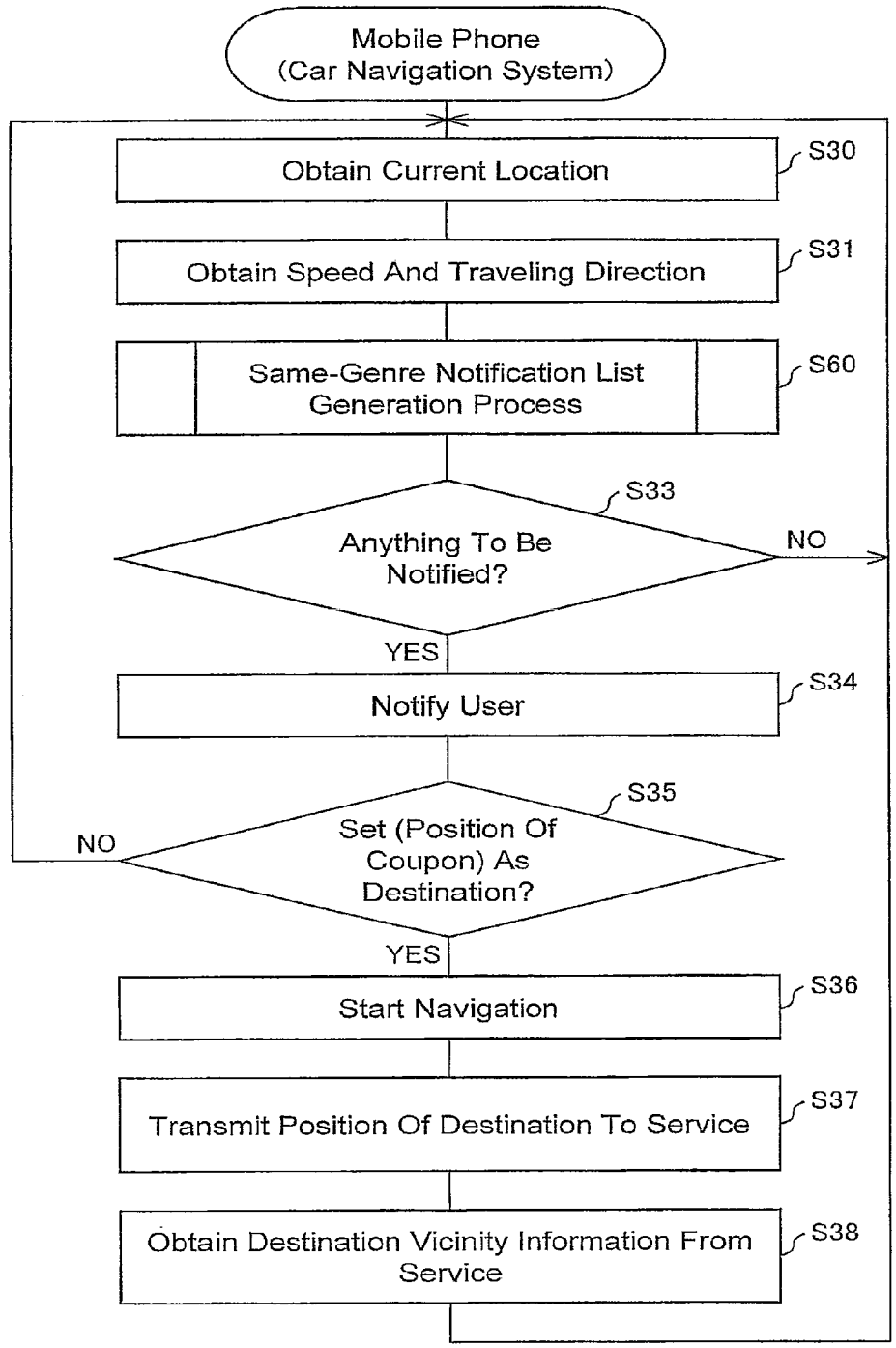
FIG. 20 is a flowchart illustrating an example of processes for notification of a store at which a coupon can be used and guiding of a route to the store, which processes are carried out when entering a notification area of a store of a same genre as the store at which the coupon can be used.

Notification of Store at which Coupon can be Used and Guiding Route to Store, Carried Out when Entering Notification Area of Same-Genre Store Next described is procedures for (i) notifying a user of a store at which a coupon stored in the mobile phone storage section 8 can be used, at a time when entering a notification area of a store of a same genre of the store at which the coupon can be used, and (ii) guiding a route to the store at which the coupon can be used, with reference to FIG. 20. FIG. 20 is a flowchart illustrating an example of the notification of the store at which the coupon can be used and a route guiding process to the store, which notification and route guiding are carried out at a time when the mobile phone 1 enters the notification area of the store of a same genre as the store at which the coupon can be used.

As illustrated in FIG. 20, the procedures for notifying the store at which the coupon can be used and the route guiding process to the store carried out at a time when the mobile phone 1 enters the notification area of the store of the same genre as the store at which the coupon can be used is similar to the procedure in FIG. 18, except that the process of S32 in FIG. 18 is changed to a process of S60. For similar processes, identical reference numbers have been provided and their descriptions have been omitted.

Namely, in S32 of FIG. 18, the notification list generation process is carried out, however in S60 of FIG. 20, a same genre notification list generation process is carried out, which process generates or updates the notification list 103 in accordance with the same-genre management data 102.

Same-Genre Notification List Generation Process

Figure 21:
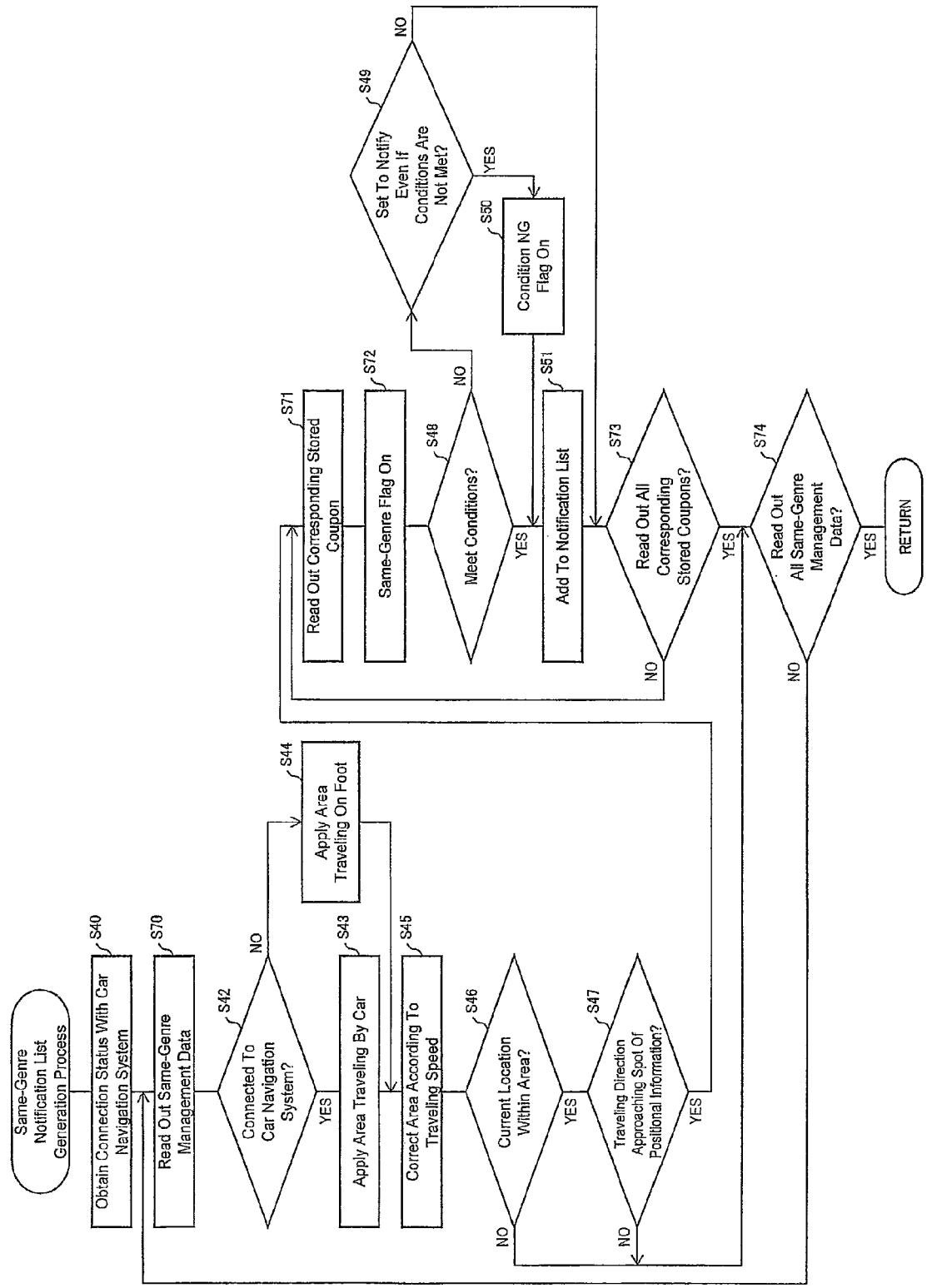
FIG. 21 is a flowchart illustrating an example of a same-genre notification list generation process.

Next describes the procedure of the same-genre notification list generation process carried out in S60 of FIG. 20, with reference to FIG. 21. FIG. 21 is a flowchart illustrating an example of the same-genre notification list generation process. As illustrated in FIG. 21, the same-genre notification list generation process is substantially the same with the notification list generation process of FIG. 19. However, since the data used for generating the notification list 103 is changed from the positional information management data 101 to the same-genre management data 102, the details of the processes are slightly different.

First, the mobile phone determination section 111 obtains a connection status with the car navigation system 30 (S40), and reads out one piece of the same-genre store information from the same-genre management data 102 in the mobile phone storage section 8 (S70). The same-genre store information may be read out for example in sequential order from a small "No.". The notification area employed is determined in accordance with whether or not connection is established with the car navigation system 30, and the notification area is corrected in accordance with the traveling speed of the mobile phone 1 (S42 to S45).

Next, the mobile phone determination section 111 determines whether or not the current position of the mobile phone 1 is within the notification area, and if the current position is within the notification area, the mobile phone determination section 111 determines whether or not the traveling direction of the mobile phone 1 is in a direction approaching the spot of the positional information (spot identified by the positional information included in the same-genre store information thus read out) (S46 and S47).

If it is determined that the traveling direction of the mobile phone 1 is a direction approaching the spot of the positional information (YES in S47), the mobile phone determination section 111 reads out the "Corresponding Stored Coupon No." of the same-genre store information read out in S70 (see FIG. 13) (S71). Thereafter, the mobile phone determination section 111 determines to turn ON the same-genre flag of the positional information set identified by the Corresponding Stored Coupon No. read out (S72). As a result, a circle mark is added to the "Same-Genre Flag" for the positional information set that is determined as to turn the same-genre flag ON in the notification list 103 (see FIG. 14).

When the mobile phone 1 enters the set notification area, the coupon corresponding to the positional information set which has the same-genre flag ON is displayed together with a message informing that "a store of the same genre at which a coupon can be used is available" (e.g. message M2 of FIG. 6).

Next, the mobile phone determination section 111 confirms whether or not the current date and time and the weather meet the "Condition" included in the positional information set. If these current date and time and weather meet the "Condition", the positional information and like information included in the positional information set (name, positional information, genre) and information indicative of whether or not the same-genre flag is set are added to the notification list (see FIG. 14). Moreover, in the case where although the conditions are not met but the setting is made so that notification is carried out even if the conditions are not met, the positional information and the like included in the positional information set is added to the notification list with the Condition NG flag turned ON (S48 to S51).

Thereafter, the mobile phone determination section 111 confirms whether or not all the corresponding stored coupons are read out (S73). In the case where there still is a corresponding stored coupon still not read out (NO in S73), the mobile phone determination section 111 returns to the process of S71 and reads out the corresponding stored coupon.

On the other hand, if all of the corresponding stored coupons have been read out (YES in S73), the mobile phone determination section 111 confirms whether or not all of the same-genre store information included in the same-genre management data 102 has been read out (S74). If it is confirmed that there is some same-genre store information that has not yet been read out (NO in S74), the process returns to S70, and a subsequent same-genre store information is read out. On the other hand, if it is confirmed that all of the same-genre store information have been read out (YES in S74), the mobile phone determination section 111 terminates the same-genre notification list generation process.

Figure 22:
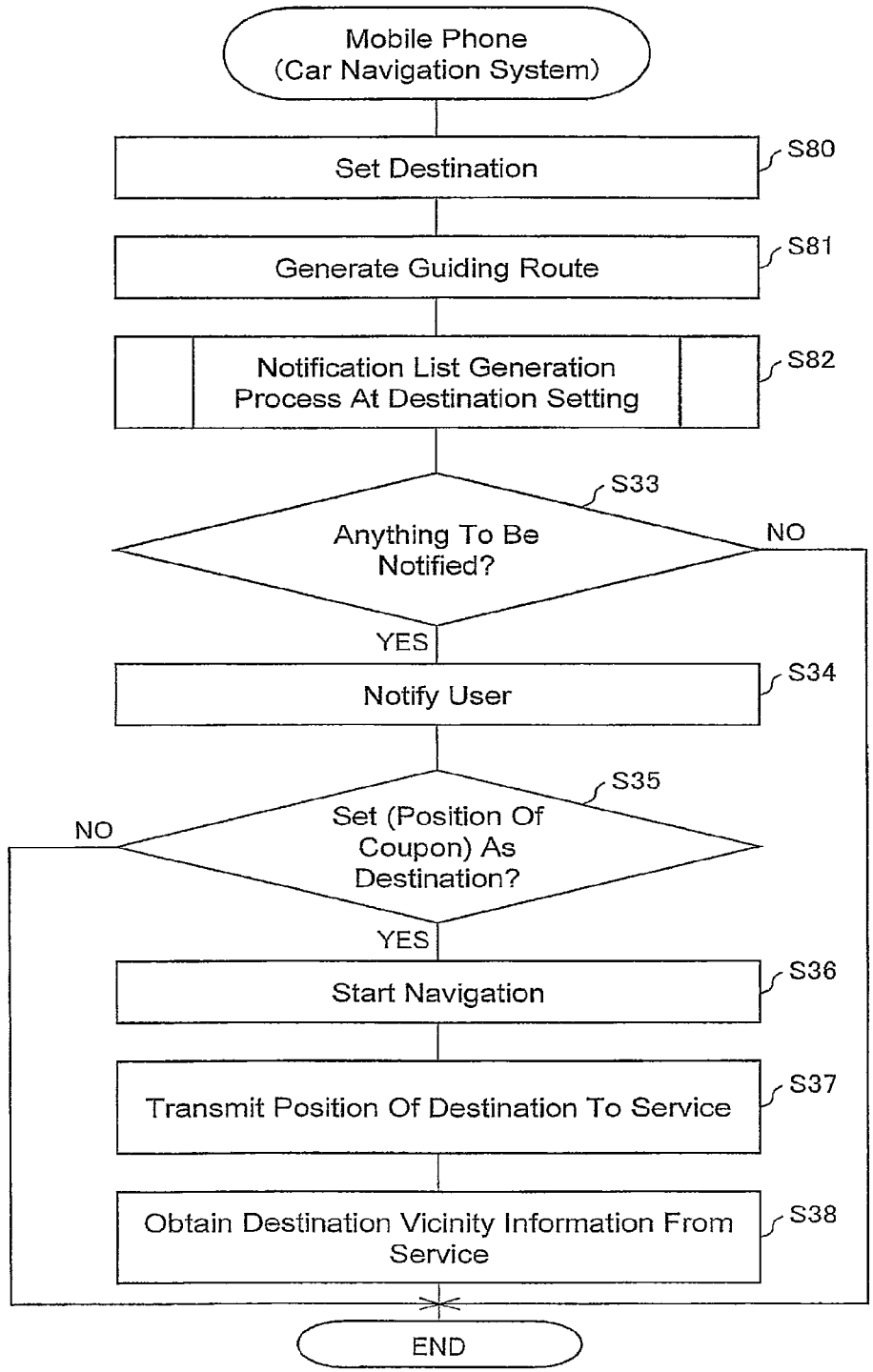
FIG. 22 is a flowchart illustrating an example of processes for notification of a user of a store at which a coupon can be used and guiding of a route to the store, which processes are carried out when a set route enters a notification area of the store at which the coupon can be used.

Notification of Store at which Coupon can be Used on Route and Route Guiding Process to that Store The following description explains procedures, when a route generated from a departing position to a destination position to have the mobile phone 1 guide the route is within a notification area of the store at which a coupon can be used, of notifying a user of a store at which a coupon can be used and guiding a route to the store, with reference to FIG. 22. FIG. 22 is a flowchart illustrating an example of processes for notifying a user of a store at which a coupon can be used and processes for guiding a route to the store, while a set route is within the notification area of the store at which a coupon can be used.

Once the user operates the operational section 10 to set the destination (or the destination and the departure point) of the route to guide (S80), the positional information of the set destination is transmitted to the route searching section 115. The route searching section 115 which receives the positional information of the destination generates a guiding route from the current location of the mobile phone 1 obtained by the position obtaining section 2 (or a set departure point) to a spot identified by the received positional information (S81).

Thereafter, the mobile phone determination section 111 carries out a notification list generation process at destination setting (S82), which is a notification list generation process carried out when the destination is set. As a result of this process, the notification list 103 is generated. The processes followed by the generation of the notification list 103 are substantially the same as those of FIG. 18.

Namely, whenever there is information in the generated notification list 103 that should be notified to the user, the mobile phone determination section 111 transmits that there is information to be notified to the user to the mobile phone notification section 112, and the mobile phone notification section 112 that receives this transmission notifies the user that there is information to be notified to the user (833, S34).

The mobile phone notification section 112 confirms whether or not the position of the coupon (position of the store at which the coupon can be used) is set as the destination (S35). If it is determined here that the position of the coupon is not set as the destination (NO in S35), the mobile phone notification section 112 terminates the process. In this case, the route to the destination set in S80 is guided.

On the other hand, if it is determined that the position of the coupon is set as the destination (YES in S35), the mobile phone notification section 112 reads out the positional information indicative of the point set as the destination from the notification list 103 and sends that positional information to the route guiding section 117 to instruct to guide the route to that spot. Namely, in this case, the destination of the route guiding is changed. The destination set in this process may be set as a place to drop in at, in between the way to the destination set in S80. In this case, the route is guided to the destination set in S80 after dropping in at the store of the coupon.

Once the destination is set as described above, the route guiding section 117 starts navigation (route guiding) to the set destination (S36). The mobile phone notification section 112 sends the positional information indicative of the position of the destination to the vicinity information obtaining section 116, and the vicinity information obtaining section 116 obtains the vicinity information of the destination from the service (S38). Thereafter, the route is guided to the destination.

Notification List Generation Process at Destination Setting

The following description deals with procedures in the notification list generation process at destination setting, which is carried out in S82 of FIG. 22, with reference to FIG.

Figure 23:
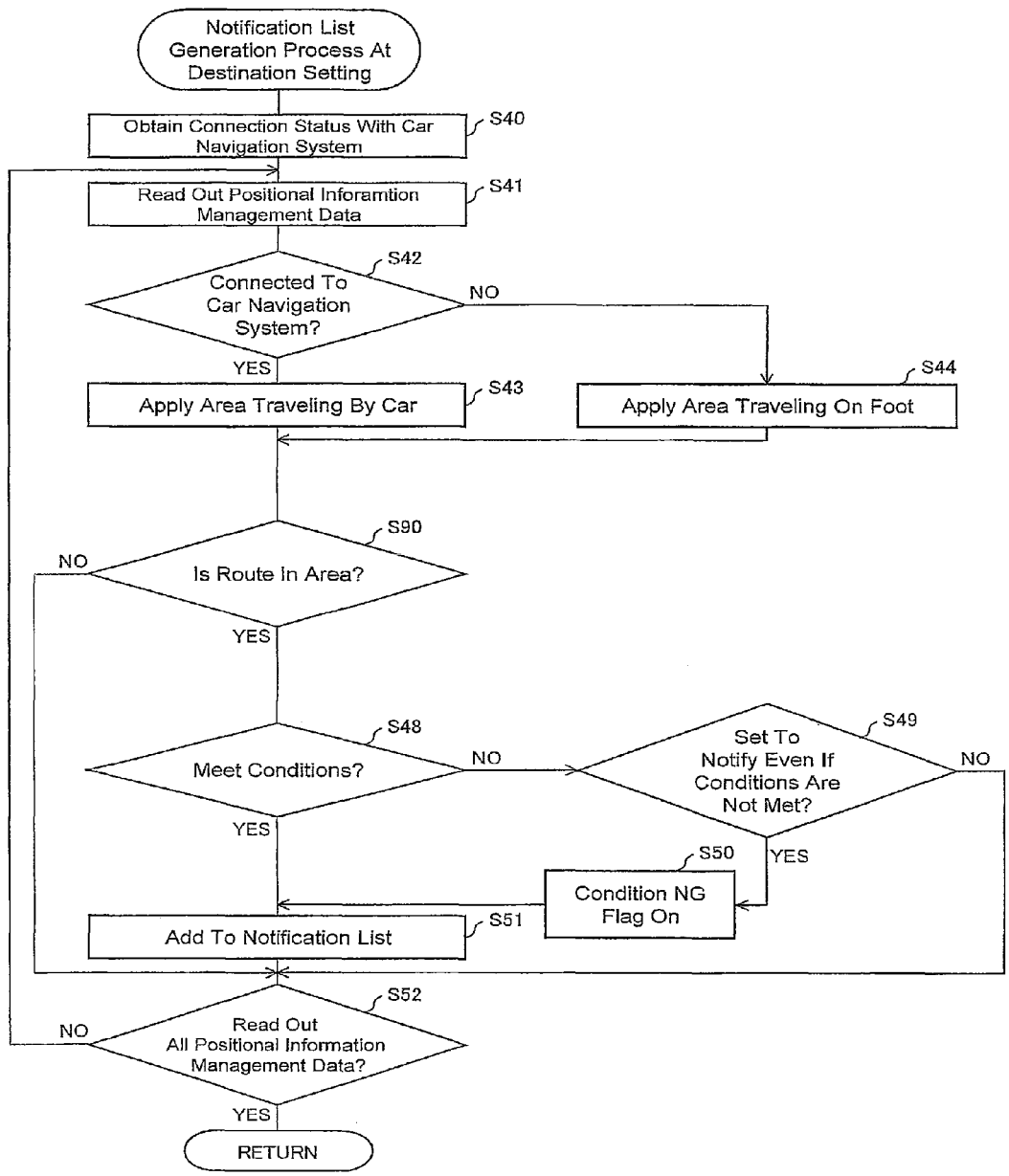
FIG. 23 is a flowchart illustrating an example of a notification list generation process at destination setting.

23. FIG. 23 is a flowchart illustrating an example of the notification list generation process at destination setting.

First, the mobile phone determination section 111 obtains information indicative of a connection state with the car navigation system 30 from the mobile phone short distance communication control section 113, and reads out one positional information set from the positional information management data 101 of the mobile phone storage section 8. Thereafter, the mobile phone determination section 111 determines the notification area to be applied in accordance with whether or not the mobile phone determination section 111 is connected to the car navigation system 30 (S40 to S44).

It is considered that the user of the mobile phone 1 has not yet started traveling at the time when the user is setting the destination. Hence, in the illustrated example, no correction of the notification area is carried out based on the traveling speed of the mobile phone 1. Of course, the correction of the notification area can be carried out based on the traveling speed of the mobile phone 1 at a time when the destination is set.

After the notification area is determined as described above, the mobile phone determination section 111 determines whether or not the guiding route generated in S81 of FIG. 22 enters inside the determined notification area (S90). Whether or not the route enters inside the notification area is determined by for example picking up spots on the generated route by intervals of a fixed distance and determining whether or not each of the picked up spots is within the notification area. Whether or not each of the spots are within the notification area may also be determined by the numerical formulae (1) and (2).

In a case where the route is determined as not entering inside the notification area (NO in S90), the mobile phone determination section 111 proceeds to the process of S52. In this case, the positional information is not added to the notification list 103. On the other hand, if the route is determined as entering inside the notification area (YES in S90), the mobile phone determination section 111 confirms whether or not the current date and time and the weather meet the "Condition" included in the positional information set read out in S41 (S48).

In the case where it is confirmed that the conditions are met, the mobile phone determination section 111 adds, to the notification list, the positional information and like information included in the positional information management data (name, positional information, genre, conditions) read out in S41, and information indicative of whether or not a condition NG flag is ON (see FIG. 14). Moreover, in a case where the conditions are not met however setting is made so that notification is also carried out for ones that do not meet the conditions, the positional information and like information included in the positional information set read out in S41 is added to the notification list, with its condition NG flag ON (S48 to S51).

Thereafter, the mobile phone determination section 111 confirms whether or not all of the positional information sets have been read out (S52). In the case where it is confirmed that there still is some positional information sets that have not been read out yet (NO in S52), the process returns to the process of S41. On the other hand, if it is confirmed that all of the positional information sets have been read out (YES in S52), the mobile phone determination section 111 terminates the notification list generation process at destination setting.

Figure 24:
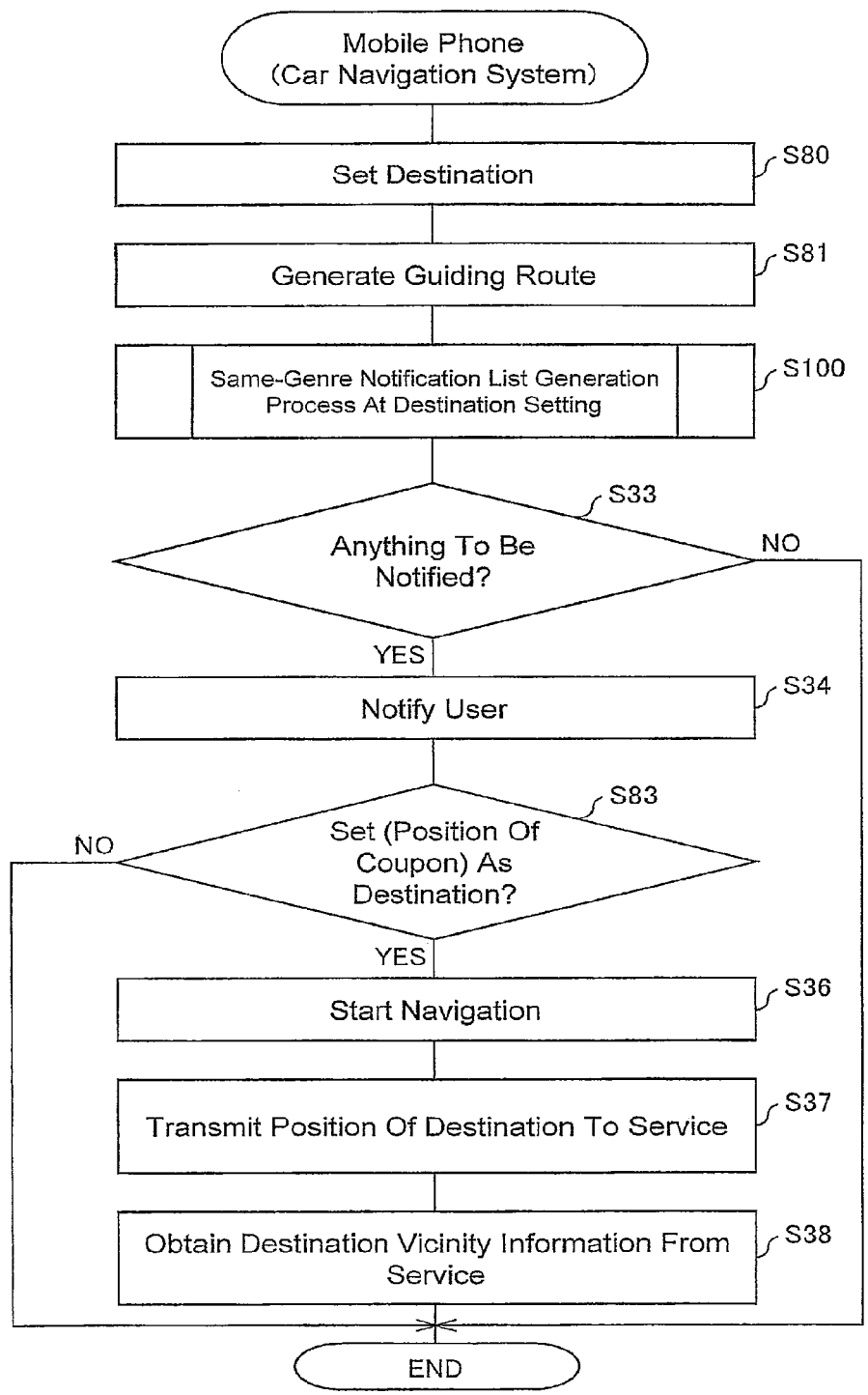
FIG. 24 is a flowchart illustrating an example of processes carried out at a time when a destination is set, for notifying that a set route is included in a notification area of a store of a same genre as a store at which a coupon can be used and guiding the route to the store at which the coupon can be used.

Notification in case where same-genre store of store at which coupon can be used is within notification area on route and route guiding process to store at which coupon can be used Next described with reference to FIG. 24 is procedures for notifying a user of a store at which a coupon stored in the mobile phone storage section 8 can be used in a case where a route set is within a notification area of a store of a same genre as the store at which the coupon can be used, and processes carried out to guide the route to the store. FIG. 24 is a flowchart illustrating an example of notifying, at a time when the destination is set, that the route set at the time of setting the destination is within a notification area of a store of a genre same as the store at which the coupon can be used, and the process of guiding the route to that store.

The illustrated process of FIG. 24 is similar to the processes in FIG. 22 except that the process of S82 in FIG. 22 is changed to a process of S100. Namely, S82 of FIG. 22 carries out the notification list generation process at destination setting, however S100 of FIG. 24 carries out the same genre notification list generation process at destination setting, which generates or updates the notification list 103 in accordance with the same-genre management data 102.

Same-Genre Notification List Generation Process at Destination Setting

Figure 25:
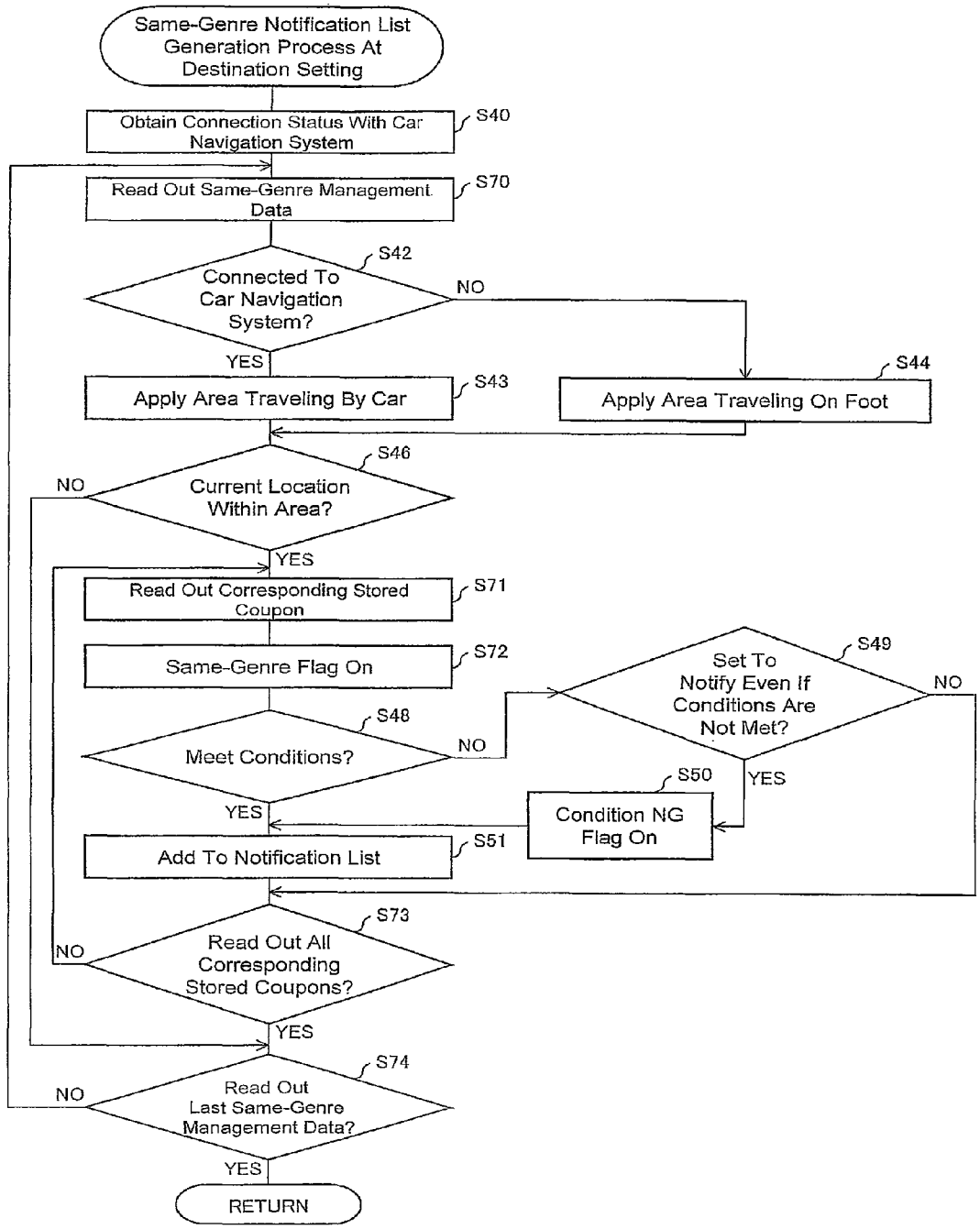
FIG. 25 is a flowchart illustrating an example of a same-genre notification list generation process at destination setting.

Next described are procedures of the same-genre notification list generation process at destination setting, with reference to FIG. 25. FIG. 25 is a flowchart illustrating an example of the same-genre notification list generation process at destination setting. As illustrated in FIG. 25, the same-genre notification list generation process at destination setting is substantially a same process as the notification list generation process at destination setting in FIG. 23. However, since the data used for generating the notification list 103 is changed from the positional information management data 101 to the same-genre management data 102, the details of the process are slightly different.

First, the mobile phone determination section 111 obtains a connection status with the car navigation system 30 (S40), and reads out the same-genre store information from the same-genre management data 102 of the mobile phone storage section 8 (S70). Thereafter, the mobile phone determination section 111 determines the notification area to employ in accordance with whether or not the mobile phone 1 is connected to the car navigation system 30 (S42 to S44).

Subsequently, the mobile phone determination section 111 determines whether or not a guiding route generated in S81 of FIG. 24 is within the determined notification area, and if the guiding route is within the notification area, the "Corresponding Stored Coupon No." included in the same genre store information read out in S70 is read out (S71). If a plurality of "Corresponding Stored Coupon No." are included, the smallest No. thereof is to be read out.

The mobile phone determination section 111 determines to turn ON the same genre flag of the positional information set identified by the "Corresponding Stored Coupon No." read out, and confirms whether or not the current date and time and the weather meets the "Condition" included in the positional information set (S72, S48).

The mobile phone determination section 111, in the case where it determines that the conditions are met, adds to the notification list the positional information and like information (name, positional information, genre, conditions) included in the positional information set that has the same-genre flag ON (see FIG. 14). Moreover, in a case where the setting is set in such a manner that notification is to be made also for ones that do not meet the conditions, although the conditions are not met, the positional information and like information included in the positional information set is added to the notification list in such a manner that the condition NG flag is ON (S48 to S51).

Thereafter, the mobile phone determination section 111 confirms whether or not all of the corresponding stored coupons have been read out (S73). At this time, if there is a corresponding stored coupon which is yet to be read out (NO in S73), the mobile phone determination section 111 returns to the process of S71 and reads out the corresponding stored coupon.

On the other hand, if all of the corresponding stored coupons have been read out (YES in S73), the mobile phone determination section 111 confirms whether or not all of the same-genre management data (all of the same-genre store information included in the same-genre management data 102) is read out (S74). If it is confirmed that there still is same-genre store information that is yet to be read out (NO in S74), the process returns to that of S70. On the other hand, if it is confirmed that all of the same genre store information have been read out (YES in S74), the mobile phone determination section 111 terminates the same-genre notification list generation process at destination setting.

Additional Matter

The foregoing description explains an example of generating the notification list 103 with use of either one of the positional information management data 101 or the same-genre management data 102. Alternatively, the notification list 103 may be generated with use of both the positional information management data 101 and the same-genre management data 102.

Moreover, the foregoing description provides an example in which two patterns of the notification area are registered, one for traveling by car and one for traveling on foot, and the notification area is corrected in accordance with the traveling speed of the user. However, the notification area may be determined just depending on the traveling speed. In this case, the notification area can be gradually changed in accordance with the traveling speed, or may be continuously changed. Moreover, the notification area may be set and changed manually by the user.

Embodiment 2

Described below is another embodiment related to the present invention, with reference to FIGS. 26 to 34. For easy explanation, members and processes having identical functions as with the drawings described in the foregoing embodiment are provided with identical reference signs, and explanations thereof are omitted. The hardware configurations of the mobile phone 1 and the car navigation system 30 of the present invention are as illustrated in FIG. 11.

Overview

Figure 26:
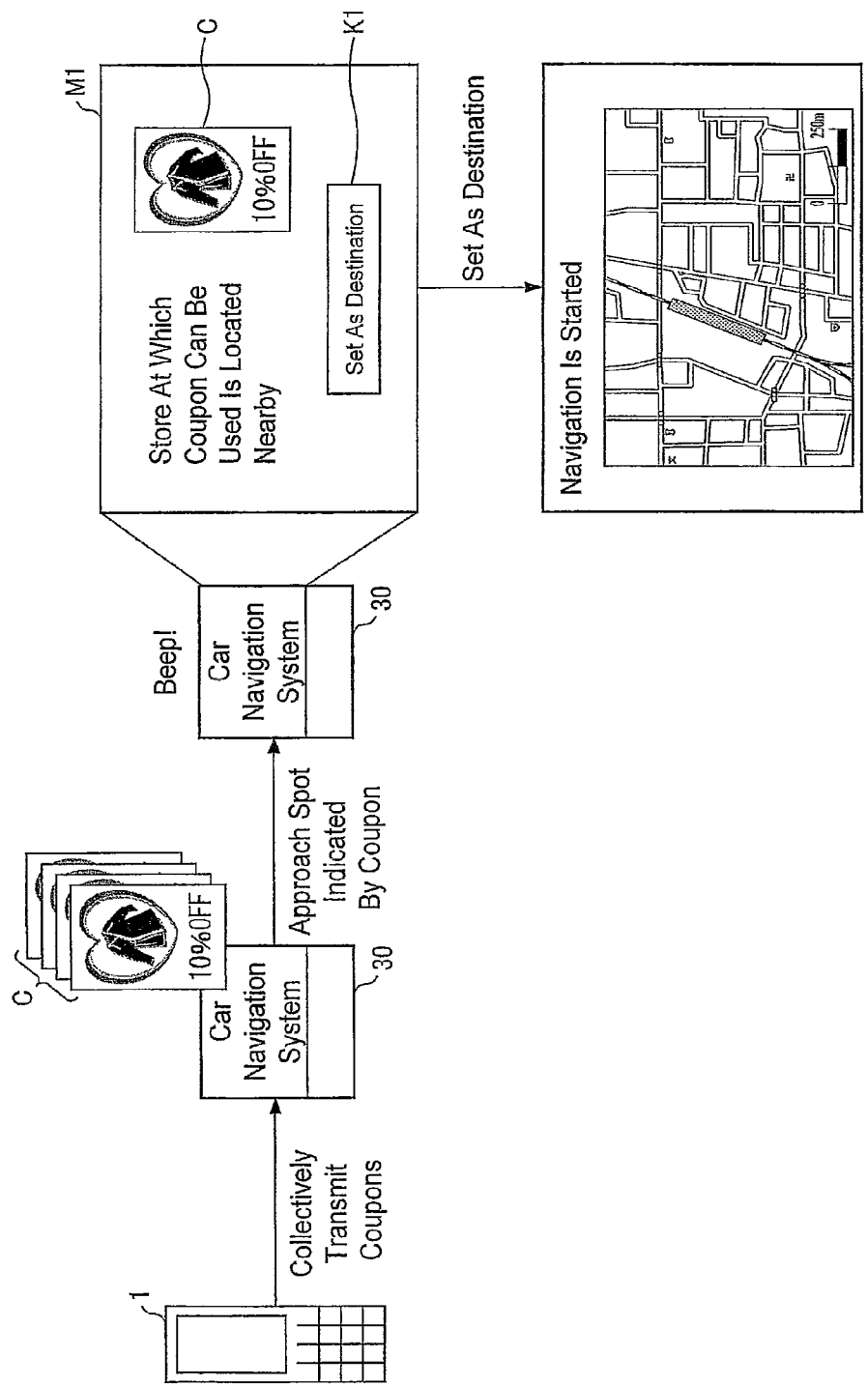
FIG. 26 is a view illustrating an overview of operations carried out by a mobile phone and a car navigation system, in accordance with another embodiment of the present invention.

First described is an overview of operations carried out by the mobile phone 1 and the car navigation system 30 of the present embodiment, with reference to FIG. 26. FIG. 26 is a view illustrating an overview of the operations carried out by the mobile phone 1 and the car navigation system 30.

As illustrated in FIG. 26, the mobile phone 1 of the present embodiment collectively transmits coupons stored therein to the car navigation system 30. Thereafter, the car navigation system 30, when approaching a spot indicated by a coupon received from the mobile phone 1 (when entering the notification area of the coupon), notifies the user that they are approaching the spot.

In the illustrated example, as with the example illustrated in FIG. 2, the following are displayed: a message M1 indicating that a store at which a coupon can be used is nearby; an image C of the coupon; and a key K1 for setting the store as a destination. Upon selection of the key K1, the store is set as the destination of the car navigation system 30, and a route to the store is guided.

Namely, in the present embodiment, a part of the processes carried out by the mobile phone 1 in the foregoing embodiment are made to be carried out by the car navigation system 30, to achieve a similar function as the foregoing embodiment.

Operation Example

Figure 27:
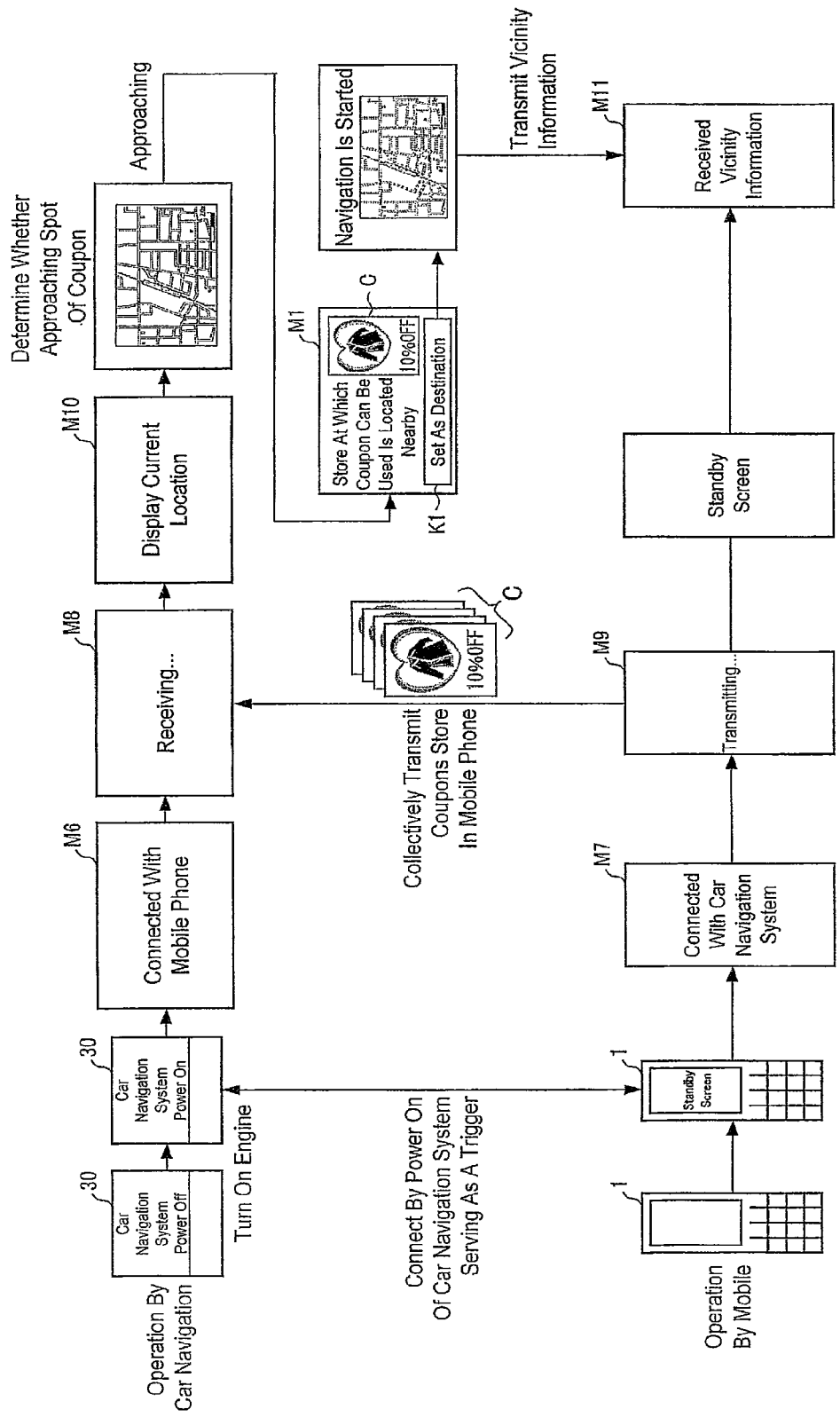
FIG. 27 is a view illustrating an example of what is displayed on a display screen, while the mobile phone and the car navigation system are operated.

The following description explains an operation example of the mobile phone 1 and the car navigation system 30, with reference to FIG. 27. FIG. 27 is a view illustrating an example of a display screen displayed while the mobile phone 1 and the car navigation system 30 are operating.

Once an engine of a car on which the car navigation system 30 is installed is turned on, a power of the car navigation system 30 turns ON. The car navigation system 30, by having the power of the car navigation system 30 be turned on to serve as a trigger, establishes communication connection with the mobile phone 1 via the short distance communication section 31. That is to say, as long as the user of the mobile phone 1 is on a car that is installed with the car navigation system 30, a communication connection is automatically established between the mobile phone 1 and the car navigation system 30. At this time, no operation by the user is required. In a case where Bluetooth communication is carried out, a pairing process (process to register each other as counter devices for communication) is necessarily carried out in advance. However, in the present embodiment, it is assumed that the pairing has already been carried out.

Upon establishment of the communication connection with the mobile phone 1, the car navigation system 30 may display a message M6 indicating that the communication connection has been established with the mobile phone 1, as illustrated in FIG. 27. Similarly, upon establishment of a communication connection with the car navigation system 30, the mobile phone 1 may display a message M7 indicating that the communication connection has been established. This allows for the user to confirm the establishment of the communication connection.

The mobile phone 1 collectively transmits the coupons stored in the mobile phone 1 to the car navigation system 30, upon the establishment of the communication connection with the car navigation system 30. At this time, the mobile phone 1 may display a message M9 as illustrated in FIG. 27, which message indicates that the coupons are being transmitted. Similarly, the car navigation system 30 may display a message M8 indicating that the car navigation system 30 is currently receiving the coupons.

After transmitting and receiving the coupons, the mobile phone 1 and the car navigation system 30 each return to their regular operations. Namely, the mobile phone 1 displays a standby screen and switches to a phone call standby state, and the car navigation system 30, after displaying a message M10 that the car navigation system 30 will display a current location of the car navigation system 30 (i.e. current location of the car), displays the current location on a map.

At this time, the car navigation system 30 determines whether or not the car is approaching a spot of a coupon, i.e. whether or not the car has entered a notification area set on a basis of a spot indicated by positional information of the coupons. In a case where it is determined that the car has entered a notification area, the car navigation system 30 notifies the user that the car has entered a notification area.

More specifically, the car navigation system 30 displays (i) a message M1 indicating that a store at which a coupon can be used is nearby, (ii) an image C of the coupon, and (iii) a key K1 for setting the destination, as illustrated in FIG. 27. At this time, it is preferable to notify the user by outputting sound or the like that the message M1 and the like are displayed.

Upon selecting the key K1, the store of the coupon of the image C is set as a destination of the route guiding, and the route to the store is guided. Moreover, when the destination is set, vicinity information of around the set destination is transmitted from the car navigation system 30 to the mobile phone 1.

The mobile phone 1 receiving this information may display a message M11 showing that the mobile phone 1 has received the vicinity information. This allows for the user of the mobile phone 1 to confirm reception of the vicinity information. Since the vicinity information is stored in the mobile phone 1, the user can check the vicinity information at any timing. For example, in a case where the user is driving, the user can check the information after arriving at the destination, when the car is parked or stopped, or like timing.

Detailed Configuration of Mobile Phone 1

Figure 28:
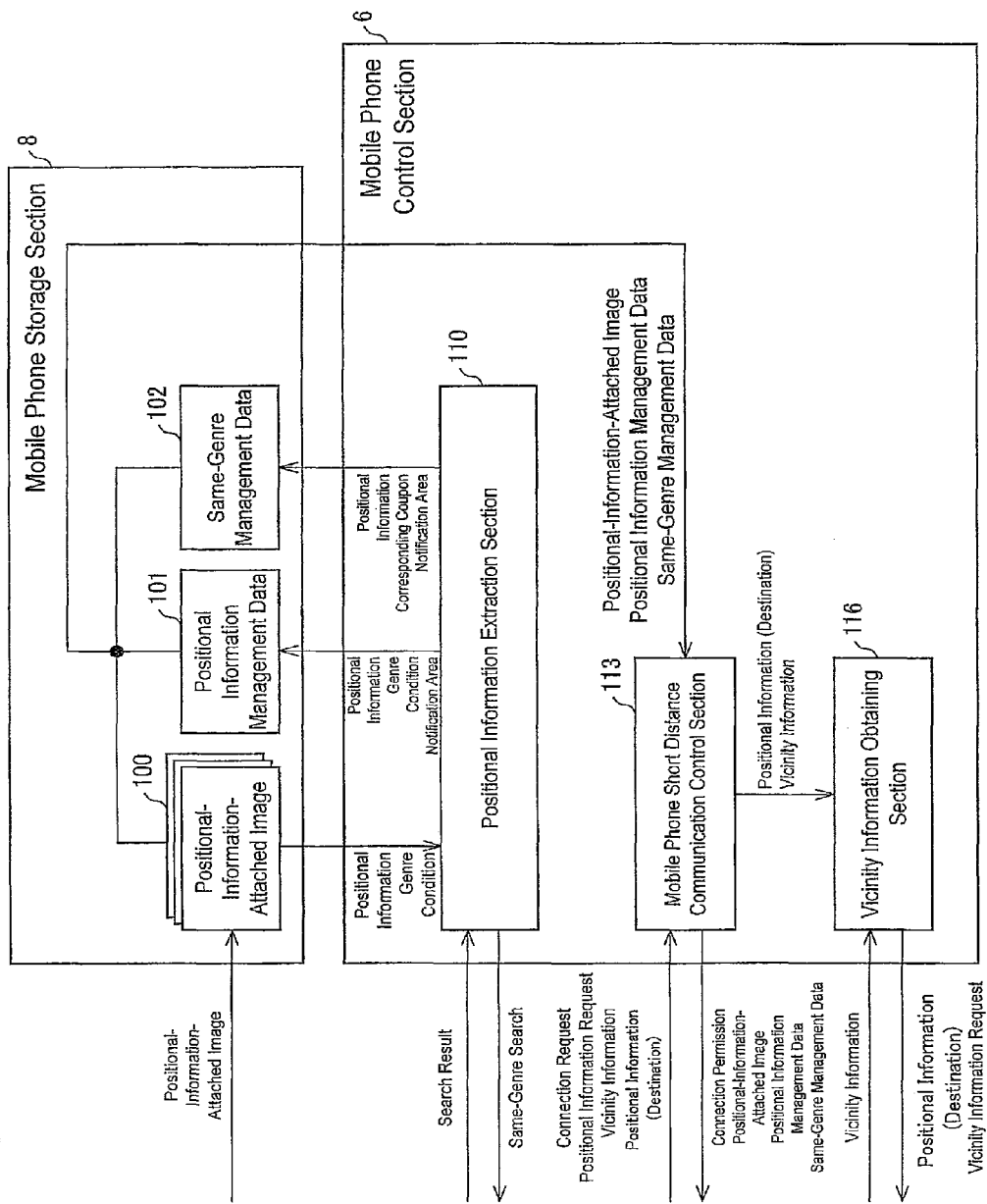
FIG. 28 is a block diagram illustrating an essential configuration of the mobile phone.

The following description explains a specific configuration of the mobile phone 1 of the present embodiment, with reference to FIG. 28. FIG. 28 is a block diagram illustrating an essential configuration of the mobile phone 1.

The block diagram of FIG. 28 is different from the block diagram of FIG. 1 in that the block diagram of FIG. 28 does not include the notification list 103, the mobile phone determination section 111, the mobile phone notification section 112, the timing section 114, the route searching section 115, and the route guiding section 117. These configurations are provided in the car navigation system 30 instead of the mobile phone 1. Of course, the mobile phone 1 may also include these configurations, however for easy explanation, the present embodiment describes just the least required configurations to achieve the functions of the mobile phone 1.

The positional-information-attached image 100, the positional information management data 101, and the same-genre management data 102, each of which are stored in the mobile phone storage section 8, are identical to those described in the foregoing embodiment. Moreover, the positional information extraction section 110 of the mobile phone control section 6 is also identical to that described in the foregoing embodiment.

The mobile phone short distance communication control section 113 returns a connection permission upon receiving a connection request from the car navigation system 30, and establishes a communication connection with the car navigation system 30 via a short distance communication section 9. Once the communication connection is established, a positional information request is transmitted from the car navigation system 30. The mobile phone short distance communication control section 113 which confirms this request reads out the positional-information-attached image 100, the positional information management data 101, and the same-genre management data 102 from the mobile phone storage section 8, and transmits these data to the car navigation system 30.

Moreover, once the destination is set in the car navigation system 30, positional information indicative of a position of the set destination and vicinity information of the destination are transmitted to the mobile phone 1. The mobile phone short distance communication control section 113, upon receiving the vicinity information and the positional information, transmits the received vicinity information and the positional information to the vicinity information obtaining section 116.

The vicinity information obtaining section 116, after receiving the vicinity information, causes the display section 11 to display a message (e.g. M11 of FIG. 27) indicating that the vicinity information has been received. Moreover, the vicinity information obtaining section 116 transmits a vicinity information request of the received positional information to the local information distribution server 60 for example via the telephone network communication section 3, to obtain vicinity information other than the vicinity information received from the car navigation system 30. The vicinity information obtained by the vicinity information obtaining section 116 is stored in the mobile phone storage section 8. The user can check the vicinity information at a preferable timing, by operating the operational section 10.

Detailed Configuration of Car Navigation System 30

Figure 29:
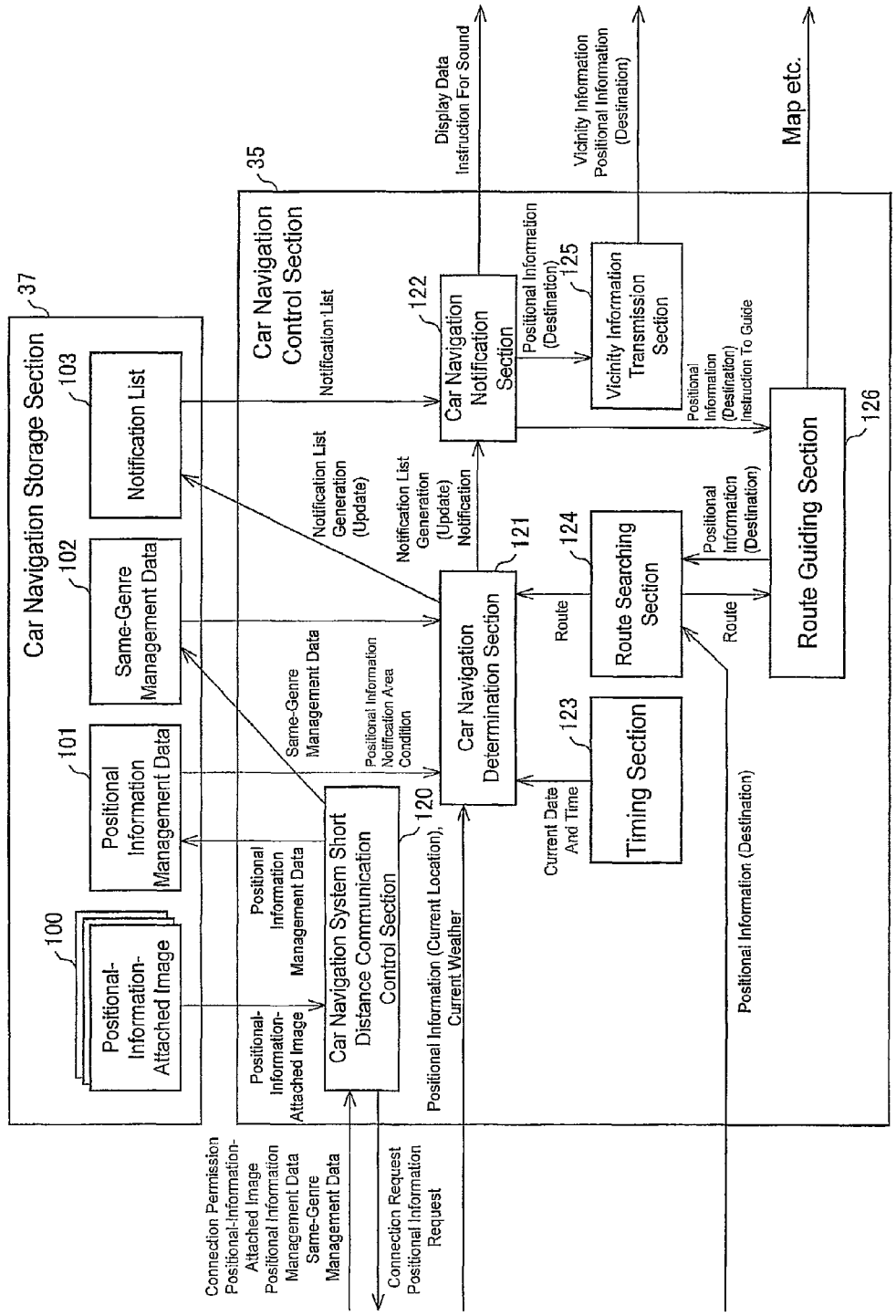
FIG. 29 is a block diagram illustrating an essential feature of the car navigation system.

Next specifically describes a configuration of the car navigation system 30 of the present embodiment, with reference to FIG. 29. FIG. 29 is a block diagram illustrating an essential configuration of the car navigation system 30.

As illustrated in FIG. 29, the car navigation system storage section 37 stores the positional-information-attached image 100, the positional information management data 101, the same-genre management data 102, and the notification list 103. The car navigation system control section 35 includes a car navigation system short distance communication control section 120, a car navigation system determination section (area setting means, route determination means, condition determination means, relation determination means, traveling speed obtaining means, approach determination means) 121, a car navigation system notification section (notification means, route notification means, relation notification means) 122, a timing section 123, a route searching section (route setting means) 124, a vicinity information transmission section 125, and a route guiding section (guiding means) 126.

The positional-information-attached image 100, the positional information management data 101, and the same-genre management data 102 each received from the mobile phone 1 are stored. The notification list 103 is generated and updated by the car navigation system determination section 121.

The car navigation system short distance communication control section 120 transmits a connection request from the short distance communication section 31, after the power of the car navigation system 30 is turned on. When this connection request is received by the mobile phone 1 paired to the car navigation system 30, connection permission is transmitted from the mobile phone 1 to establish the communication connection between the mobile phone 1 and the car navigation system 30.

Upon establishment of the communication connection, the car navigation system short distance communication control section 120 transmits a positional information request to the mobile phone 1, receives the positional-information-attached image 100, the positional information management data 101, and the same-genre management data 102, and stores these received data in the car navigation system storage section 37.

The car navigation system determination section 121, the car navigation system notification section 122, the timing section 123, the route searching section 124, and the route guiding execution section 126 have identical functions as the mobile phone determination section 111, the mobile phone notification section 112, the timing section 114, the route searching section 115, and the route guiding section 117 of Embodiment 1 (see FIG. 1), respectively.

The vicinity information transmission section 125, once the destination of the route to guide is set, receives the positional information of the destination from the car navigation system notification section 122, and obtains vicinity information of the spot identified by the received positional information. Thereafter, the vicinity information transmission section 125 transmits the obtained vicinity information and the received positional information to the mobile phone 1 via the car navigation system short distance communication control section 120.

Connection Process and Coupon Transmission Process Between Mobile Phone 1 and Car Navigation System 30

Figure 30:
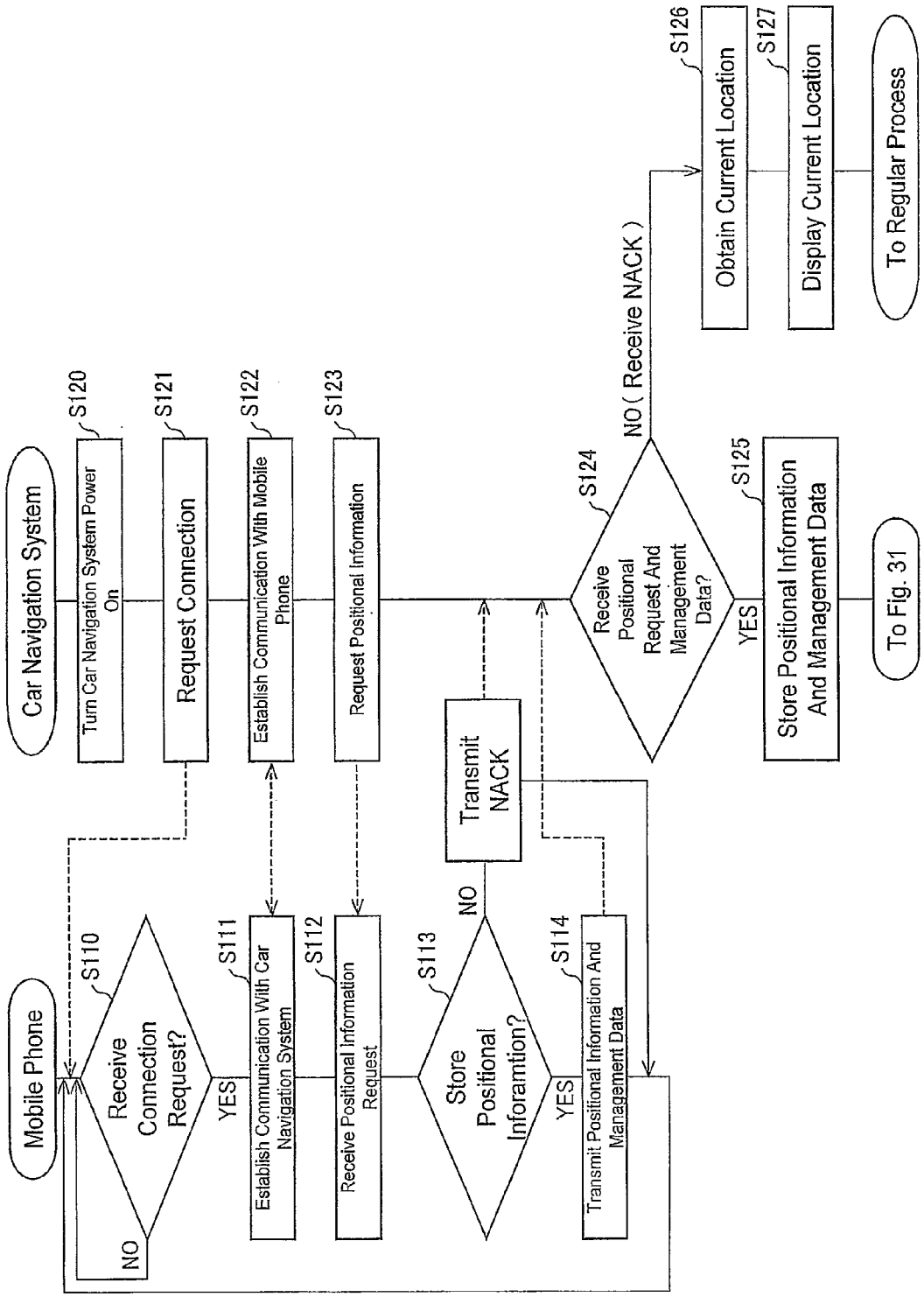
FIG. 30 is a flowchart illustrating an example of a connection process of the mobile phone with the car navigation system and a transmission process of a coupon.

Next described are procedures of a connection process and a coupon transmission process between the mobile phone 1 and the car navigation system 30, with reference to FIG. 30. FIG. 30 is a flowchart illustrating an example of a connection process and a coupon transmission process between the mobile phone 1 and the car navigation system 30.

First described is the process carried out in the mobile phone 1. The mobile phone short distance communication control section 113 of the mobile phone 1 confirms whether or not a connection request is received (S110), and if the connection request is received, the mobile phone 1 establishes a communication connection with the car navigation system 30 which is the transmitter of the connection request (S111). Once the communication connection is established, a positional information request is transmitted from the car navigation system 30. Accordingly, the mobile phone 1 receives this request.

The mobile phone short distance communication control section 113, upon confirmation of receiving the positional information request, confirms whether or not positional information, i.e. the positional-information-attached image 100, is stored in the mobile phone storage section 8 (S113). If it is confirmed that the positional information is stored in the mobile phone storage section 8 (YES in S113), the mobile phone short distance communication control section 113 transmits the positional information and the management data (more specifically, the positional-information-attached image 100, the positional information management data 101, and the same-genre management data 102) to the car navigation system 30 (S114). Thereafter, the process returns to S110.

On the other hand, if it is confirmed that the positional-information-attached image 100 is not stored in the mobile phone storage section 8 (NO in S113), the mobile phone short distance communication control section 113 transmits a NACK to the car navigation system 30, which NACK indicates that the positional-information-attached image 100 is not stored in the mobile phone storage section 8 (S115), and returns to the process of S110.

The following description explains a process carried out by the car navigation system 30. The car navigation system short distance communication control section 120 of the car navigation system 30, once the power of the car navigation system 30 turns ON (S120), causes the short distance communication section 31 to transmit a connection request to surroundings of the car navigation system 30 (S121). By receiving connection permission transmitted in response to this connection request, the communication connection with the mobile phone 1 is established (S122).

Once the communication connection is established, the car navigation system short distance communication control section 120 transmits a positional information request to the mobile phone 1 (S123), and standbys to receive the positional information and the management data (more specifically, the positional-information-attached image 100, the positional information management data 101, and the same-genre management data 102) from the mobile phone 1 (S124).

If reception of the positional information and the management data are confirmed (YES in S124), the car navigation system short distance communication control section 120 stores the received positional information and management data into the car navigation system storage section 37 (S125). Thereafter, in the car navigation system 30, a process of notifying the user of the positional information is carried out based on the stored positional information and management data. This is described later, with reference to FIG. 31.

On the other hand, if no reception of the positional information and management data is confirmed, namely if the reception of NACK is confirmed (NO in S124), the car navigation system short distance communication control section 120 notifies this to the route searching section 124. This causes the car navigation system 30 to carry out operation of a regular car navigation system.

Namely, the route searching section 124 which receives the notification obtains the positional information indicative of the current location of the car navigation system 30 from the position obtaining section 32 (S126), and instructs the route guiding execution section 126 to display the obtained current location on the map (S127). Thereafter, the route searching section 124 continues to obtain the current location and the display instruction. That is to say, regular processes as a car navigation system are carried out.

Notification of Store at which Coupon can be Used and Guiding a Route to the Store by the Car Navigation System 30

Figure 31:
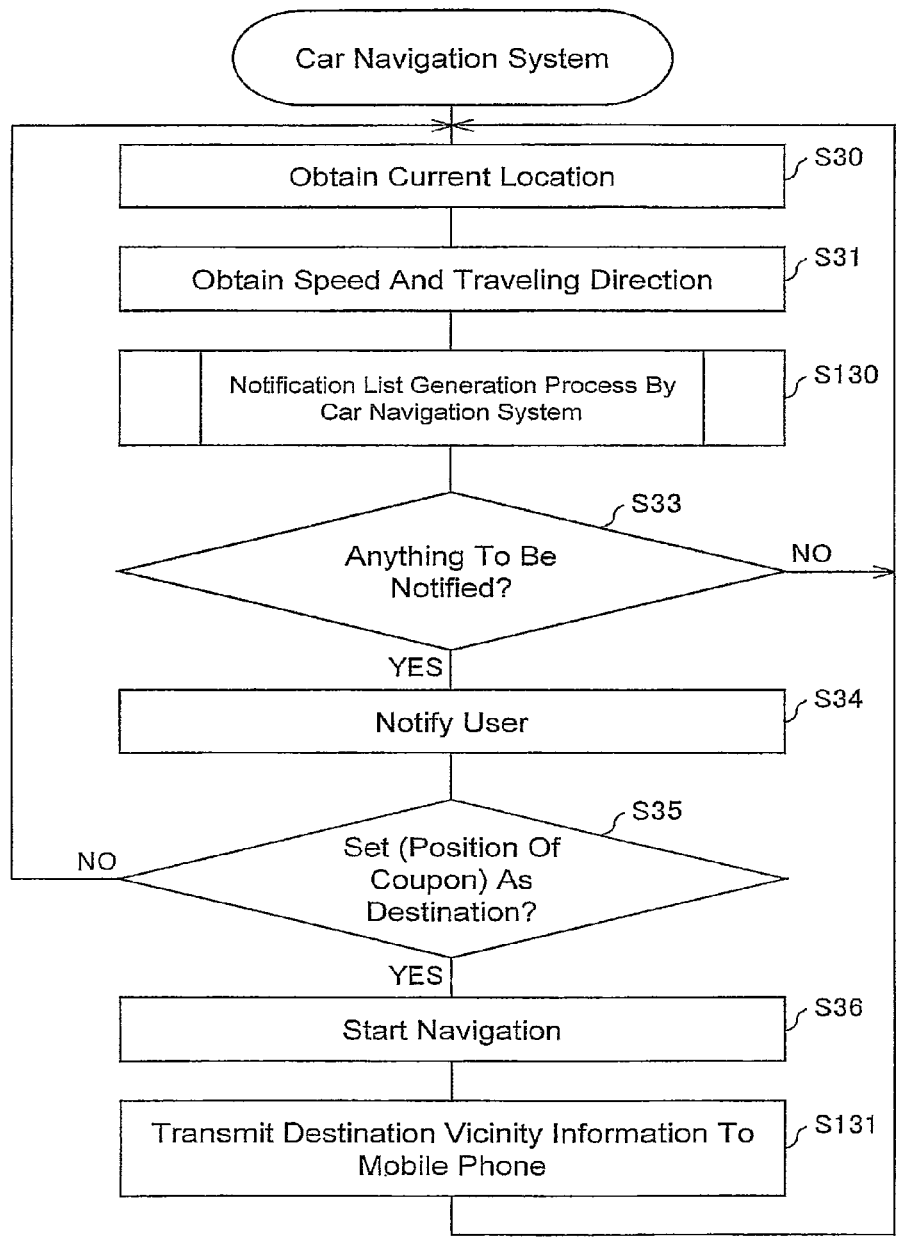
FIG. 31 is a flowchart illustrating an example of notification of a store at which a coupon can be used and guiding of a route to the store, which processes are carried out by the car navigation system.

Next described with reference to FIG. 31 are procedures of the car navigation system 30 to (i) notify a user of a store at which a coupon received from the mobile phone 1 can be used, and (ii) guide a route to that store. FIG. 31 is a flowchart illustrating an example of a notification of a store at which a coupon can be used and a route guiding process to that store, each carried out by the car navigation system 30.

First, the car navigation system determination section 121 obtains the positional information indicative of a current location of the car navigation system 30 from the position obtaining section 32 (S30), and obtains a speed and traveling direction thereof (S31). The speed and traveling direction may be obtained from a vehicle signal input section 38 (see FIG. 11) or may be calculated by a change with time of the current location.

Next, the car navigation system determination section 121 carries out a notification list generation process in the car navigation system (S130). This generates or updates the notification list 103. Thereafter, the car navigation system determination section 121 confirms whether or not the notification list 103 includes any information which should be notified (S33). If there is no information that is required to be notified (NO in S33), the process returns to S30.

On the other hand, if the notification list 103 includes information that should be notified (YES in S33), the car navigation system determination section 121 notifies this to the car navigation system notification section 122, and the car navigation system notification section 122 receiving the notification notifies this to the user (S34). More specifically, the car navigation system notification section 122 causes the display section 40 to display (i) a message indicating that a store at which a coupon can be used is nearby, (ii) an image of the coupon, and (iii) a key for setting the destination and the like as illustrated in FIG. 26, and further causes the audio output section 34 to output a notification sound.

The car navigation system notification section 122 confirms whether or not the store of the displayed coupon is set as the destination (S35). If it is confirmed as not being set (NO in S35), the process returns to S30. On the other hand, if it is confirmed that the store is set as the destination (YES in S35), navigation to that destination is started (S36).

Moreover, when the store is set as the destination, the car navigation system notification section 122 transmits the positional information indicative of the position of the set destination to the vicinity information transmission section 125. The vicinity information transmission section 125 which receives the positional information obtains vicinity information of the position identified by the received positional information by use of map information or the like stored in the car navigation system storage section 37. Thereafter, the vicinity information transmission section 125 instructs the car navigation system short distance communication control section 120 to transmit the obtained vicinity information and the positional information received from the car navigation system notification section 122 to the mobile phone 1 (S131). Thereafter, the process returns to S30.

Notification List Generation Process in Car Navigation System

Figure 32:
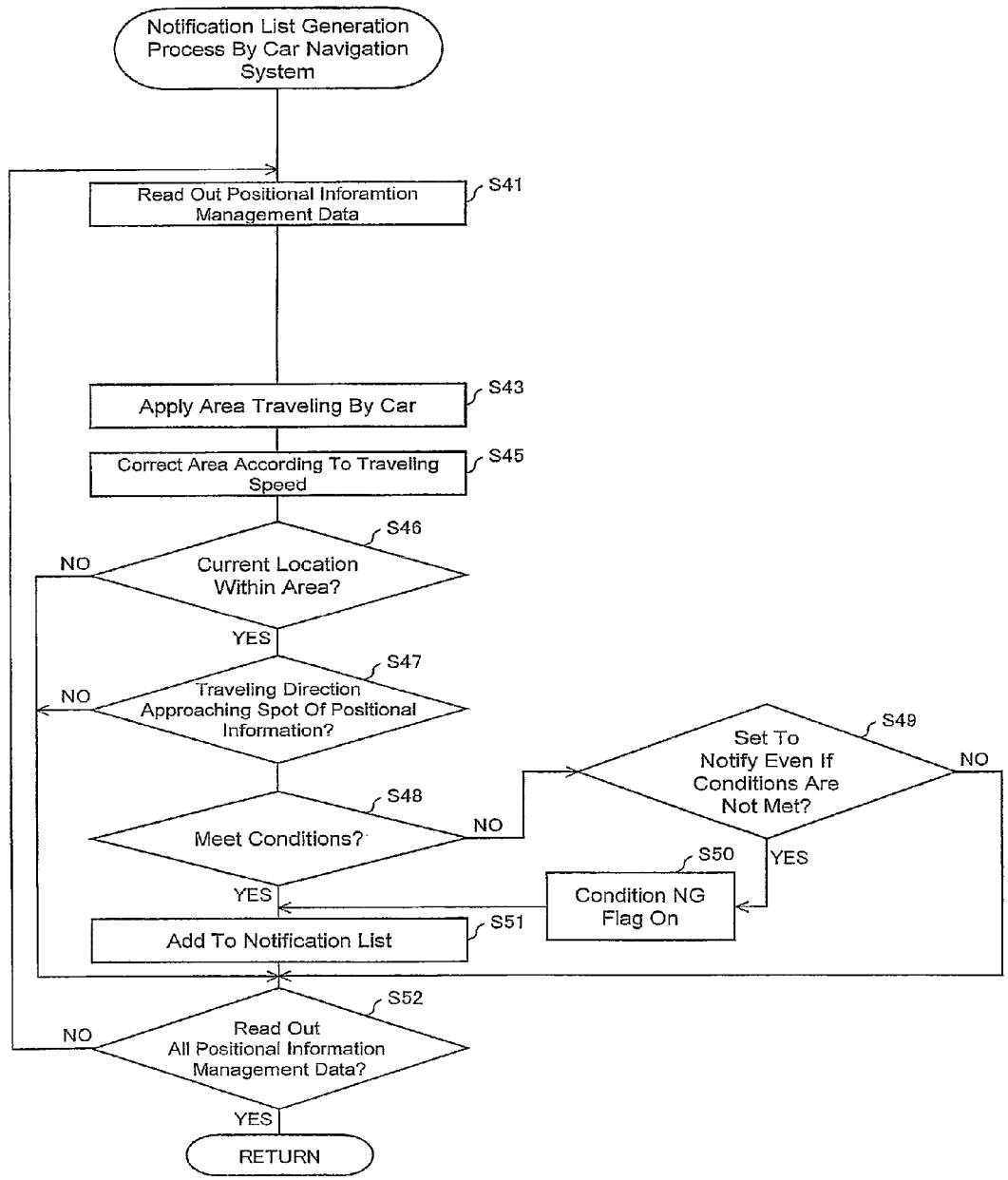
FIG. 32 is a flowchart illustrating an example of a notification list generation process by the car navigation system, which process is carried out by the car navigation system.

The following description explains, with reference to FIG. 32, the notification list generation process in the car navigation system, which process is carried out in S130 of FIG. 31. FIG. 32 is a flowchart illustrating an example of the notification list generation process in the car navigation system.

First, the car navigation system determination section 121 reads out one positional information set from the positional information management data 101 in the car navigation system storage section 37, and determines to apply an area traveling by car as the notification area. Moreover, the car navigation system determination section 121 corrects the determined notification area in accordance with the traveling speed of the car navigation system 30 (S41, S43, and S45).

Once the notification area is determined as described above, the car navigation system determination section 121 determines whether or not the current position obtained by the position obtaining section 32 is within the notification area (S46). If it is determined that the current position is not within the notification area (NO in S46), the process proceeds to the process of S52 to confirm whether all of the positional information sets have been read out. If all of the positional information sets have been read out then the process is terminated, and if not the process returns to the process of S41.

On the other hand, if the current position is determined as being within the notification area (YES in S46), the car navigation system determination section 121 confirms whether or not the current date and time and the weather meets the "Condition" included in the positional information set read out (S48).

If it is confirmed that the conditions are met (YES in S48), the positional information and the like included in the positional information set are added into the notification list, and the process proceeds to the process of S51. On the other hand, if it is confirmed that the conditions are not met (NO in S48), it is confirmed whether or not the setting is made to notify in the case where the conditions are not met (S49).

If it is confirmed that the setting is made not to notify (NO in S49), the process proceeds to S52. On the other hand, if it is confirmed as being set to notify (YES in S49), (a) the positional information and the like included in the positional information set and (b) information indicative that the condition NG flag is ON are added to the notification list. Thereafter, the process proceeds to S52.

In S52, the car navigation system determination section 121 confirms whether or not all of the positional information sets have been read out. If it is confirmed that there are some positional information sets that have not been read out (NO in S52), the process returns to the process of S41. On the other hand, if it is confirmed that all of the positional information sets have been read out (YES in S52), the car navigation system determination section 121 terminates the notification list generation process by the car navigation system.

Notification of Store at which Coupon can be Used on Route and Guiding of Route to the Store, by Car Navigation System 30

Figure 33:
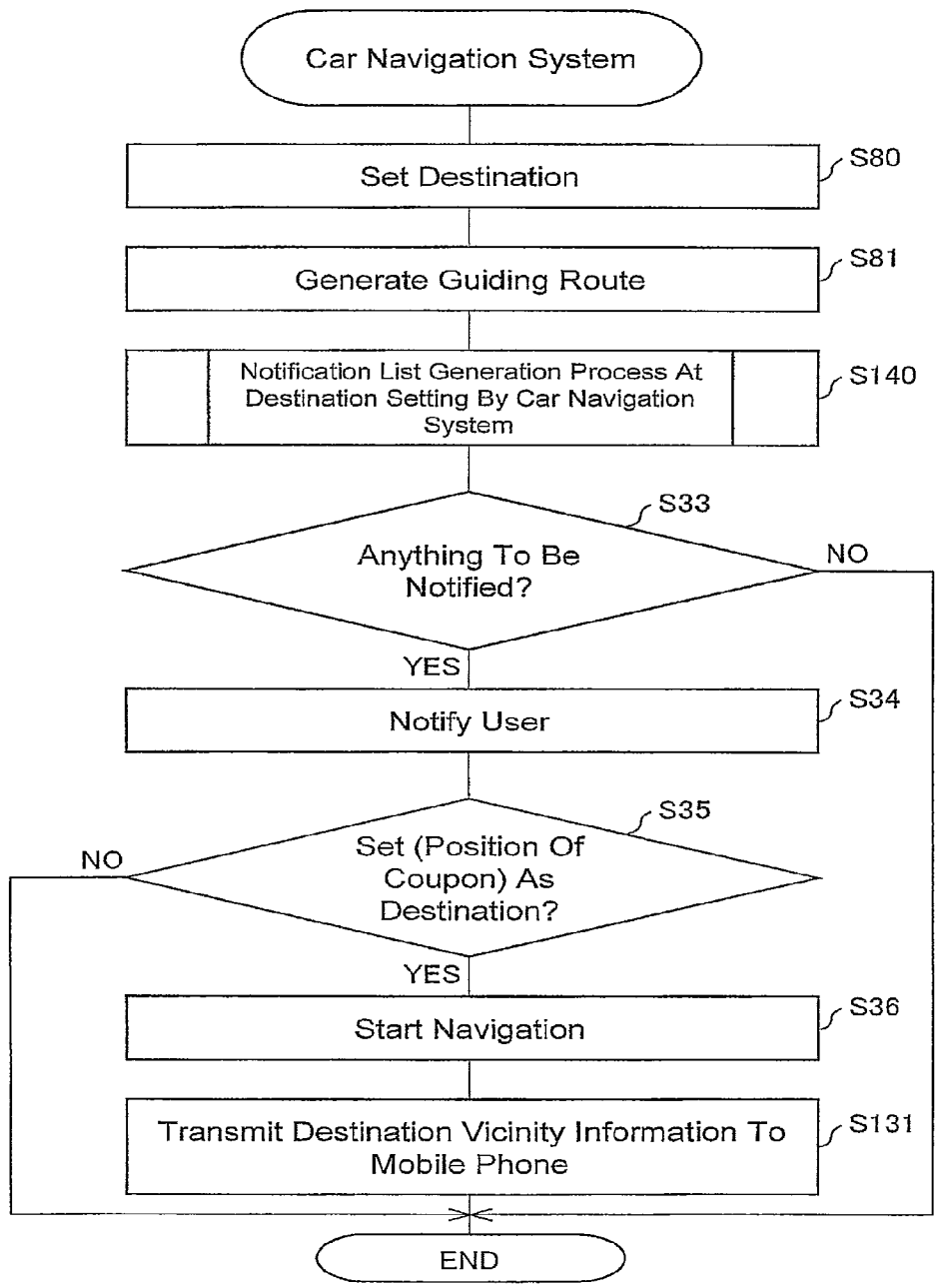
FIG. 33 is a flowchart illustrating an example of processes carried out by the car navigation system, for notifying a user of a store at which a coupon can be used and guiding a route to the store, which notifying and guiding are carried out when a set route enters a notification area of the store at which the coupon can be used.

Next described with reference to FIG. 33 is a procedure for notifying a user of a store at which a coupon can be used and guiding a route to that store in a case where a route from a departing position to a destination position is within a notification area of the store at which the coupon can be used, which route is generated at a time when the car navigation system 30 is to guide the route to that store. FIG. 33 is a flowchart illustrating a process of notifying the store to the user, at a time when a set route guided by the car navigation system 30 enters the notification area of the store at which a coupon can be used, and the process of guiding the route to the store.

When the destination is set (S80), the positional information of the set destination is transmitted to the route searching section 124. The route searching section 124 then generates a route for guiding the route to the destination identified by the received positional information (S81). Thereafter, the route searching section 124 transmits the information indicative of the generated route to the car navigation system determination section 121.

The car navigation system determination section 121 receiving the information indicative of the route carries out a list generation process at destination setting in the car navigation system (S140). This generates or updates the notification list 103. Thereafter, the car navigation system determination section 121 confirms whether or not the notification list 103 includes any information that should be notified (S33). If no information that should be notified is included (NO in S33), the process is terminated. In this case, the route to the destination that is set in S80 is guided.

On the other hand, if information that should be notified is included (YES in S33), the car navigation system determination section 121 notifies this to the car navigation system notification section 122, and the car navigation system notification section 122 receiving this notification notifies this to the user (S34). More specifically, the car navigation system notification section 122 causes the display section 40 to display (i) the message indicating that a store at which the coupon can be used is located nearby, (ii) an image of the coupon, and (iii) a key for setting the destination and the like, as illustrated in FIG. 26, and further causes the audio output section 34 to output a notification sound.

Thereafter, the car navigation system notification section 122 confirms whether or not the store of the displayed coupon is set as the destination (S35). If it is confirmed that the store has not been set as the destination (NO in S35), the process is terminated. On the other hand, if it is confirmed that the store has been set as the destination (YES in S35), the navigation to that destination is started (S36).

Moreover, when the destination is set, the car navigation system notification section 122 transmits the positional information indicative of the position of the destination to the vicinity information transmission section 125. The vicinity information transmission section 125 which receives the positional information obtains vicinity information of the position identified by the received positional information, with use of map information and the like stored in the car navigation system storage section 37. Thereafter, the vicinity information transmission section 125 instructs the car navigation system short distance communication control section 120 to transmit the obtained vicinity information and the positional information received from the car navigation system notification section 122 to the mobile phone 1 (S131). As a result, the process terminates.

Figure 34:
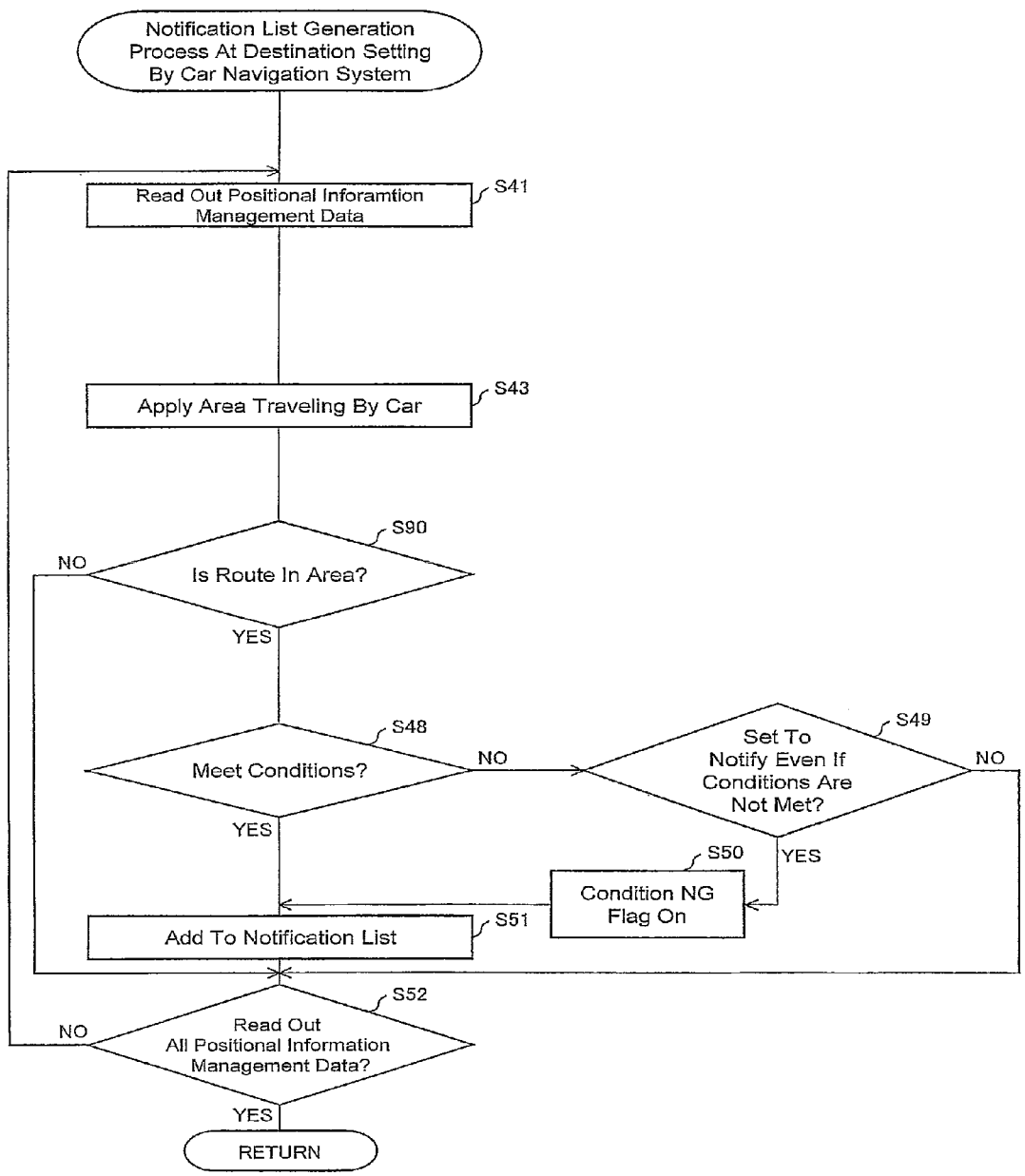
FIG. 34 is a flowchart illustrating an example of a notification list generation process by a car navigation system at destination setting, which process is carried out by the car navigation system.

Notification List Generation Process at Destination Setting in Car Navigation System Next described with reference to FIG. 34 is a procedure of the notification list generation process at destination setting by the car navigation system, which process is carried out in S140 of FIG. 33. FIG. 34 is a flowchart illustrating an example of the notification list generation process at destination setting by the car navigation system.

First, the car navigation system determination section 121 reads out one positional information set from the positional information management data 101 of the car navigation system storage section 37 (S41), and determines to apply the notification area for traveling by car (S43). It is considered that the user of the car navigation system 30 has not yet started traveling at the time when the user is setting the destination. Hence, in the illustrated example, no correction of the notification area is carried out based on the traveling speed of the car navigation system 30. Of course, correction of the notification area may be carried out based on the traveling speed of the car navigation system 30 upon setting the destination.

Next, the car navigation system determination section 121 determines whether or not the guiding route generated in S81 of FIG. 33 enters inside the determined notification area (S90). If it is determined that the route does not enter inside the notification area (NO in S90), the process proceeds to S52. In this case, the positional information is not added to the notification list 103.

On the other hand, if the route is determined as entering inside the notification area (YES in S90), the car navigation system determination section 121 confirms whether or not the current date and time and the weather meet the "Condition" included in the positional information set (S48).

If it is confirmed that the conditions are met, the car navigation system determination section 121 adds, to the notification list, the positional information and like information (name, positional information, genre, conditions) included in the positional information set read out in S41 (see FIG. 14). Moreover, in a case where the conditions are not met however setting is made so that notification is also carried out for ones that do not meet the conditions, (i) the positional information and like information included in the positional information set and (ii) information indicating that the condition NG flag is ON are added to the notification list (S48 to S51).

The car navigation system determination section 121 confirms whether or not all of the positional information sets have been read out (S52). In the case where it is confirmed that there still is some positional information sets that have not been read out yet (NO in S52), the process returns to the process of S41. On the other hand, if it is confirmed that all of the positional information sets have been read out (YES in S52), the car navigation system determination section 121 terminates the notification list generation process at destination setting in the car navigation system.

Although the foregoing description omits the example of generating the notification list 103 with use of the same-genre management data 102, it is possible to generate the notification list 103 with use of the same-genre management data 102, through identical processes as those described in Embodiment 1.

Moreover, the foregoing describes an example in which the reading out of the positional information from the coupon is carried out by the mobile phone 1, however by providing a positional information extraction section 110 to the car navigation system 30, the car navigation system 30 becomes capable of reading out the positional information and generating the positional information management data 101, the same-genre management data 102, and the notification list 103. In this case, the mobile phone 1 just requires transmitting the obtained coupons to the car navigation system 30.

Embodiment 3

Described below is another embodiment related to the mobile phone 1 of the present invention, with reference to FIGS. 35 to 39. For easy explanation, members and processes having identical functions as the drawings described in the foregoing embodiments are provided with identical reference signs, and their descriptions have been omitted. The hardware configurations of the mobile phone 1 and the car navigation system 30 are as illustrated in FIG. 11.

Overview

Figure 35:
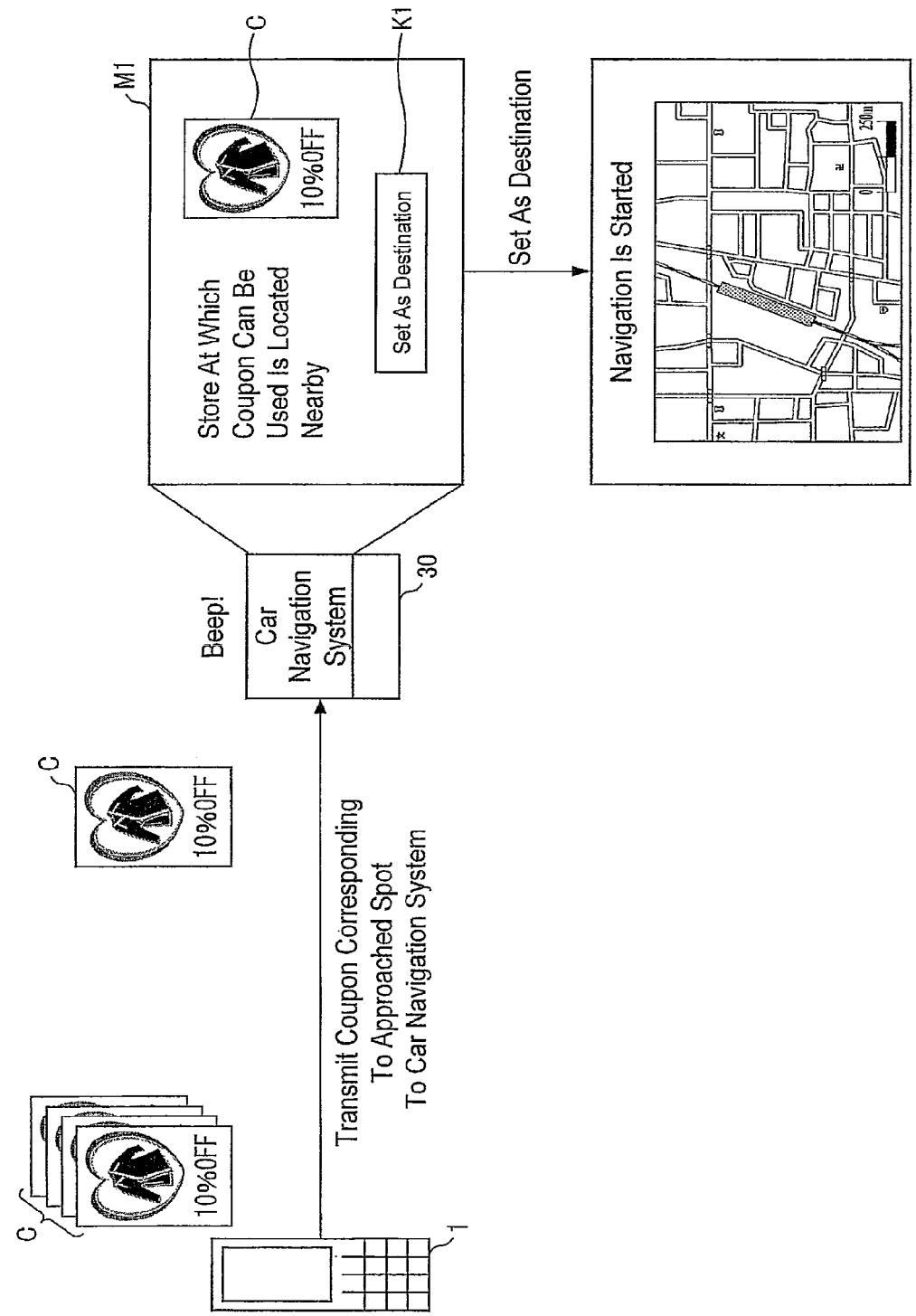
FIG. 35 is a view illustrating an overview of operations carried out by a mobile phone and a car navigation system, according to yet another embodiment of the present invention.

First described is an overview of operations carried out by the mobile phone 1 and the car navigation system 30 of the present embodiment, with reference to FIG. 35. FIG. 35 is a view illustrating an overview of the operations carried out by the mobile phone 1 and the car navigation system 30.

As described in FIG. 35, the mobile phone 1 of the present embodiment, at a time when the mobile phone 1 approaches a spot indicated by a coupon (when the mobile phone 1 enters a notification area of the coupon), transmits the coupon to the car navigation system 30. The car navigation system 30 then displays the coupon received from the mobile phone 1.

In the illustrated example, (i) the message M1 indicating that a store at which the coupon can be used is nearby, (ii) the image C of the coupon, and (iii) the key K1 for setting the store as a destination are displayed, as similar to the example of FIG. 2. Upon selecting the key K1, the store is set as the destination of the car navigation system 30 as illustrated in FIG. 35, and the route to the store is guided.

Namely, as similar to Embodiment 2, the present embodiment is an embodiment in which a part of the processes carried out solely by the mobile phone 1 in Embodiment 1 is made to be carried out by the car navigation system 30.

Operation Example

Figure 36:
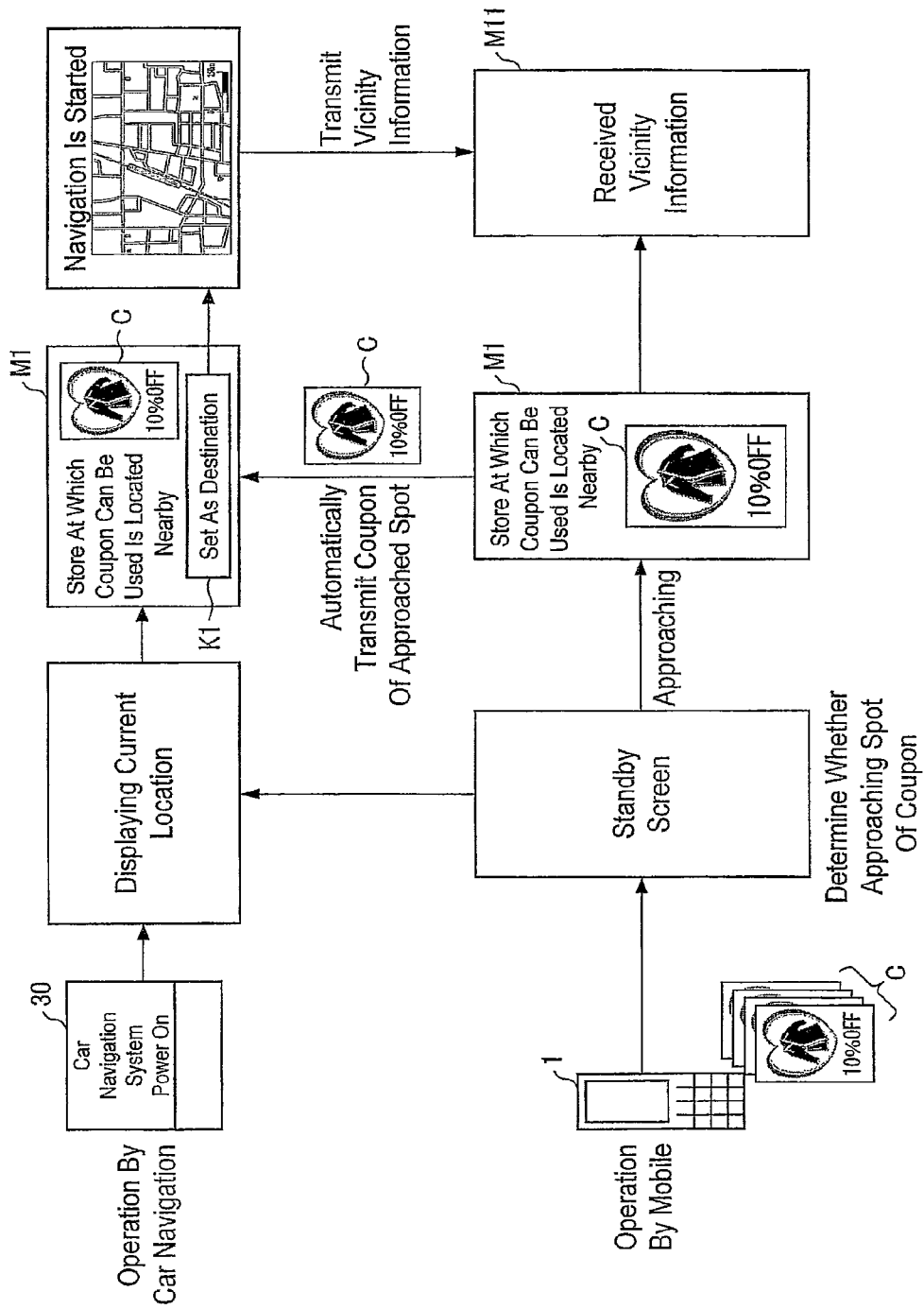
FIG. 36 is a view illustrating an example of what is displayed on a display screen, while the mobile phone and the car navigation system are operated.

The following description explains an operation example of the mobile phone 1 and the car navigation system 30, with reference to FIG. 36. FIG. 36 is a view illustrating an example of a display screen displayed during operation of the mobile phone 1 and the car navigation system 30.

Once an engine of a car on which the car navigation system 30 is installed is turned on, the power of the car navigation system 30 turns on, and regular operation of a car navigation system is started. Namely, the car navigation system 30 carries out an operation to display a current position of the car navigation system 30 on a map.

Meanwhile, the mobile phone 1 stores a plurality of coupons. The mobile phone 1 determines whether or not the mobile phone 1 has approached any spots of the stored coupons, that is, whether or not the mobile phone 1 has entered into a notification area that is set based on a point indicated by the positional information of the coupons.

If it is determined here that the mobile phone 1 has entered into the notification area, the mobile phone 1 notifies this to the user, as well as transmitting to the car navigation system 30 the coupon of the spot that the mobile phone 1 has approached. The notification to the user in the mobile phone 1 may be carried out by displaying the message M1 and the image C of the coupon, which message M1 indicates that the store at which the coupon can be used is nearby.

The notification to the user is also carried out by the car navigation system 30 that receives the coupon from the mobile phone 1. In the illustrated example, the key K1 for setting the spot of the coupon as the destination is displayed in addition to the message M1 and the coupon image C. The user, by selecting the key K1, can cause the car navigation system 30 to guide the route to the spot of the coupon. A user who is driving cannot see the screen of the mobile phone 1, so notification can be carried out just on the car navigation system 30.

Upon selecting the key K1, information in the vicinity of the spot of the coupon is transmitted from the car navigation system 30 to the mobile phone 1. The mobile phone 1 which receives this information may display a message M11 indicating that vicinity information has been received. This allows for the user of the mobile phone 1 to confirm that the vicinity information has been received.

Specific Configuration of Mobile Phone 1

Figure 37:
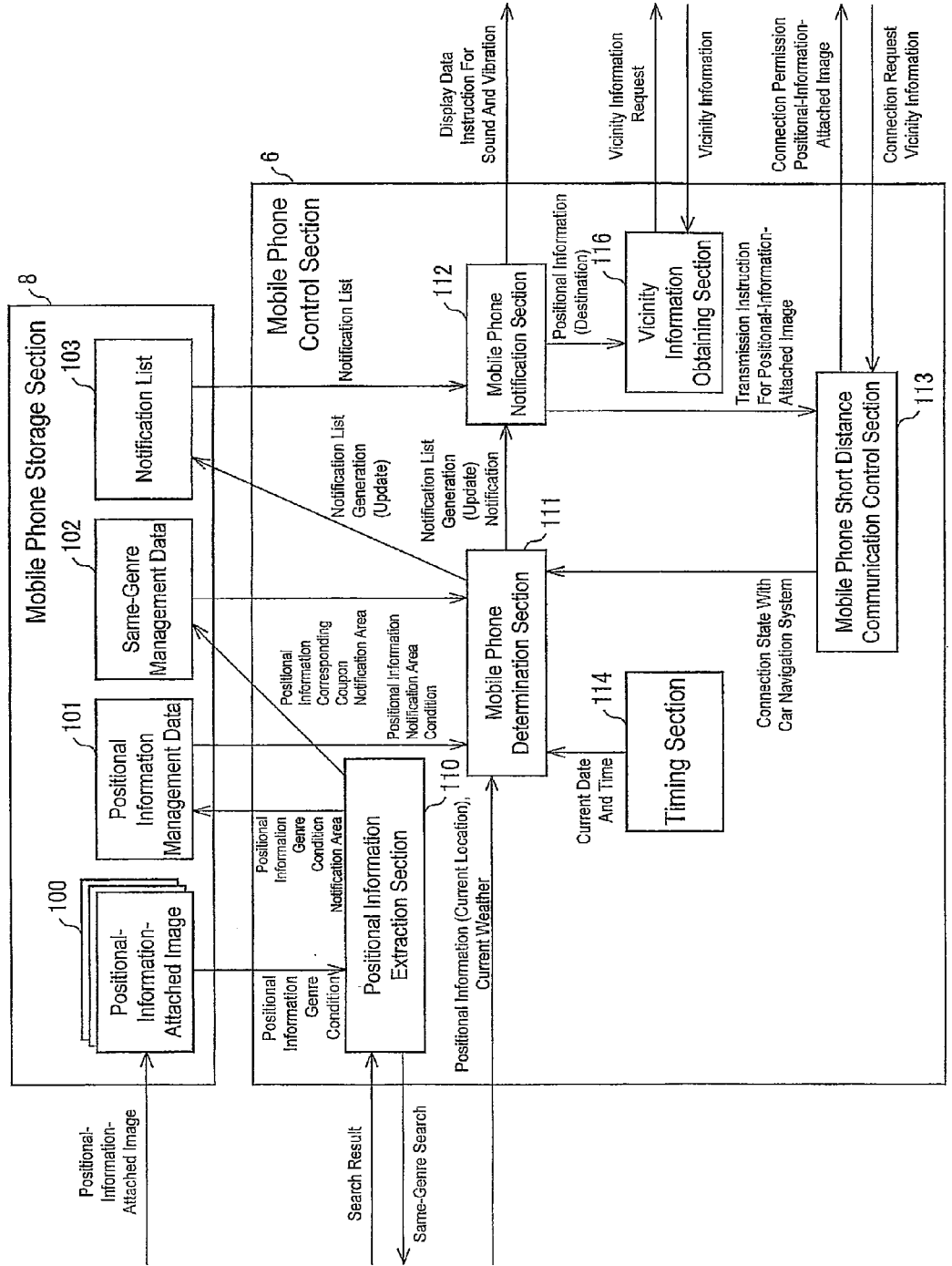
FIG. 37 is a block diagram illustrating an essential configuration of the mobile phone.

The following description specifically explains the configuration of the mobile phone 1 of the present embodiment, with reference to FIG. 37. FIG. 37 is a block diagram illustrating an essential configuration of the mobile phone 1.

The block diagram in FIG. 37 differs from the block diagram of FIG. 1 in that the route searching section 115 and the route guiding section 117 are not included in the mobile phone 1. These configurations are provided in the car navigation system 30. Of course, these configurations may also be provided in the mobile phone 1, however for easy explanation, just the configurations required for accomplishing the functions of the mobile phone 1 of the present embodiment are described in the present embodiment.

The mobile phone 1 of the present embodiment differs from Embodiments 1 and 2 in that notification is carried out to the user by the mobile phone notification section 112 transmitting the positional-information-attached image 100 (coupon) to the car navigation system 30. Namely, the mobile phone 1 of the present embodiment functions as a positional information transmission device which transmits the positional information to the car navigation system 30. Furthermore, the car navigation system 30 functions as a notification device which notifies the user based on the positional information received from the mobile phone 1. As such, in the present embodiment, the notification to the user is carried out via a communications system including the mobile phone 1 and the car navigation system 30.

Specific Configuration of Car Navigation System 30

Figure 38:
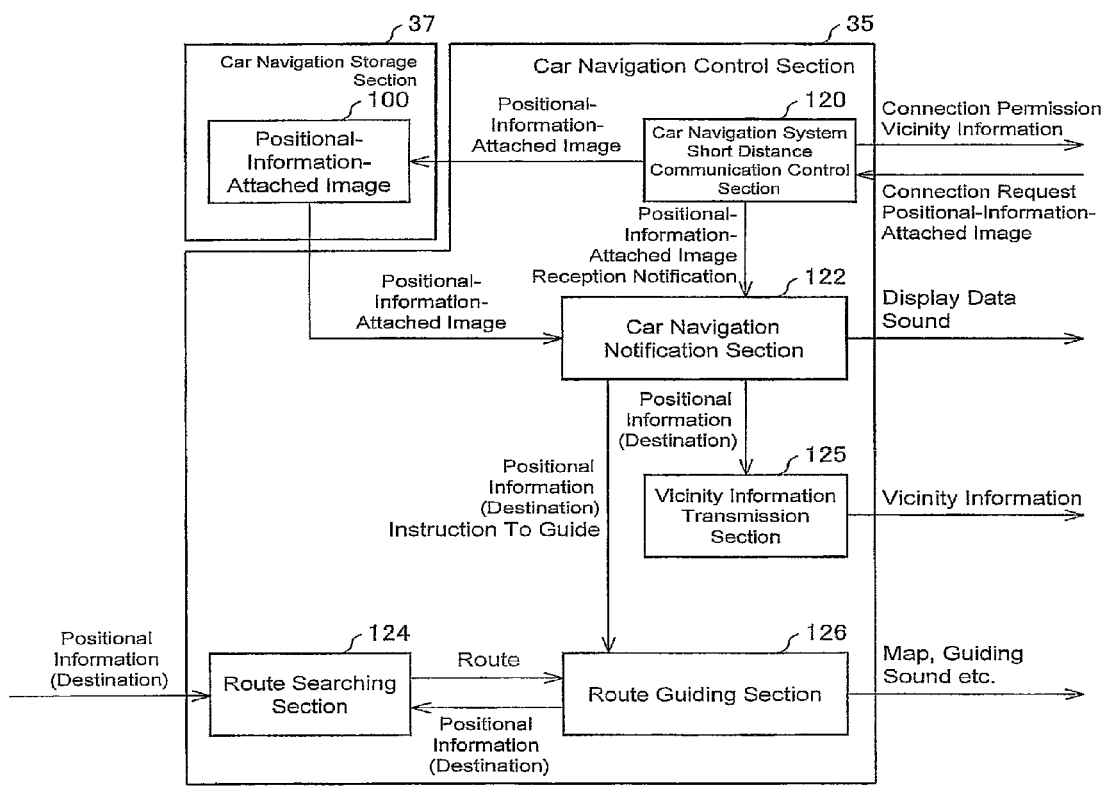
FIG. 38 is a block diagram illustrating an essential configuration of the car navigation system.

Next specifically described is the configuration of the car navigation system 30 of the present embodiment, with reference to FIG. 38. FIG. 38 is a block diagram illustrating an essential configuration of the car navigation system 30.

As described in FIG. 38, the car navigation system storage section 37 stores the positional-information-attached image 100. This positional-information-attached image 100 is received from the mobile phone 1. Moreover, the car navigation system control section 35 includes a car navigation system short distance communication control section 120, a car navigation system notification section 122, a route searching section 124, a vicinity information transmission section 125, and a route guiding section 126.

The car navigation system short distance communication control section 120, after the power of the car navigation system 30 is turned on, transmits a connection request from the short distance communication section 31. When this connection request is received by the mobile phone 1 paired with the car navigation system 30, connection permission is transmitted from the mobile phone 1 to establish a communication connection between the mobile phone 1 and the car navigation system 30.

The positional information attached image 100 is transmitted from the mobile phone 1 via the communication connection established as described above. Hence, the car navigation system short distance communication control section 120 stores the positional-information-attached image 100 thus received to the car navigation system storage section 37, as well as notifying the car navigation system notification section 122 that the positional-information-attached image 100 is stored in the short distance communication control section 120.

The car navigation system notification section 122, upon receiving the notification from the car navigation system short distance communication control section 120, reads out the positional-information-attached image 100 from the car navigation system storage section 37, and displays this on the display section 40 together with a predetermined message or the like (e.g. the message M1 and the key K1, of FIG. 35).

Moreover, when the spot of the displayed positional-information-attached image 100 is set as the destination, the car navigation system notification section 122 extracts the positional information from the positional-information-attached image 100 thus read out, and transmits the extracted positional information to the vicinity information transmission section 125 and the route guiding section 126. This allows for the vicinity information transmission section 125 to obtain the vicinity information of the spot identified by the positional information and transmits the vicinity information to the mobile phone 1. Moreover, the route guiding section 126 works in cooperation with the route searching section 124, to guide a route to the spot identified by the positional information.

Procedure of Processes Carried Out by Mobile Phone 1 and Car Navigation System 30

Next described with reference to FIG. 39 is a procedure of notifying the user of the store at which the coupon can be used and of guiding a route to the store by the mobile phone 1 and the car navigation system 30 of the present embodiment. FIG. 39 is a flowchart illustrating an example of a notification of a store at which the coupon can be used and guiding of a route to that store, carried out by having the mobile phone 1 transmit the coupon to the car navigation system 30.

First explained in the present embodiment is processes carried out by the mobile phone 1. The mobile phone determination section 111 of the mobile phone 1 obtains from the position obtaining section 2 the positional information indicative of a current location of the mobile phone 1 (S30), and further obtains a speed and a traveling direction (S31).

Next, the mobile phone determination section 111 carries out the notification list generation process as illustrated in FIG. 19 (S32). This generates or updates the notification list 103. Instead of S32, a same genre notification list generation process (S60) of FIG. 21 may be carried out.

Thereafter, the mobile phone determination section 111 confirms whether or not anything that should be notified is included in the notification list 103 (S33). If nothing to be notified is included (NO in S33), the process returns to the process of S30.

On the other hand, if there is something to be notified (YES in S33), the mobile phone determination section 111 notifies the mobile phone notification section 112 that the notification list 103 includes something to be notified. The mobile phone notification section 112 receiving this notification transmits the positional information to be notified to the user (the positional-information-attached image 100 in the embodiment, which image is the image incorporating the positional information) to the car navigation system 30 (S150). At this time, the mobile phone notification section 112 may display, as illustrated in FIG. 36, (i) a message indicating that a store at which a coupon can be used is nearby, and (ii) images and the like of the coupon, on the display section 40.

The mobile phone notification section 112 then standbys to receive vicinity information of the destination, from the car navigation system 30. In this case, if no reception of the vicinity information of the destination can be confirmed within a set time after transmitting the positional information (positional-information-attached image 100) (NO in S151), the process returns to the process of S30.

On the other hand, if the reception of the vicinity information of the destination is confirmed within the set time (YES in S151), the mobile phone notification section 112 extracts the positional information from the notification list 103 and transmits the extracted positional information to the vicinity information obtaining section 116.

The vicinity information obtaining section 116 which receives the positional information transmits (i) the received positional information and (ii) a vicinity information request for requesting transmission of vicinity information around a spot identified by the positional information, to a service (e.g. the local information distribution server 60 of FIG. 11) via the telephone network communication section 3 (S37), to obtain the vicinity information from the service (S38). Thereafter, the mobile phone 1 returns to its regular operation as a mobile phone (e.g. returns to the phone call standby state).

Next described is a process carried out by the car navigation system 30. The car navigation system 30 carries out regular operation as a car navigation system until the car navigation system 30 receives the positional information (positional-information-attached image 100 in the present embodiment) from the mobile phone 1. This causes the display section 40 of the car navigation system 30 to display a current location of the car navigation system 30 on a map (S127).

The car navigation system short distance communication control section 120 confirms whether or not the positional information (positional-information-attached image 100) is received from the mobile phone 1 (S160). If no reception is confirmed (NO in S160), the process returns to the process of S127. Alternatively, if the reception is confirmed (YES in S160), the received positional-information-attached image 100 is stored in the car navigation system storage section 37, and further this is notified to the car navigation system notification section 122.

The car navigation system notification section 122 that receives the notification extracts the positional information from the positional-information-attached image 100 stored in the car navigation system storage section 37, and transmits the extracted positional information to the vicinity information transmission section 125 and the route guiding section 126. Hence, the route guiding section 126 starts navigating to the spot identified by the positional information in cooperation with the route searching section 124 (S36). Moreover, the vicinity information transmission section 125 obtains the vicinity information of the spot identified by the positional information, and transmits the vicinity information to the mobile phone 1 (S131).

Although the foregoing description omits examples of generating the notification list 103 with use of the same-genre management data 102 and generating the notification list 103 at the time of setting the destination, it is possible to generate the notification list 103 with use of the same-genre management data 102 and to generate the notification list 103 at the time of setting the destination, similarly as in the processes described in Embodiment 1 or 2.

The present invention is not limited to the description of the embodiments above, but may be altered by a skilled person within the scope of the claims. An embodiment based on a proper combination of technical means disclosed in different embodiments is encompassed in the technical scope of the present invention.

As described above, a notification device of the present invention includes: a data storage section configured to store both of (i) data including positional information and (ii) data including no positional information; identification means for identifying the data including positional information from among the data stored in the data storage section; positional information extraction means for extracting positional information to be used as a standard for setting the predetermined area, the positional information being extracted from among the data identified by the identification means as including the positional information; area setting means for setting the predetermined area on a basis of the positional information extracted by the positional information extraction means; and notification means for carrying out notification to the user of the notification device at a time when a current position of the notification device enters within the predetermined area set by the area setting means.

According to the configuration, the user can receive a notification from the notification device based on positional information just by carrying out an extremely simple operation of storing data which includes the positional information in a data storage section without having to distinguish the data which includes the positional information from data which includes no positional information, that is, without being conscious of whether or not the positional information is included in the data, and without having to carry out any operation of selecting a spot to be notified.

Moreover, it is preferable that the data storage section store (i) image data into which the positional information is incorporated and (ii) image data into which no positional information is incorporated, and the identification means identifies the image data including the positional information by confirming whether or not the positional information is incorporated into the image data stored in the data storage section.

In the case where the data including the positional information is image data into which the positional information is incorporated, the data including the positional information can be handled similarly with regular image data including no positional information. For instance, the data can be easily sent and received by attaching the data to an e-mail, receiving distribution from a service, downloading from a service, or the like.

The user can thus receive a notification based on the positional information just by storing in the data storage section the image in which the positional information is incorporated, without distinguishing that from a regular image including no positional information. In this case, the user requires no operation of selecting an image targeted for notification. Moreover, the data including the positional information is easily identified by confirming whether or not the positional information is incorporated into the image data. Note that the positional information is incorporated into the image data for example as header information of the image data. In this case, it is possible to easily confirm whether or not the positional information is incorporated, by referring to the header information.

Moreover, it is preferable that the notification device include guiding means for guiding the user to a spot indicated by the positional information, the notification means making the guiding means guide the user to a spot indicated by the positional information used as a standard to set the predetermined area, at the time when the current position of the notification device enters within the predetermined area.

According to the configuration, the notification device guides to a spot indicated by the positional information upon entering inside an area that is set based on the positional information. This allows for the user of the notification device to smoothly arrive at the spot indicated by the positional information. If the spot indicated by the positional information is set as a destination spot, the guiding is carried out until that spot, and if the spot is set as a spot being passed through, the guiding is carried out to a different destination spot after arriving at the spot.

Moreover, it is preferable that the notification device include: route setting means for setting a route to guide the user of the notification device; and route determination means for determining whether or not at least a part of the route set by the route setting means is included in the predetermined area, the notification means notifying the user of the notification device in a case where the route determination means determines that at least a part of the route is included in the predetermined area.

In a case where a route for guiding a user is set, it is considered that a user would possibly travel along that outputted route.

According to the configuration, the user is notified in a case where at least a part of the route for guiding the user enters within the area. This allows for the user to be aware of a spot near the route (spot of the positional information stored in the data storage section), and allows for dropping in at that spot when traveling along the route.

The route may be a route connecting a departure spot and a destination spot registered into the notification device for example, or may be a route connecting a destination registered into the notification device and a current position of the notification device.

Moreover, it is preferable that the notification device is configured in such a manner that the positional information is positional information of a spot where the user may drop in at, the positional information being associated with a condition for determining whether or not the user may drop in at the spot, the notification device further including: condition determination means for determining, at the time when the current position of the notification device enters within the predetermined area, whether or not the condition associated with the positional information is met, the positional information being used as a standard for setting the predetermined area, the notification means either notifying the user that the condition is not met or canceling the notifying to the user in a case where the condition determination means determines that the condition is not met.

The notification device of the present invention carries out a notification so that a user can drop in at the spot of the positional information. However, depending on circumstances, there may be cases where there is no meaning to drop in at the spot. For example, in a case where the positional information indicates a spot of a store, the user cannot take advantage of that store if the user drops in at the store during its off hours.

According to the configuration, the user is notified as usual if conditions for determining whether or not the user would drop in at the spot are met, and if the conditions are not met, either the fact that the conditions are not met is notified to the user, or no notification is made to the user.

The user may be notified just when the conditions are met, by having no notification be made when the conditions are not met. Alternatively, by notifying the fact that the conditions are not met, the user can be aware of the spot and that the conditions thereof have not been met. By being aware of this fact, the user can select to either drop in at the spot now, drop in at a later date, or not drop in at the spot. Note that it is preferable to allow the user to set whether or not the notification is carried out to the user in the case where the conditions are not met.

Although the conditions may be any condition as long as the condition can serve as a standard for determining whether or not the user is to drop in at the spot, it is preferable that the condition is a condition that can be determined whether or not the condition is met based on a date and time, and the condition determination means determines whether or not the condition is met based on a current date and time.

There are cases where it is possible to determine whether or not the user would drop in at a spot based on a date and time. For example, in a case where a store is located at the spot (in a case where the positional information indicates a spot at which a store is located), it can be determined that the user will not drop in at that spot from now when the current date and time is within an off-hour time zone of the store. In contrast, if the current date and time belongs to a time zone of operating hours of the store, it can be determined that the user would possibly drop in at that spot from now.

Hence, according to the configuration, it is possible to notify the user, in accordance the current date and time, of a spot that is determined as a spot the user would possibly drop in at, while carrying out no notification of a spot determined as not possibly being dropped in at by the user. Alternatively, the user may be notified that the current date and time do not meet the conditions.

The condition may be, for example, a period, a day of the week, a date, a time zone, and like conditions. Namely, at least one of a period, a day of the week, a date, and a time zone is associated with the positional information.

Moreover, it is preferable that the condition is a condition that can be determined whether or not the condition is met based on weather, and the condition determination means determines whether or not the condition is met based on a current weather.

According to the configuration, it can be made so that no notification is made for example in a case where the spot indicated by the positional information is a spot that cannot be used depending on the weather at that time, such as an outdoor sports facility or like facility, or it can be made so that the user is notified of a fact that the facility cannot be used due to weather conditions.

The condition may be any information as long as it is information indicative of weather. Further, the condition determination means may determine that the conditions are met in a case where the weather indicated by the condition and the current weather match each other. Alternatively, it can be determined that the condition is met in a case where the weather indicated by the condition and the current weather do not match each other.

Moreover, it is preferable that the notification device is configured in such a manner that the positional information is associated with attribute information indicative of an attribute of the positional information, the notification device further including: related positional information obtaining means for obtaining related positional information indicative of a spot having an attribute corresponding to the attribute information associated with the positional information; and relation determination means for determining whether or not the current position of the notification device or at least a part of a route set to guide the user of the notification device is included within a predetermined area set based on the related positional information obtained by the related positional information obtaining means, the notification means notifying the user in a case where the relation determination means determines that the current position of the notification device or at least a part of the route set to guide the user of the notification device is included within the predetermined area set based on the related positional information.

According to the configuration, a spot retrieval is carried out based on attribute information associated with the positional information, and positional information of a detected spot is obtained as related positional information. Thereafter, an area is set based on the related positional information, and notification is carried out when a current position of the notification device or at least a part of a route that is set for guiding a user is included in this area.

This allows for a user to be aware of a spot indicated by the positional information even in a case where the user enters inside the area that is set based on a spot related to the spot indicated by the positional information. For instance, if the spot indicated by the positional information is a store, a facility or the like, a genre (category) or the like of that store, facility or the like can serve as the attribute information.

Namely, according to the configuration, notification is provided to the user of a store or the like that the user had registered as a store or the like that the user wishes to go, at a time when the user approaches a store or the like not registered by the user but is a store or the like that is of a same genre as the store or the like that the user had registered as a store of the like that the user wishes to go to. Hence, the user can change their destination to the store or the like that the user had registered as a store or the like that the user wishes to go to.

Moreover, it is preferable that the notification device further includes communication means for communicating with an external device configured to notify the user in accordance with an instruction from the notification device, the notification means transmitting an instruction to the external device via the communication means at the time when the current position of the notification device enters within the predetermined area, to carry out notification to the user.

According to the configuration, the user can recognize that the notification device has entered the area, by the notification from the external device. This is particularly useful for example in a case where the notification device is a portable device and the external device is an on-vehicle device such as a car navigation system or the like. That is to say, while the user is on a car, the user cannot see the screen of the portable device since that would disturb the user while driving, however by having the user be notified from the car navigation system, it is possible to confirm the notification even while the user is driving.

Moreover, it is preferable that the notification device further include communication means for communicating with an external device configured to guide the user to a spot indicated by the positional information inputted into the external device, the notification means transmitting, to the external device via the communication means, the positional information used as the standard for setting the predetermined area, at the time when the current position of the notification device enters within the predetermined area.

If the notification device does not include a function to guide the user to the spot by for example displaying a route to the inputted spot, there may be a case where the user receiving the notification does not know how to go the spot of the positional information to drop in at.

According to the configuration, the positional information is transmitted to an external device which has a function for guiding a user, when the user is notified that the user has entered within the area. As a result, guiding to a spot indicated by the positional information is carried out by the external device. This allows for the user to easily drop in at the spot of the positional information.

Moreover, it is preferable that the data storage section stores (i) image data into which the positional information is incorporated and (ii) image data into which no positional information is incorporated, and the notification means transmits, to the external device via the communication means, the image data identified by the identification means as the data including the positional information, at the time when the current position of the notification device enters within the predetermined area, the predetermined area being set by having the positional information of the image data serve as a standard for setting the predetermined area.

According to the configuration, at a time when the notification device enters into an area that is set based on positional information extracted from image data, that image data is transmitted to the guiding device. The image data has the positional information incorporated therein, so the guiding device can extract the positional information from the image data and guide the user to the spot indicated by the positional information.

It is advantageous in that it is possible to transmit the positional information as with regular image data that includes no positional information, in a case where the positional information is transmitted in a state in which the positional information is incorporated into the image data. For example, methods such as sending as a file attached to an e-mail or transmitting via infrared communication can be carried out.

Moreover, it is preferable that the predetermined area is variable.

The foregoing area may always be of a fixed area. However, by having the area variable as in the configuration, it is possible to notify the user of an appropriate area in accordance with its situation at that time. The area may be manually varied by the user, or may be automatically varied by the notification device.

Moreover, it is preferable that the notification device further include boarding determination means for determining whether or not the user of the notification device is on a car, the area setting means varying the predetermined area in accordance with a determination result of the boarding determination means.

The traveling speed of the user greatly differs between while the user is on a car and while the user is traveling on foot. Namely, when the user is on a car, the movement area of the user is large, and when the user is moving on foot, the movement area of the user is small.

According to the configuration, the area is varied in accordance with whether or not the user of the notification device is on a car. This allows for the user to be notified of a spot of the positional information that the user can drop in at without difficulty. A specific example of how to vary the area is, to vary the area so that it is large when the user is traveling by car as compared to that when the user is traveling on foot.

Moreover, in a case where the area is varied automatically by the notification device, the notification device may include traveling speed obtaining means for obtaining a traveling speed of the notification device, the area setting means varying the predetermined area in accordance with the traveling speed obtained by the traveling speed obtaining means.

This configuration also allows for the user to be notified of a spot of the positional information that the user can drop in at without difficulty. The area can be gradually varied in accordance with the traveling speed, or can be continuously varied. A specific example of how the area is varied is by having the area be larger while the traveling speed is fast, as compared to the area while the traveling speed is slow.

Moreover, it is preferable that the notification device further include approach determination means for determining whether or not a spot of the positional information and a current position of the notification device are approaching closer to each other, the notification means notifying the user of the notification device at the time when the notification device enters within the predetermined area, the predetermined area being set by having the positional information determined by the approach determination means as approaching closer to the current position of the notification device serve as a standard for setting the predetermined area.

According to the configuration, just a spot that the notification device is approaching (spot becoming shorter in distance from the notification device with time) is targeted as a spot to be notified to the user. The user thus receives just the notification of spots in the direction that the user is currently approaching, and therefore can easily drop in at that spot.

The notification device may be accomplished by a computer. In this case, a control program which realizes the notification device by causing the computer to operate as each of means of the notification device, and a computer readable recording medium recording such a program thereon also are included within the scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

A mobile phone of the present invention notifies a user thereof at a time when the mobile phone enters within a predetermined notification area. Hence, it is suitably applicable for terminals carried by a user other than the mobile phone, such as a portable music player, a portable game device, and like apparatus. Moreover, since an on-vehicle device such as a car navigation system also travels together with the user, the present invention may also be suitably applied to such devices.

REFERENCE SIGNS LIST

1 mobile phone (notification device, positional information transmission device)
8 mobile phone storage section (data storage section)
9 short distance communication section (communication means)
30 car navigation system (notification device, external device)
110 positional information extraction section (identification means, positional information extraction means, related positional information obtaining means)
111 mobile phone determination section (area setting means, route determination means, condition determination means, relation determination means, boarding determination means, traveling speed obtaining means, approach determination means)
112 mobile phone notification section (notification means)
113 mobile phone short distance communication control section (positional information transmitting means)
115 route searching section (route setting means)
117 route guiding section (guiding means)
121 car navigation system determination section (area setting means, route determination means, condition determination means, relation determination means, traveling speed obtaining means, approach determination means)
122 car navigation system notification section (notification means, route notification means, relation notification means)
124 route searching section (route setting means)
126 route guiding section (guiding means)

The invention claimed is:

1. A notification device carrying out notification to a user of the notification device at a time when a current position of the notification device enters within a predetermined area, the notification device comprising:
   a data storage section configured to store both of (i) data including positional information and (ii) data including no positional information without the data (i) and the data (ii) being distinguished from each other;
   identification section for identifying the data including positional information from among the data stored in the data storage section, by confirming whether or not the positional information is included in each of the data stored in the data storage section;
   positional information extraction section for automatically extracting positional information to be used as a standard for setting the predetermined area, the positional information being extracted from among the data identified by the identification section as including the positional information;
   area setting section for automatically setting the predetermined area on a basis of the positional information extracted by the positional information extraction section; and
   notification section for carrying out notification to the user of the notification device at a time when a current position of the notification device enters within the predetermined area set by the area setting section.

2. The notification device according to claim 1, wherein:
   the data storage section stores (i) image data into which the positional information is incorporated and (ii) image data into which no positional information is incorporated, and
   the identification section identifies the image data including the positional information by confirming whether or not the positional information is incorporated into the image data stored in the data storage section.

3. The notification device according to claim 1, further comprising:
   guiding section for guiding the user to a spot indicated by the positional information,
   the notification section making the guiding section guide the user to a spot indicated by the positional information used as a standard to set the predetermined area, at the time when the current position of the notification device enters within the predetermined area.

4. The notification device according to claim 1, further comprising:
   route setting section for setting a route to guide the user of the notification device; and route determination section for determining whether or not at least a part of the route set by the route setting section is included in the predetermined area, the notification section notifying the user of the notification device in a case where the route determination section determines that at least a part of the route is included in the predetermined area.

5. The notification device according to claim 1, wherein the positional information is positional information of a spot where the user may drop in at, the positional information being associated with a condition for determining whether or not the user may drop in at the spot, the notification device further comprising:

condition determination section for determining, at the time when the current position of the notification device enters within the predetermined area, whether or not the condition associated with the positional information is met, the positional information being used as a standard for setting the predetermined area, the notification section either notifying the user that the condition is not met or canceling the notifying to the user in a case where the condition determination section determines that the condition is not met.

6. The notification device according to claim 5, wherein the condition is a condition that can be determined whether or not the condition is met based on a date and time, and the condition determination section determines whether or not the condition is met based on a current date and time.

7. The notification device according to claim 5, wherein the condition is a condition that can be determined whether or not the condition is met based on weather, and the condition determination section determines whether or not the condition is met based on a current weather.

8. The notification device according to claim 1, wherein the positional information is associated with attribute information indicative of an attribute of the positional information, the notification device further comprising:

related positional information obtaining section for obtaining related positional information indicative of a spot having an attribute corresponding to the attribute information associated with the positional information; and relation determination section for determining whether or not the current position of the notification device or at least a part of a route set to guide the user of the notification device is included within a predetermined area set based on the related positional information obtained by the related positional information obtaining section, the notification section notifying the user in a case where the relation determination section determines that the current position of the notification device or at least a part of the route set to guide the user of the notification device is included within the predetermined area set based on the related positional information.

9. The notification device according to claim 1, further comprising:

communication section for communicating with an external device configured to notify the user in accordance with an instruction from the notification device, the notification section transmitting an instruction to the external device via the communication section at the time when the current position of the notification device enters within the predetermined area, to carry out notification to the user.

10. The notification device according to claim 9, wherein:

the data storage section stores (i) image data into which the positional information is incorporated and (ii) image data into which no positional information is incorporated, and the notification section transmits, to the external device via the communication section, the image data identified by the identification section as the data including the positional information, at the time when the current position of the notification device enters within the predetermined area, the predetermined area being set by having the positional information of the image data serve as a standard for setting the predetermined area.

11. The notification device according to claim 1, further comprising:

communication section for communicating with an external device configured to guide the user to a spot indicated by the positional information inputted into the external device, the notification section transmitting, to the external device via the communication section, the positional information used as the standard for setting the predetermined area, at the time when the current position of the notification device enters within the predetermined area.

12. The notification device according to claim 1, wherein the predetermined area is variable.

13. The notification device according to claim 12, further comprising:

boarding determination section for determining whether or not the user of the notification device is on a car, the area setting section varying the predetermined area in accordance with a determination result of the boarding determination section.

14. The notification device according to claim 12, further comprising:

traveling speed obtaining section for obtaining a traveling speed of the notification device, the area setting section varying the predetermined area in accordance with the traveling speed obtained by the traveling speed obtaining section.

15. The notification device according to claim 1, further comprising:

approach determination section for determining whether or not a spot of the positional information and a current position of the notification device are approaching closer to each other, the notification section notifying the user of the notification device at the time when the notification device enters within the predetermined area, the predetermined area being set by having the positional information determined by the approach determination section as approaching closer to the current position of the notification device serve as a standard for setting the predetermined area.

16. A notification system in which a notification device carries out notification to a user of the notification device at a time when a current position of the notification device enters within a predetermined area, the predetermined area being set on a basis of positional information transmitted by a positional information transmission device, the positional information transmission device comprising:

a data storage section configured to store both of (i) data including positional information and (ii) data including no positional information without the data (i) and the data (ii) being distinguished from each other;

identification section for identifying the data including positional information from among the data stored in the data storage section, by confirming whether or not the positional information is included in each of the data stored in the data storage section;

positional information extraction section for automatically extracting positional information to be used as a standard for setting the predetermined area, the positional information being extracted from among the data identified by the identification section as including the positional information; and positional information transmitting section for transmitting the positional information extracted by the positional information extraction section, to the notification device.

17. A method of controlling a notification device, the notification device carrying out notification to a user of the notification device at a time when a current position of the notification device enters within a predetermined area, the method comprising the steps of:
(a) identifying data including positional information from among data stored in a data storage section, the data storage section storing both of (i) the data including positional information and (ii) data including no positional information without the data (i) and the data (ii) being distinguished from each other, the data being identified as the data including positional information by confirming whether or not each of the data stored in the data storage section includes the positional information;
(b) automatically extracting positional information to be used as a standard for setting the predetermined area, from among the data identified in the step (a) as including positional information;
(c) automatically setting the predetermined area on a basis of the positional information extracted in the step (b); and
(d) carrying out notification to the user of the notification device at a time when a current position of the notification device enters within the predetermined area set in the step (c).

18. A non-transitory computer readable recording medium recording a control program for causing a computer to function as each of section of a notification device as set forth in claim 1.

* * * * *